United States Patent
Tsukazaki et al.

(10) Patent No.: US 8,086,333 B2
(45) Date of Patent: Dec. 27, 2011

(54) REPRODUCING APPARATUS, REPRODUCING METHOD, AND REPRODUCING PROGRAM

(75) Inventors: Hideo Tsukazaki, Tokyo (JP); Susumu Takatsuka, Tokyo (JP); Junichiro Sakata, Tokyo (JP); Masaaki Miyazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 584 days.

(21) Appl. No.: 11/481,364

(22) Filed: Jul. 5, 2006

(65) Prior Publication Data

US 2007/0008830 A1    Jan. 11, 2007

(30) Foreign Application Priority Data

Jul. 7, 2005  (JP) .................................. 2005-199410

(51) Int. Cl.
*G06F 17/00* (2006.01)
(52) U.S. Cl. .......................................................... 700/94
(58) Field of Classification Search ...................... 700/94
See application file for complete search history.

(56) References Cited

U.S. PATENT DOCUMENTS

| | | | | |
|---|---|---|---|---|
| 4,667,314 | A | * | 5/1987 | Iwashima ................. 369/178.01 |
| 5,544,360 | A | | 8/1996 | Lewak et al. |
| 5,731,852 | A | * | 3/1998 | Lee ................. 348/719 |
| 5,852,593 | A | * | 12/1998 | Ishida et al. ................. 369/53.18 |
| 5,945,987 | A | * | 8/1999 | Dunn ............................. 715/718 |
| 5,983,176 | A | * | 11/1999 | Hoffert et al. ................. 704/233 |
| 6,243,725 | B1 | * | 6/2001 | Hempleman et al. ......... 715/210 |
| 6,262,724 | B1 | | 7/2001 | Crow et al. |
| 6,502,194 | B1 | * | 12/2002 | Berman et al. ................... 726/28 |
| 6,519,648 | B1 | * | 2/2003 | Eyal ............................... 709/231 |
| 6,522,347 | B1 | | 2/2003 | Tsuji et al. |
| 6,536,037 | B1 | * | 3/2003 | Guheen et al. ................. 717/151 |
| 6,760,721 | B1 | | 7/2004 | Chasen et al. |
| 6,928,433 | B2 | | 8/2005 | Goodman et al. |
| 6,934,812 | B1 | * | 8/2005 | Robbin et al. ................. 711/138 |
| 6,996,563 | B2 | | 2/2006 | Kumagai et al. |
| 7,017,125 | B1 | | 3/2006 | Matsumoto |
| 7,162,488 | B2 | * | 1/2007 | DeVorchik et al. ................... 1/1 |
| 7,166,791 | B2 | | 1/2007 | Robbin et al. |
| 7,216,008 | B2 | | 5/2007 | Sakata |
| 7,219,308 | B2 | | 5/2007 | Novak et al. |
| 2001/0002223 | A1 | * | 5/2001 | Watanabe ........................ 386/75 |
| 2001/0030660 | A1 | * | 10/2001 | Zainoulline ................... 345/720 |
| 2002/0002541 | A1 | | 1/2002 | Williams |
| 2002/0141096 | A1 | * | 10/2002 | Hayashi ........................... 360/69 |
| 2002/0147728 | A1 | | 10/2002 | Goodman et al. |
| 2002/0156864 | A1 | * | 10/2002 | Kniest ............................ 709/217 |
| 2002/0160749 | A1 | | 10/2002 | Nishikawa |

(Continued)

FOREIGN PATENT DOCUMENTS

EP    1480219 A1    11/2004

(Continued)

*Primary Examiner* — Curtis Kuntz
*Assistant Examiner* — Paul McCord
(74) *Attorney, Agent, or Firm* — Wolf, Greenfield & Sacks, P.C.

(57) ABSTRACT

A reproducing apparatus has: an accumulating unit in which a plurality of content data are accumulated; a storing unit for storing the data; a reproducing unit for reproducing the data read out of the storing unit; and a control unit for reading out predetermined portions of the content data accumulated in the accumulating unit from the accumulating unit on the basis of attribute information corresponding to the content data and allowing the read-out predetermined portions to be stored into the storing unit.

9 Claims, 44 Drawing Sheets

U.S. PATENT DOCUMENTS

| | | |
|---|---|---|
| 2002/0171691 A1 | 11/2002 | Currans et al. |
| 2002/0178276 A1 | 11/2002 | McCartney et al. |
| 2003/0069854 A1 | 4/2003 | Hsu et al. |
| 2003/0112467 A1* | 6/2003 | McCollum et al. ......... 358/1.18 |
| 2003/0158737 A1 | 8/2003 | Csicsatka |
| 2004/0064209 A1* | 4/2004 | Zhang ............................. 700/94 |
| 2004/0075698 A1 | 4/2004 | Gao et al. |
| 2004/0254883 A1* | 12/2004 | Kondrk et al. .................. 705/51 |
| 2005/0049941 A1* | 3/2005 | Kaplan ........................... 705/27 |
| 2005/0060552 A1 | 3/2005 | Sugimura et al. |
| 2005/0187976 A1 | 8/2005 | Goodman et al. |
| 2005/0204309 A1 | 9/2005 | Szeto |
| 2006/0010099 A1 | 1/2006 | Takeda et al. |
| 2006/0020968 A1* | 1/2006 | Kroll et al. ...................... 725/37 |
| 2006/0168340 A1* | 7/2006 | Heller et al. .................. 709/242 |
| 2006/0203620 A1 | 9/2006 | Bedingfield |
| 2006/0235550 A1* | 10/2006 | Csicsatka et al. .............. 700/94 |
| 2006/0272479 A1* | 12/2006 | Takatsuka et al. ............. 84/461 |
| 2007/0027923 A1 | 2/2007 | Tsukazaki et al. |
| 2007/0031116 A1 | 2/2007 | Takatsuka et al. |
| 2007/0038941 A1 | 2/2007 | Wysocki et al. |

FOREIGN PATENT DOCUMENTS

| | | |
|---|---|---|
| JP | 01-124993 U | 8/1989 |
| JP | 05-282788 A | 10/1993 |
| JP | 05-325404 A | 12/1993 |
| JP | 07-153244 A | 6/1995 |
| JP | 09-265731 A | 10/1997 |
| JP | 10-074383 A | 3/1998 |
| JP | 10-290413 A | 10/1998 |
| JP | 2884525 B2 | 12/1999 |
| JP | 2993058 B2 | 12/1999 |
| JP | 2000-299829 A | 10/2000 |
| JP | 3099373 B2 | 10/2000 |
| JP | 2001-076415 A | 3/2001 |
| JP | 2001-243748 A | 9/2001 |
| JP | 2001-265795 A | 9/2001 |
| JP | 2001309222 | 11/2001 |
| JP | 3239383 B | 12/2001 |
| JP | 2002-124069 A | 4/2002 |
| JP | 3312632 B2 | 5/2002 |
| JP | 2002-169573 A | 6/2002 |
| JP | 2002-169574 A | 6/2002 |
| JP | 2002-222582 A | 8/2002 |
| JP | 2002-245762 A | 8/2002 |
| JP | 2002-304873 A | 10/2002 |
| JP | 2002-319277 A | 10/2002 |
| JP | 2002-343067 A | 11/2002 |
| JP | 2003-157335 A | 5/2003 |
| JP | 2003-186755 A | 7/2003 |
| JP | 2003-203133 A | 7/2003 |
| JP | 2003-219325 A | 7/2003 |
| JP | 2003-288090 A | 10/2003 |
| JP | 2004-039113 A | 2/2004 |
| JP | 2004-095032 A | 3/2004 |
| JP | 2004-127465 A | 4/2004 |
| JP | 2004-302931 A | 10/2004 |
| JP | 2004-326907 A | 11/2004 |
| JP | 2004-342193 A | 12/2004 |
| JP | 2005-094277 A | 4/2005 |
| JP | 2005-116068 A | 4/2005 |
| JP | 2005-190516 A | 7/2005 |
| JP | 2005-275692 A | 10/2005 |
| JP | 2006-018878 A | 1/2006 |

\* cited by examiner

Fig. 5

| CONTENT ID | ALBUM ID | GENRE ID | ARTIST ID | REPRODUCTION HISTORY | RANKING INFORMATION |
|---|---|---|---|---|---|
| C_1 | Al_1 | G_1 | Ar_1 | PT_1 | R_1 |
| C_2 | Al_1 | G_1 | Ar_1 | PT_2 | R_2 |
| C_3 | Al_2 | G_1 | Ar_1 | PT_3 | R_3 |
| C_4 | Al_3 | G_2 | Ar_2 | PT_4 | R_4 |
| C_5 | Al_3 | G_2 | Ar_2 | PT_5 | R_5 |

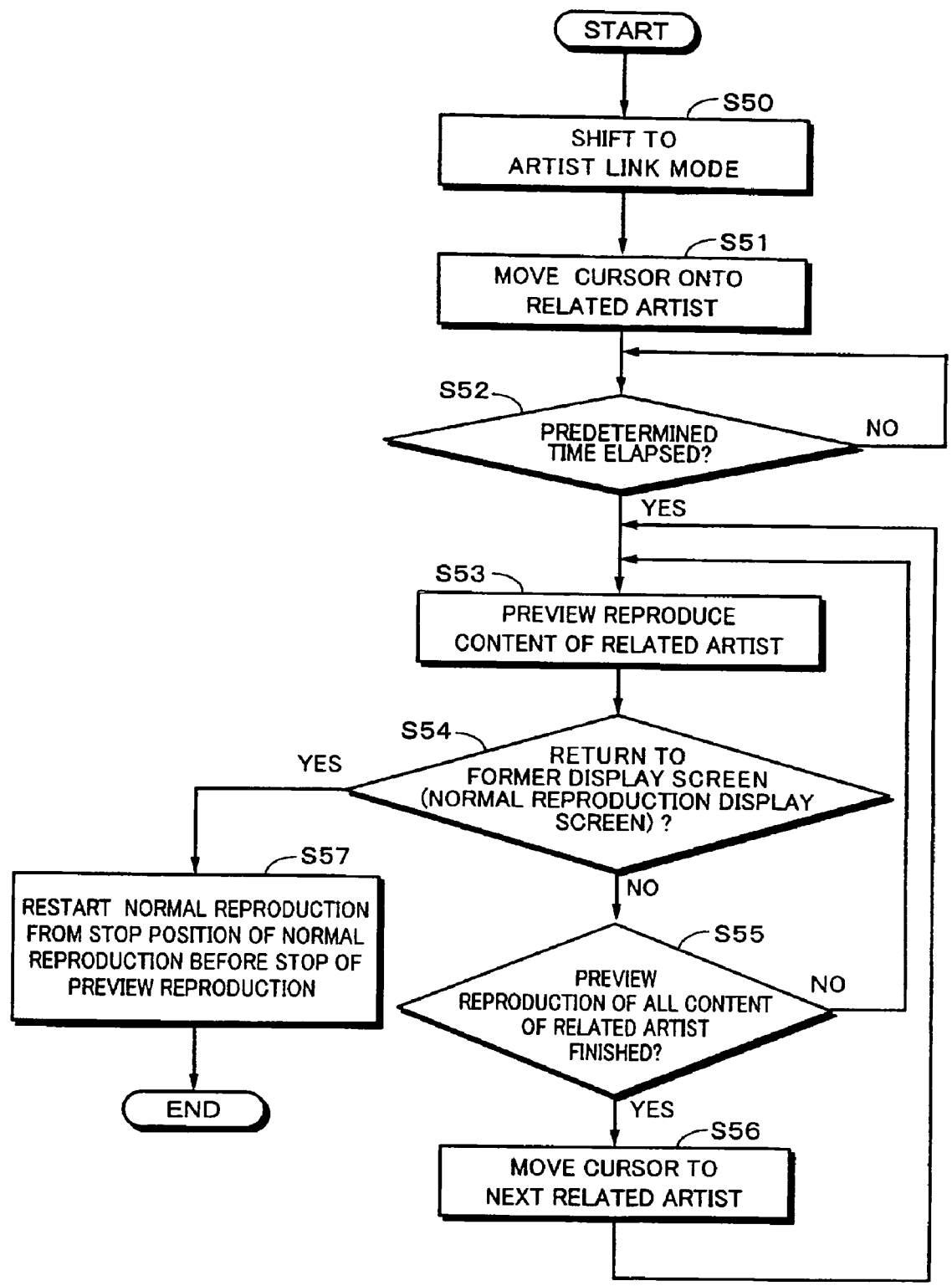

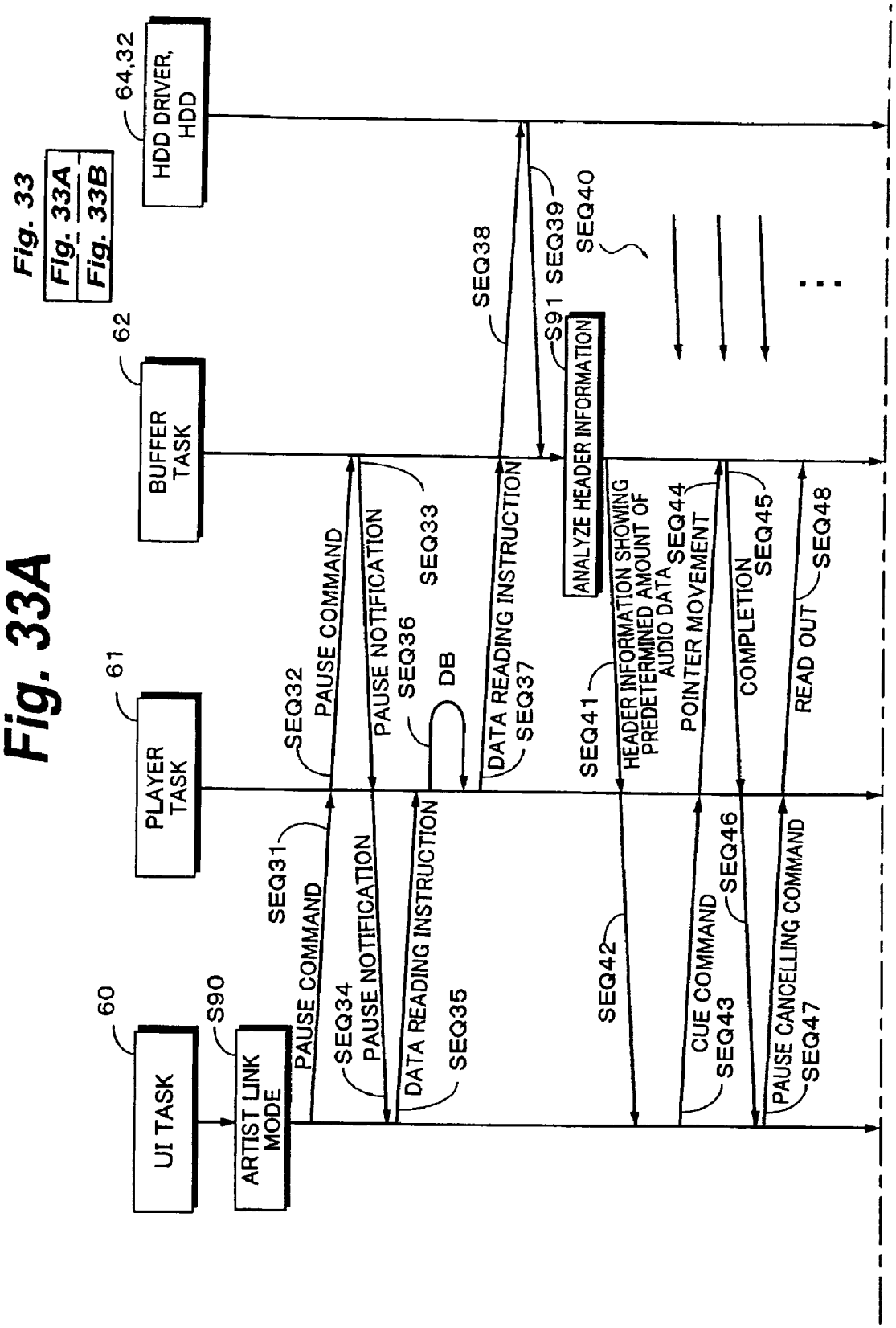

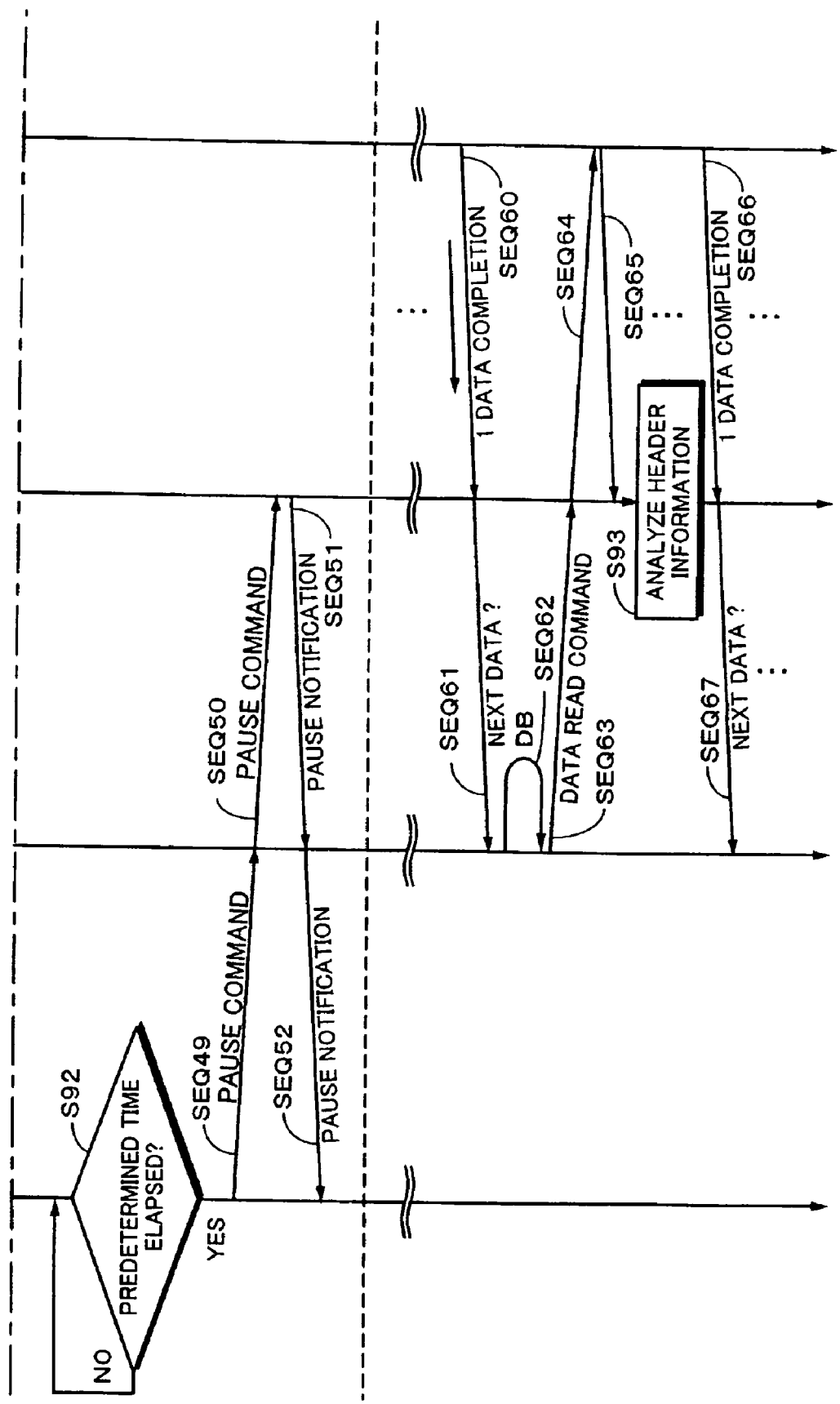

Fig. 39

| CONTENT ID | PREVIEW REPRODUCING INTERVAL START POSITION |
|---|---|
| xxx01 | 00'30" |
| xxx02 | 01'00" |
| yyy05 | 00'45" |
| ⋮ | ⋮ |

REPRODUCING APPARATUS, REPRODUCING METHOD, AND REPRODUCING PROGRAM

CROSS REFERENCES TO RELATED APPLICATIONS

The present invention contains subject matter related to Japanese Patent Application No. 2005-199410 filed in the Japanese Patent Office on Jul. 7, 2005, the entire contents of which being incorporated herein by reference.

BACKGROUND OF THE INVENTION

1. Field of the Invention

The invention relates to a reproducing apparatus, a reproducing method, and a reproducing program which can selectively reproduce a predetermined portion of audio data recorded in a recording medium.

2. Description of the Related Arts

In recent years, many portable reproducing apparatuses each using a small hard disk drive as a recording medium have been put into practical use as products. According to the small hard disk drive, since a recording capacity is equal to a value within a range from a few GB (gigabytes) to about tens of GB and a large number of content data, for example, hundreds to thousands of content can be recorded, such hard disk drives have rapidly been spread. According to such a reproducing apparatus, since its casing is small and light-weighted, content formed by audio data such as music pieces or the like is recorded into the recording medium, the recording medium is carried out of doors together with the reproducing apparatus, and the music pieces recorded in the recording medium are reproduced in the open air and can be enjoyed.

In the case of recording a large number of music pieces into the recording medium and using them as mentioned above, it is demanded that an interface which selects and designates the recorded track music pieces can promptly select desired content. Hitherto, there has been used a method whereby a cursor of a content list displayed in a display unit is moved by using a rotary wheel or a multi-directional key which instructs the vertical or vertical/horizontal directions, or the like, thereby selecting a desired track. For example, the content corresponding to a cursor position is reproduced by pressing a play key.

In the case where a large number of tracks have been recorded in the recording medium, there is such a situation that the user does not know all album names or content names (music piece names) recorded in the recording medium. In many cases, the user does not know text information such as content names or the like although he knows melodies or the like. Further, the portable reproducing apparatus is often used during the movement such as walking or the like of the user. It is often difficult to select desired content by using the text information as a hint.

In such a case, since the user selects the desired content while reproducing one by one the audio data recorded in the recording medium, it is very annoying. To solve such a problem, a technique in which with respect to each content of the album, predetermined portions of the audio data are set as highlight portions, and the predetermined portions are sequentially reproduced has been disclosed in Patent Document 1 (JP-A-2003-50816). According to the method disclosed in Patent Document 1, since the user can automatically confirm the contents of each content of the album, he can select a desired music piece without annoying.

SUMMARY OF THE INVENTION

In the portable reproducing apparatuses, generally, the audio data is compression-encoded by a predetermined compression encoding system and recorded in the recording medium. In recent years, as compression encoding systems of the audio data, various systems such as MP3 (Moving Pictures Experts Group 1 Audio Layer 3) system, AAC (Advanced Audio Coding) system, ATRAC3 (Adaptive Transform Acoustic Coding 3) system, and the like have been put into practical use. In one compression encoding system, there is also a case where a system in which bit rates of the compression audio data are different and a system in which the bit rate can be varied every block in one compression audio data exist.

Among the portable reproducing apparatuses, there is also an apparatus which copes with a plurality of compression encoding systems. In the case of such an apparatus, a plurality of audio data which have been compression-encoded by the different compression encoding systems, audio data whose bit rates are different even in the case of the same compression encoding system, and audio data in which the bit rate can be varied in one data are recorded in the recording medium so as to mixedly exist.

A technique for selectively reproducing only the designated portions with respect to each of the audio data which has been compression-encoded by various formats and recorded in the recording medium as mentioned above is demanded.

As an example of such a technique, a method whereby a predetermined portion of content is separately previously formed as audio data and recorded in the recording medium of the portable reproducing apparatus is considered. However, according to such a method, there is a problem that the recording capacity of the recording medium is additionally consumed for the audio data of the predetermined portion.

It is, therefore, desirable to provide a reproducing apparatus, a reproducing method, and a reproducing program which can reproduce a predetermined portion of content recorded in a recording medium without additionally consuming a recording capacity of the recording medium in order to reproduce the predetermined portion of the content.

According to an embodiment of the present invention, there is provided a reproducing apparatus comprising:

an accumulating unit in which a plurality of content data are accumulated;

a storing unit storing the data;

a reproducing unit reproducing the data read out of the storing unit; and a control unit reading out predetermined portions of the content data accumulated in the accumulating unit from the accumulating unit on the basis of attribute information corresponding to the content data and allowing the read-out predetermined portions to be stored into the storing unit.

According to another embodiment of the present invention, there is provided a reproducing method of reproducing content data, comprising the steps of:

reading out a plurality of predetermined portions of the content data on the basis of attribute information corresponding to the content data from an accumulating unit in which a plurality of content data have been accumulated;

storing the plurality of read-out predetermined portions into a storing unit; and sequentially reproducing the stored predetermined portions.

According to further another embodiment of the present invention, there is provided an information reproducing system comprising a content reproducing apparatus for reproducing content data and an information apparatus for communicating with the content reproducing apparatus, wherein the content reproducing apparatus has:

a reproducing unit reproducing predetermined content data;

a first communicating unit executing communication with an external apparatus; and controller allowing attribute information corresponding to the predetermined content data to be transmitted to the information apparatus through the first communicating unit and allowing predetermined portions of the content data to be reproduced on the basis of interval information which is transmitted from the information apparatus, and the information apparatus has:

a second communicating unit executing the communication with the content reproducing apparatus; and a control unit searching for the interval information corresponding to the attribute information received by the second communicating unit and allowing the interval information to be transmitted to the reproducing apparatus.

As mentioned above, according to an embodiment of the present invention, the predetermined portions of the content data accumulated in the accumulating unit which can accumulate the plurality of content data are selectively readout of the accumulating unit on the basis of the attribute information which the content data has and are temporarily stored in the storing unit, and the content data stored in the storing unit is reproduced. Therefore, even if the predetermined portions of the content data are not previously accumulated in the accumulating unit as files different from the content data, the predetermined portions of the content data can be reproduced at any time.

According to another embodiment of the present invention, the predetermined portions of the content data stored in the storing unit which stores the plurality of content data are selectively read out and reproduced from the storing unit on the basis of the attribute information which the content data has. Therefore, even if the predetermined portions of the content data are not previously formed as files different from the content data, the predetermined portions of the content data can be reproduced at any time.

As mentioned above, according to an embodiment of the present invention, the predetermined portions of the content data accumulated in the accumulating unit which can accumulate the plurality of content data are selectively read out of the accumulating unit on the basis of the attribute information which the content data has and are temporarily stored in the storing unit, and the content data stored in the storing unit is reproduced. Therefore, there is such an effect that there is no need to previously accumulate the predetermined portions of the content data into the accumulating unit as files different from the content data in order to selectively reproduce the predetermined portions of the content data.

According to another embodiment of the present invention, the predetermined portions of the content data which is stored in the storing unit which stores the plurality of content data are selectively read out and reproduced from the storing unit on the basis of the attribute information which the content data has. Therefore, there is such an effect that there is no need to previously form the predetermined portions of the content data as files different from the content data in order to selectively reproduce the predetermined portions of the content data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a schematic diagram showing a construction of an example of an attribute information table;

FIG. 19 is a flowchart showing the processes of an example of the preview reproduction;

FIG. 33 shows a sequence of an example of the preview reproduction according to the second embodiment of the invention;

FIG. 39 is a schematic diagram showing an example of a preview reproducing interval information table;

DETAILED DESCRIPTION OF THE PREFERRED EMBODIMENTS

Figure 1:
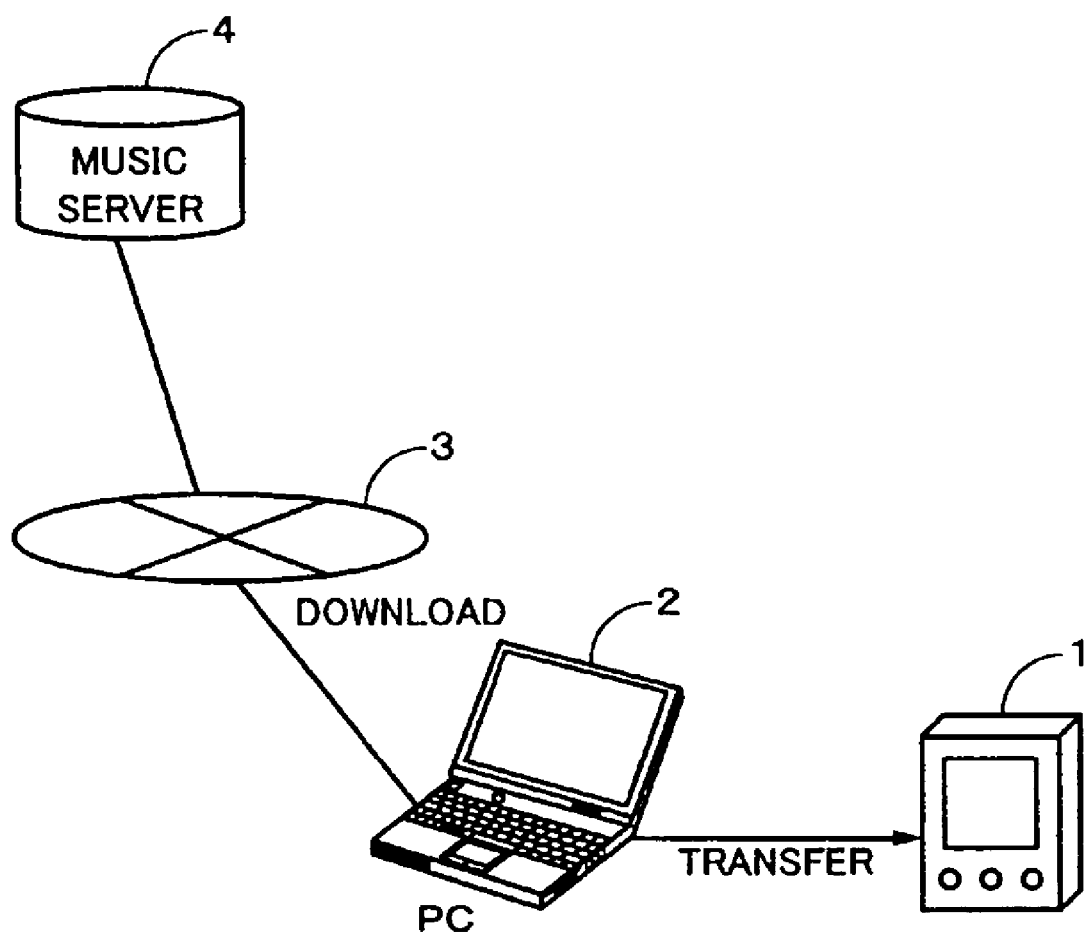
FIG. 1 is a schematic diagram showing a using form of an example of a reproducing apparatus to which an embodiment of the invention can be applied.

Embodiments of the invention will be described hereinbelow in the following order.

1. Technique common to the first and second embodiments of the invention
   1-1. Form of a system to which an embodiment of the invention is applied
   1-2. Construction of the reproducing apparatus
   1-3. Schematic operation of preview reproduction
   1-4. Schematic operation of an artist link mode
2. More specific operation in the artist link mode
3. Control method of the preview reproduction
   3-1. Method according to the first embodiment of the invention
      3-1-1. File structure
      3-1-2. Flow of processes
      3-1-3. Operation when switching a preview reproducing mode and a normal reproducing mode
   3-2. Method according to the second embodiment of the invention
      3-2-1. Flow of processes
      3-2-2. Operation when switching the preview reproducing mode and the normal reproducing mode
4. Modification common to the first and second embodiments of the invention
   4-1. Obtainment of a preview reproducing interval from an outside
   4-2. Another system form of the modification common to the first and second embodiments
5. Further another modification of the embodiments of the invention 1. Technique Common to the First and Second Embodiments of the Invention First, a technique common to the first and second embodiments of the invention will be described.

1-1. Form of a System to which an Embodiment of the Invention is Applied

FIG. 1 shows a using form of an example of a reproducing apparatus 1 to which an embodiment of the invention can be applied. The reproducing apparatus 1 is a portable device (PD) which is designed as a small and light-weighted casing so as to be portable. There producing apparatus 1 uses a hard disk drive as a recording medium and reproduces content data recorded in the recording medium. The reproducing apparatus 1 has an interface (I/F) such as USB (Universal Serial Bus) or IEEE1394 (Institute Electrical and Electronics Engineers 1394) interface which can communicate with a personal computer 2 (hereinafter, abbreviated to a PC2). In this example, it is assumed that the reproducing apparatus 1 and the PC 2 are connected by using the USB as a communication interface.

Explanation will be made hereinbelow on the assumption that the content data recorded in the recording medium of the reproducing apparatus 1 is music piece data, that is, audio data. Each of the music piece data is also called a track.

A music server 4 provides services such as downloading and the like of the content data through an Internet 3. The music server 4 manages the content data in association with, for example, attribute information such as artist, recorded album, music genre, and the like. If a melody, a tempo, and the like of music pieces are further associated as attribute information, it is more preferable. The music server 4 also manages ranking information corresponding to the number of downloaded content data and the like, related information among the artists (referred to as artist link information), and the like and provides the services using those information through the Internet 3. For example, the music server 4 adds the ranking information, artist link information, and the like to the attribute information and provides them to the user. Dates of release of the recorded albums and the content data may be also added to the attribute information.

For example, the user connects to the Internet 3 by using the PC2 and downloads the content data from the music server 4 on the Internet 3. The downloaded content is stored into, for example, the hard disk drive of the PC2. Further, the user connects the reproducing apparatus 1 and the PC 2 by using a USB cable and transfers the content data stored in the hard disk drive of the PC2 to the reproducing apparatus 1. The reproducing apparatus 1 records the transferred content data into the built-in recording medium. The user disconnects the PC 2 and the reproducing apparatus 1, carries out the reproducing apparatus 1, for example, in the open air, reproduces the content data recorded in the recording medium, and can enjoy it.

When the content data is downloaded from the music server 4, if the ranking information is added as attribute information to the content data and the resultant data is obtained, the user can easily search for the content which is popular at present. If the artist link information is added as attribute information to the content data and the resultant data is obtained, the user can know other artists related to the artist of the selected content and can also easily search for the content of the related artist. Further, if a history of the content data reproduced by the reproducing apparatus 1 is stored, the user's favorite content can be easily searched for.

1-2. Construction of the Reproducing Apparatus

Figure 2:
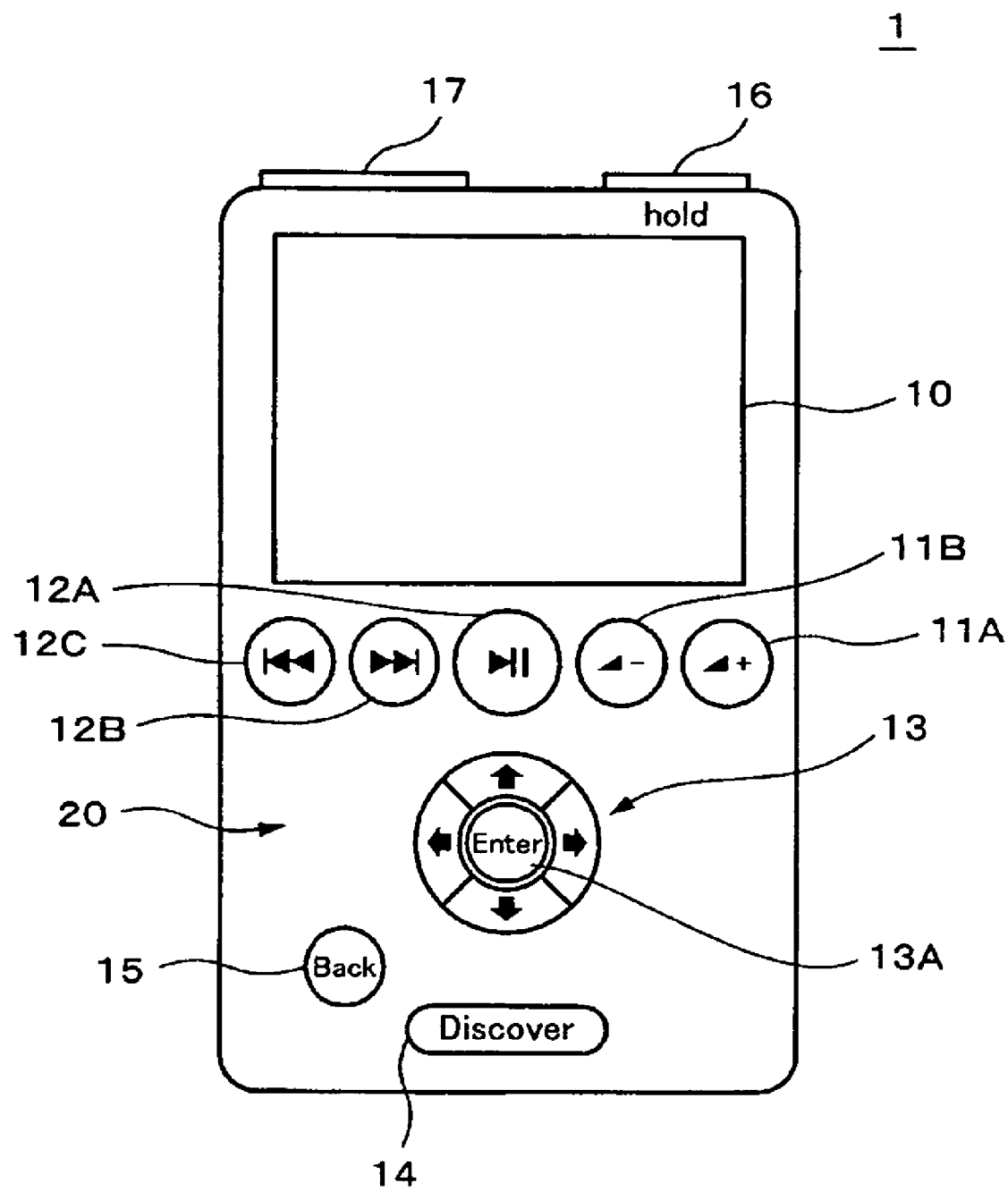
FIG. 2 is a diagram showing an external view of an example of a portable reproducing apparatus which can be applied to an embodiment of the invention.

FIG. 2 shows an external view of an example of the portable reproducing apparatus 1 which can be applied to the embodiment of the invention. Schematically, the front side of the reproducing apparatus 1 has: a display unit 10 which uses, for example, an LCD (Liquid Crystal Display) as a display device and displays information to the user; and an operating unit 20 which is provided with a plurality of keys and receives the operation from the user. The display unit 10 can make display control, for example, on a dot unit basis and can display a text, simple characters, icons, or the like.

A holding switch 16 and a connector portion 17 are provided on the upper surface of the apparatus. The holding switch 16 switches "valid" and "invalid" of the operation to the operating unit 20. The connector portion 17 has: a connector for transmitting and receiving digital data to/from an external apparatus such as a PC2; and a headphone terminal for outputting an analog audio signal reproduced by the reproducing apparatus 1.

Each key provided for the operating unit 20 will now be described. For example, when each key is depressed, a control signal indicative of the depressed key is outputted. Different functions can be allocated to each key in accordance with a duration of the depressing time. For example, the different functions can be allocated in the case where a continuation time of the depression of the key is equal to or longer than a predetermined time (referred to as long depression) and the case where it is shorter than the predetermined time (referred to as short depression). In the case of the short depression, the function is executed at the timing when the depression to the key is extinguished within the predetermined time after the key was depressed. On the other hand, in the case of the long depression, the function is executed when the key has continuously been depressed for the predetermined time or longer. In the case of the key in which only the short depression has been defined, the function is executed at the depression timing. Further, it is also possible to automatically define in such a manner that if the key has continuously been depressed for the predetermined time or longer, the key was repetitively depressed (referred to as "key repeat").

Keys 11A and 11B are volume keys for increasing and decreasing a reproducing sound volume of each content data. Each time the key 11A or 11B is depressed shortly, the sound volume changes step by step. The key repeat is validated for the keys 11A and 11B.

Keys 12A, 12B, and 12C are keys mainly for making reproduction control of the content data. When the key 12A is depressed shortly, the play (reproduction) and pause of the content data are sequentially instructed. By depressing the key 12A long, an operating mode of the reproducing apparatus 1 is shifted to a sleep mode. By shortly depressing the key 12B, the play of the next content data is instructed. By depressing the key 12B long, the fast-forward play of the content data which is being reproduced at present is instructed. Similarly, by shortly depressing the key 12C, the play of the previous content data is instructed. By depressing the key 12C long, the fast-rewind play of the content data which is being reproduced at present is instructed.

A key 13 is a 5-directional key including an enter key 13A in the center portion and arrow keys which are arranged around the enter key 13A and indicate the upper, lower, left, and right directions (called an upper direction key, a lower direction key, a left direction key, and a right direction key, respectively). The key 13 mainly instructs the operation corresponding to the display screen displayed in the display unit 10.

If the display screen of the display unit 10 is a display screen showing that the content is being reproduced at present, by shortly depressing the enter key 13A, the play and pause of the content which is being reproduced at present are sequentially instructed. If the display screen of the display unit 10 is a display screen other than the display screen showing that the content is being reproduced at present, by depressing the enter key 13A, the item selected at present is determined in the display unit 10. If the display of the display unit 10 is a display of the content list, by depressing the enter key 13A, a batch play for various kinds of content shown on the list is instructed.

By shortly depressing the upper direction key and the lower direction key in the key 13, the item selected in the display unit 10 is switched in the upper direction and the lower direction, respectively. By depressing the upper direction key and the lower direction key long, a high-speed scroll of the list is instructed when the display unit 10 displays the list. The key repeat of each of the upper direction key and the lower direction key is validated until the long depression function is executed. Therefore, for example, the display on the display screen can be vertically scrolled by using the upper direction key and the lower direction key.

By shortly depressing the left direction key and the right direction key in the key 13, the item selected in the display unit 10 is switched in the left direction and the right direction, respectively. If the display screen of the display unit 10 has a plurality of pages, by depressing the left direction key and the right direction key, switching of the page can be instructed.

The long depression is not defined and the key repeat is validated for each of the left direction key and the right direction key.

By shortly depressing a discovery key 14, calling of the artist link function using the artist link information is instructed. By depressing the discovery key 14 long, the artist link function is called and the play of the content of all of the artists displayed in the display unit 10 is instructed. Details of the artist link function will be described hereinafter.

By shortly depressing a key 15, returning of a history of the operations which have been executed to the reproducing apparatus 1 is instructed. By depressing the key 15 long, a top menu is displayed in the display unit 10.

The functions of the keys 13 to 15 mentioned above are shown as an example and the invention is not limited to such an example. The function according to the operating mode can be allocated to each of the keys 13 to 15 in a software manner.

Figure 3:
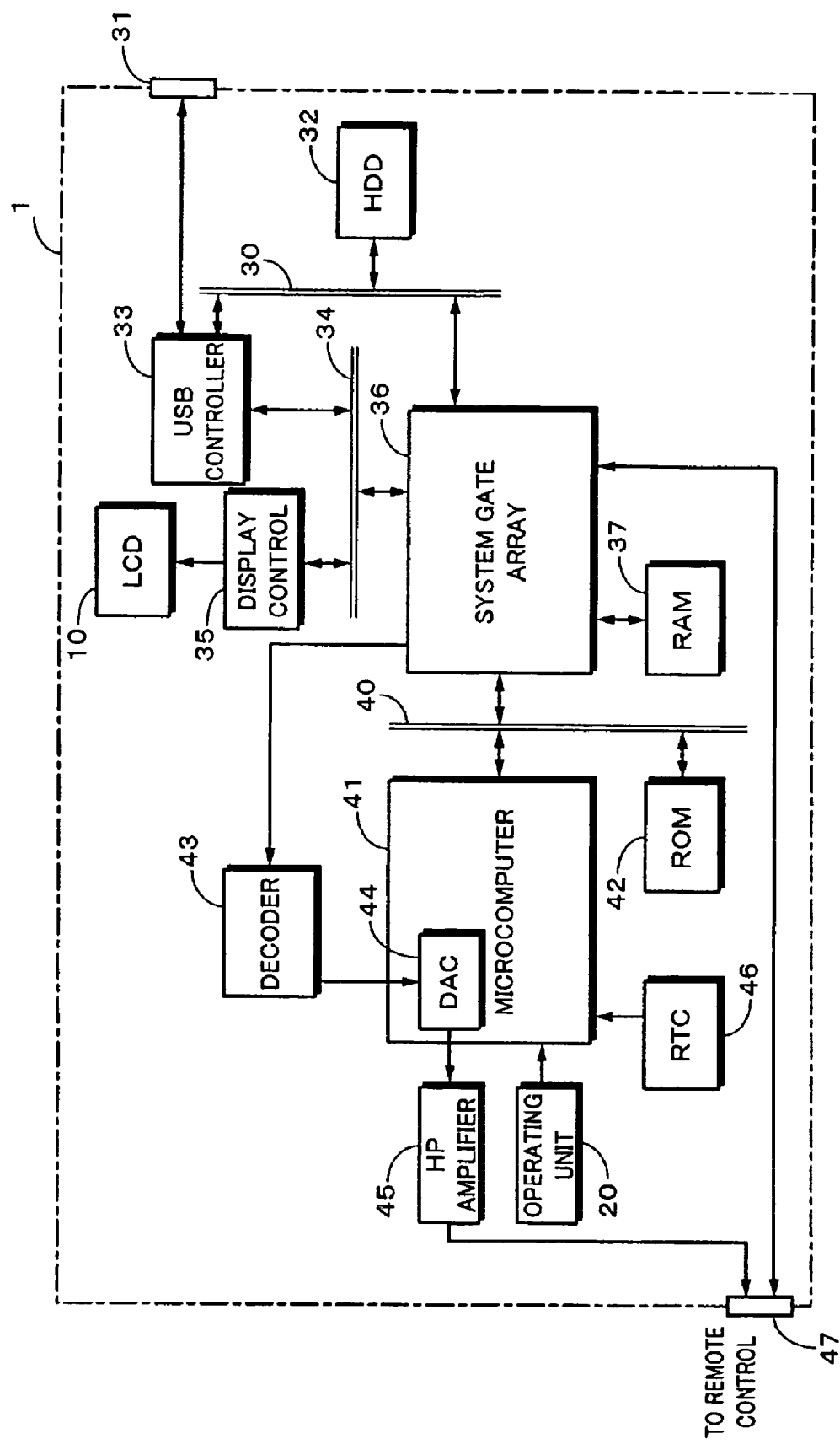
FIG. 3 is a block diagram showing a construction of an example of the reproducing apparatus.

FIG. 3 shows a construction of an example of the reproducing apparatus 1. In the example of FIG. 3, the reproducing apparatus 1 has three buses 30, 34, and 40. A hard disk drive (HDD) 32, a USB (Universal Serial Bus) controller 33, and a system gate array 36 are connected to the bus 30. The content data is mainly transferred to the bus 30. A USB connector 31 is connected to the USB controller 33. The USB controller 33 controls communication with an external apparatus connected to the USB connector 31.

The USB controller 33, a display control unit 35, and the system gate array 36 are connected to the bus 34. A command is mainly transferred to the bus 34. On the basis of a display control signal supplied through the bus 34, the display control unit 35 drives the display unit 10 formed by, for example, the LCD and allows the display unit 10 to display a display screen corresponding to the display control signal.

A microcomputer 41, the system gate array 36, and a ROM (Read Only Memory) 42 are connected to the bus 40. The command is mainly transferred to the bus 40. A real-time clock (RTC) 46 and the operating unit 20 are connected to the microcomputer 41. The operating unit 20 forms a control signal corresponding to the operation to each of the keys 11 to 15 mentioned above and supplies it to the microcomputer 41. In accordance with a program which has previously been stored in, for example, the ROM 42, the microcomputer 41 controls the whole reproducing apparatus 1 in response to the control signal supplied from the operating unit 20. The microcomputer 41 also properly forms the display control signal in accordance with the program.

The microcomputer 41 has a D/A converting unit (DAC) 44 therein. The audio data supplied from a decoder 43, which will be explained hereinafter, is converted into an analog audio signal, and supplies it to a headphone (HP) amplifier 45.

The ROM 42 is a rewritable ROM such as an EEPROM (Electrically Erasable Programmable Read Only Memory) and a program which is stored can be updated. A program to be updated is supplied from, for example, an external computer apparatus through the USB connector 31.

Since the reproducing apparatus 1 is controlled by the microcomputer 41 in accordance with the program stored in the ROM 42 as mentioned above, it can be substantially considered as a computer apparatus.

The system gate array 36 controls transmission and reception of the data and commands among the buses 30, 34, and 40. A RAM 37 and the decoder 43 for decoding the compression encoded audio data are connected to the system gate array 36. The RAM 37 is used as a work memory of the microcomputer 41 and also used as a buffer of the audio data to be decoded by the decoder 43. For example, the RAM 37 has a storing capacity of 16 MB (megabytes) and a predetermined area of 12 MB in 16 MB is assured as a buffer memory area.

A remote control commander which remote-controls the reproducing apparatus 1 in a wired manner and has a headphone terminal is connected to a remote control terminal 47. The analog audio signal outputted from the HP amplifier 45 is sent to the remote control terminal 47. The system gate array 36 and the remote control terminal 47 are connected. The control signal corresponding to the operation to the remote control commander is inputted from the remote control terminal 47 and supplied to the microcomputer 41 through the system gate array 36 and the bus 40.

The foregoing USB connector 31 and the remote control terminal 47 are provided for the connector portion 17 shown as an example in FIG. 2. Although not shown, the holding switch 16 is connected to the microcomputer 41.

Although the explanation has been made above on the assumption that the reproducing apparatus 1 and the PC 2 are connected in the wired manner, the invention is not limited to such an example. For instance, a wireless communication I/F for controlling the wireless communication may be connected to the bus 30 (not shown) and the transmission and reception of commands between the reproducing apparatus 1 and the PC 2, the transfer of the content data from the PC 2 to the reproducing apparatus 1, and the like can be performed by the wireless communication.

Figure 4:
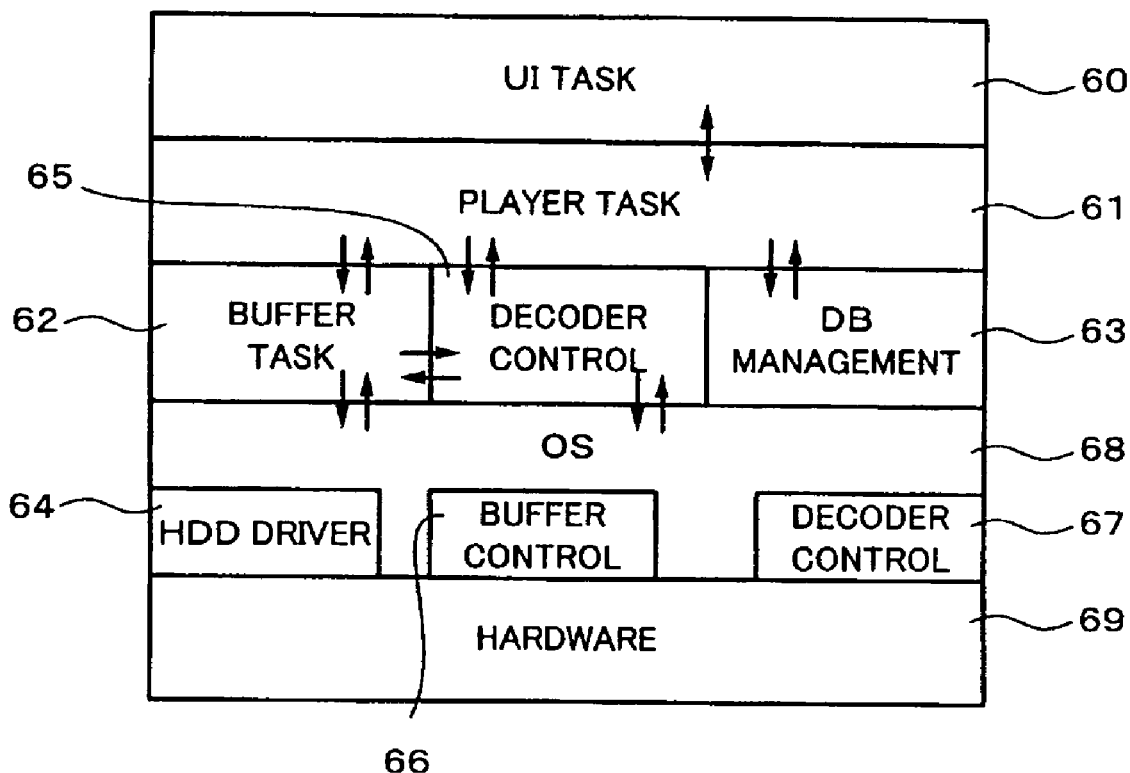
FIG. 4 is a schematic diagram showing an architecture which can be applied to the reproducing apparatus.

FIG. 4 schematically shows an architecture which can be applied to the reproducing apparatus 1. A UI (User Interface) task 60 plays a role of a user interface for the display to the display unit 10, the generation of the control signal corresponding to the operation to the operating unit 20, and the like. For example, in the UI task 60, there are executed: control of a cursor indication 70 according to the operation to the key 13 of the operating unit 20; creation of control commands according to the operation to the keys 12A to 12C for making reproduction control of the audio data; and the like. As reproduction control commands, there are: play (reproduction); stop (stop of reproduction); feed-forward (fast-forward while reproducing); rewind (fast-rewind while reproducing); queue (advance to a predetermined position without reproducing); review (return to a predetermined position without reproducing); pause (temporary stop of reproduction); and the like.

A player task 61 is located under the UI task 60 and makes management regarding the reproduction of the content data. For example, the player task 61 performs transmission and reception to/from a database, which will be explained hereinafter, in accordance with an instruction from the UI task 60, grasps the reproduction content, and issues the reproduction control command of the content data to a lower task. The player task 61 typically grasps the present play mode, returns the play mode to the UI task 60, and makes the reproduction control according to the play mode.

The play mode denotes the operating mode regarding the reproducing order of the content. For example, there are a normal mode to reproduce the content in the order shown on the list, a shuffle mode to replace the reproducing order at random, and the like.

A buffer task 62, a database (DB) management task 63, and a decoder control task 65 are located under the player task 61, respectively. The buffer task 62 makes read-out control and write control of the buffer memory area in the RAM 37 and makes read-out control when the audio data is read out of the HDD 32. The buffer task 62 also analyzes the header information of the audio data stored in the buffer memory. The buffer memory is controlled by the buffer task 62 as a ring buffer in which a head address and a last address have logically been connected.

The DB management task 63 manages the content data recorded in the HDD 32. For example, the DB management task 63 manages identification information (ID) to identify the content data recorded in the HDD 32, information showing a recording location of the content data, and attribute information of the content data so as to be associated with each other. The DB management task 63 also manages the artist link information. Details of the database which is managed by the DB management task 63 will be explained hereinafter.

The decoder control task 65 controls a decoding process of the audio data by the decoder 43. The control by the decoder control task 65 is made in an interlocking relation with, for example, the process by the buffer task 62.

An OS (Operating System) 68 integratedly manages the upper tasks such as UI task 60, player task 61, buffer task 62, decoder control task 65, and DB management task 63 which are located at the upper positions than the OS 68. The OS 68 also provides fundamental functions of the software to the respective tasks. For example, the OS 68 provides a file system for managing files which are recorded on the HDD 32 to each of the upper tasks. The file system makes, for example, management on a logic address unit basis of a recording area in the HDD 32, file management on the HDD 32, and the like and provides a mechanism for writing and reading data into/from the HDD 32.

The OS 68 also manages each hardware constructing the reproducing apparatus 1 and executes an intermediary process between the upper tasks and hardware 69 of the reproducing apparatus 1. For example, the OS 68 has: an HDD driver 64 to control the HDD 32; a buffer control unit 66 to make reading/writing control for the buffer memory area in the RAM 37; a decoder control unit 67 to control the decoder 43; and the like.

The OS 68 and the tasks 60 to 65 shown in FIG. 4 are realized by the operation of the microcomputer 41 according to the program stored or recorded in the ROM 42 and/or the HDD 32.

In such a construction, when the reproducing apparatus 1 and the PC 2 are connected by a USB cable, a USB controller 33 makes predetermined communication with the PC 2, thereby enabling the reproducing apparatus 1 to be recognized as a removable hard disk drive from the PC 2. That is, the PC 2 enables the content data stored in the HDD in the PC 2 to be recorded into the HDD 32 of the reproducing apparatus 1 by using a file copy function which is provided by the OS installed in the PC 2.

The content data and commands are transmitted from the PC 2 through the USB cable. The content data and the commands are received to the USB controller 33. The received content data is transferred to the HDD 32 through the bus 30 and written into the HDD 32 by the USB controller 33. The received commands are fetched from the USB controller 33 through the system gate array 36 by the microcomputer 41.

Processes upon reproduction will be described. For example, the database of the content recorded in the HDD 32 is referred to by the microcomputer 41 and a display control signal to display a list of the content is formed. The display control signal is supplied to the display control unit 35 through the system gate array 36 and the bus 34 and converted into a drive signal to drive the display unit 10. The drive signal is supplied to the display unit 10. The list of the content data which can be reproduced is properly displayed in response to the display control signal.

For example, when the user properly operates the operating unit 20 on the basis of the display of the display unit 10, the content data to be reproduced is selected. A control signal according to this operation is outputted from the operating unit 20. The microcomputer 41 monitors the control signal outputted from the operating unit 20. When the control signal indicative of the reproduction instruction is received, the microcomputer 41 issues a command to instruct the reading of the content data whose reproduction has been instructed. This command is transmitted to the HDD 32 through the system gate array 36 and the bus 30.

The content data read out of the HDD 32 is supplied to the system gate array 36 through the bus 30. The system gate array 36 stores the supplied content data into the buffer memory area in the RAM 37. The system gate array 36 reads out the content data stored in the buffer memory area in the RAM 37 every predetermined amount and transfers it to the decoder 43. The microcomputer 41 monitors an amount of content data stored in the buffer memory area in the RAM 37. When the amount of stored data is equal to or less than a predetermined amount, the microcomputer 41 issues a command to the HDD 32 so as to read out the content data through the system gate array 36 and the bus 30.

The decoder 43 decodes the transferred content data and transfers the decoded data as audio data of a base band to the microcomputer 41. The microcomputer 41 executes a predetermined audio process as necessary to the audio data transferred from the decoder 43. The processed data is D/A converted by the DAC 44 and outputted as an analog audio signal. The analog audio signal is supplied to the HP amplifier 45, amplified, and sent to the remote control terminal 47.

The database to manage the content data recorded in the HDD 32 will now be described. This data base is managed by the foregoing DB management task 63. FIG. 5 shows a construction of an example of an attribute information table to manage the attribute information of the content data in the database. In the example of FIG. 5, a record of the attribute information table includes: a field "content ID"; a field "album ID"; a field "genre ID"; a field "artist ID"; a field "reproduction history"; and a field "ranking information".

In the example of FIG. 5, as a value which is stored into each field of the record, pointer information for real data is stored as an ID. For example, the pointer information to a record of another table in which the real data is stored is stored into each field. A relational database is formed as a whole. The content ID is set to a value which is unique every content data. Each record in the attribute information table is associated with the real content data by the content ID. The construction of the database is not limited to such an example but the real data may be stored into each field other than the field "content ID".

In the attribute information table, "1" is added to the field "reproduction history" each time the content data associated with the relevant record is reproduced. It is preferable that the ranking information can be updated at predetermined timing. For example, there is also considered a method whereby when new content data is downloaded into the PC 2 from the music server 4, the ranking information for each of the content data stored in the PC 2 is also downloaded, and when the content data is transferred from the PC 2 to the reproducing apparatus 1, the ranking information is also transferred and the database is updated.

The DB management task 63 further manages the artist link information. The artist link information is information in which, for example, a certain artist A is associated with information of related artists B, C, . . . . For instance, in the case where the artist A produced an album Z in cooperation with the artists B and C, the artists B and C can be assumed to be the related artists of the artist A. Other artists may be associated on the basis of a style or the like of the artist A. For example, other artists are associated on the basis of a melody or a tempo of the main content of the artist A. Further, other artists may be also associated on the basis of the era or the like when the artist A who was actively involved. Moreover, the information of the artist may be also associated on the basis of a plurality of information related to the artist or the content of this artist.

The artist link information can be set step by step in accordance with a relation degree to the target artist. For example, first artist link information including the information of artists B, C, D, . . . having the strong relationship with the artist A and second artist link information including the information of artists O, P, Q, . . . having the weak relationship are associated. For instance, those two kinds of tables are formed for the respective artist information which is managed in the DB management task 63. There is also considered a method whereby all of artist information which are managed in the DB management task 63 are arranged in a matrix form and a relation degree is set for each artist information in the matrix. The construction of the artist link information is not limited to those examples.

The artist link information is provided to the user side as a service of, for example, the music server 4 side, downloaded to the PC 2 from the music server 4 through the Internet 3, transferred from the PC 2 to the reproducing apparatus 1, and recorded into the HDD 32. For instance, the list of the content recorded in the HDD of the PC 2 and the list of the content recorded in the HDD 32 of the reproducing apparatus 1 are transmitted from the PC 2 to the music server 4. The music server 4 forms the artist link information with reference to the attribute information on the basis of the lists of the content and transmits it to the PC 2. The invention is not limited to such an example but the artist link information can be also formed on the user side.

1-3. Schematic Operation of Preview Reproduction

In the embodiment of the invention, in the foregoing content selecting operation, if the cursor indication remains for a predetermined time or longer at the position corresponding to the display showing certain content with the cursor indication, predetermined portions of the relevant content are automatically reproduced. The operation to selectively reproduce only the predetermined portions of the content is called "preview reproduction" and the operation to reproduce the content with respect to the whole length of the content as a target is called "normal reproduction" hereinbelow. A method of the preview reproduction will be explained hereinafter.

Figure 6:
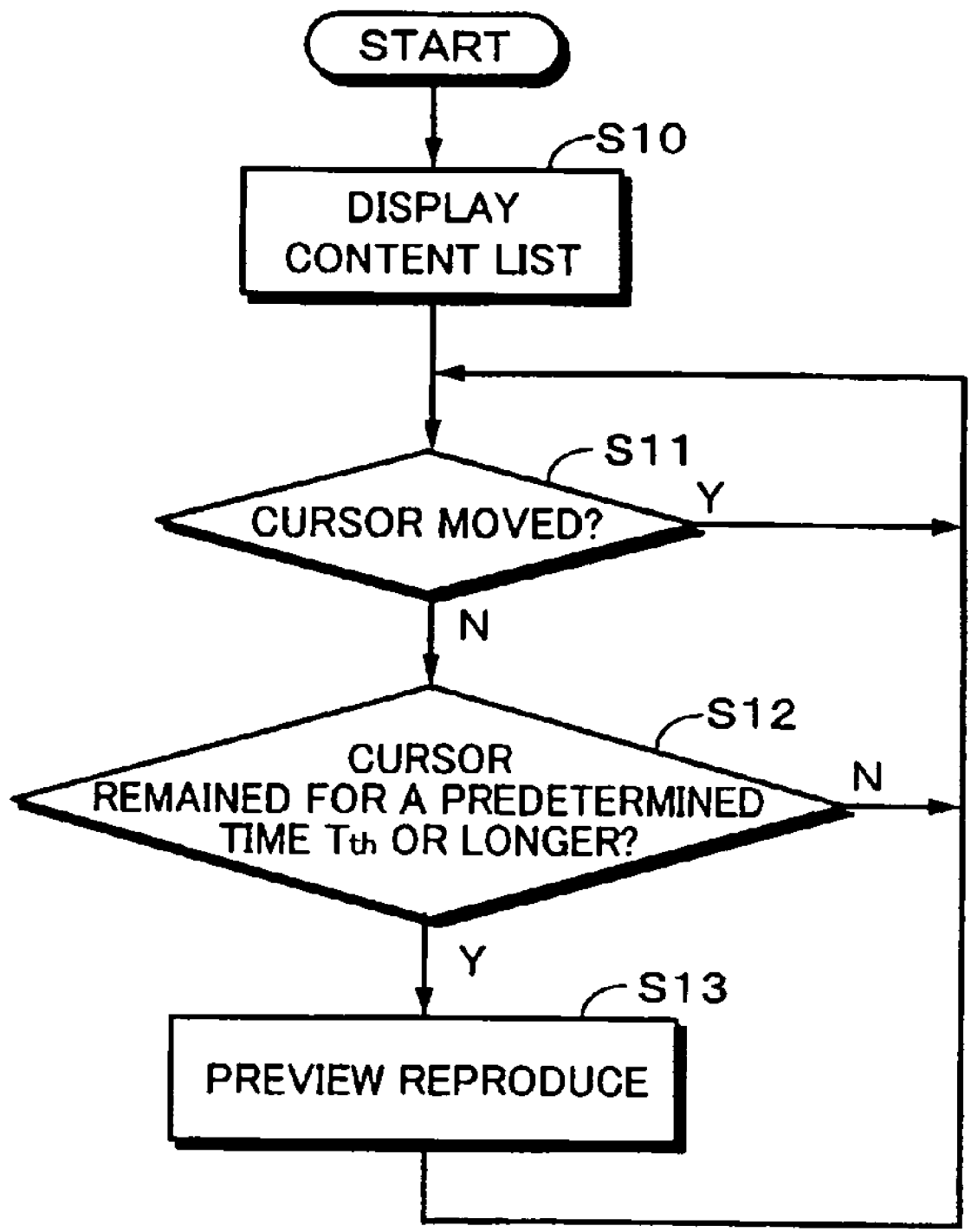
FIG. 6 is a flowchart showing an example of processes for automatically starting preview reproduction.
Figure 7A:
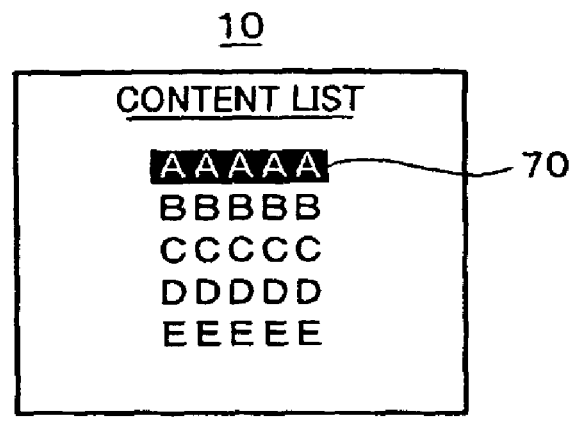
FIGS. 7A to 7D are schematic diagrams showing the display of an example of a display unit corresponding to the flowchart.

FIG. 6 shows a flowchart of an example of processes for automatically starting the preview reproduction. FIGS. 7A to 7D show the display of an example of the display unit 10 corresponding to the flowchart of FIG. 6. The content list is displayed in the display unit 10 (step S10). For example, as shown in FIG. 7A, the list of the content names is displayed in the display unit 10 and the cursor indication 70 is displayed at the initial position.

The cursor indication 70 is displayed by a method whereby, for example, the display control signal which has been formed by the microcomputer 41 and allows the cursor to be displayed at a predetermined position is supplied to the display control unit 35 through the system gate array 36 and the bus 34, and the display unit 10 is driven on the basis of the display control signal in the display control unit 35. The position of the cursor indication 70 is moved and designated by, for example, operating the upper and/or lower direction key(s) or the like in the key 13.

In the example of FIGS. 7A to 7D, the cursor indication 70 is realized by inversion-displaying a display color of the content name. The displaying method of the cursor indication 70 is not limited to such an example. That is, it is sufficient that the cursor indication is performed at the position corresponding to the content name. For instance, by displaying a predetermined mark to the head of the content name, the cursor indication can be realized.

Whether or not the cursor indication 70 has been moved is discriminated in step S11. For example, if the key inputs of the upper direction key, lower direction key, and the like in the key 13 are not performed by the user and the cursor indication 70 is not moved, a time T during which the cursor indication 70 remains at the position of an arbitrary content name is measured by the microcomputer 41 and whether or not the time T is equal to or longer than a predetermined time Tth is discriminated in step S12. For example, with reference to FIG. 7B, if the cursor indication 70 has been moved to the position of the content name "CCCCC", the microcomputer 41 starts the measurement of the time T on the basis of an output of the real-time clock (RTC) 46 and discriminates whether or not the cursor indication 70 has been moved from the position of the content name "CCCCC" to another position before the time T exceeds the predetermined time $T_{th}$.

The predetermined time $T_{th}$ is set to, for example, about 0.5 second. It is preferable that the value of the predetermined time $T_{th}$ can be changed by the user.

Figure 7B:
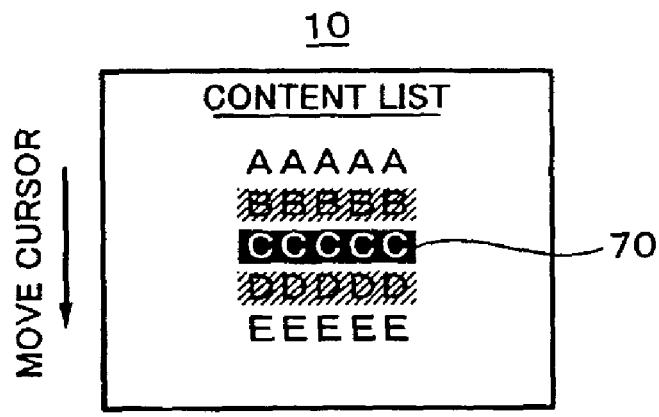

If it is determined in step S12 that the time T is equal to or longer than the predetermined time $T_{th}$, the processing routine advances to step S13. In step S13, a part of the content corresponding to the position of the present cursor indication 70 is reproduced. For example, if the cursor indication 70 moved to the position of the content name "CCCCC" as shown in FIG. 7B has remained at the position of the content name "CCCCC" for the predetermined time $T_{th}$ or longer as shown in an example in FIG. 7C, a part of the content data corresponding to the content name "CCCCC" is reproduced. The content shown by the content name "CCCCC" is preview-reproduced.

In the preview reproduction, for example, only the data of a predetermined time (for example, 10 seconds) from the head of the content data is reproduced. In this instance, the reproduction may be stopped at the timing when the data of the first predetermined time in the whole length of the real content data has been reproduced or it is also possible to form a dedicated file for the preview reproduction and reproduce this file. Further, the preview reproducing position which is extracted from each content may be different every content. For example, when the content data is recorded into the HDD 32, the dedicated file for the preview reproduction can be automatically formed.

When the preview reproduction of certain content is finished, the preview reproduction of content locating at the next position can be automatically started. In the example of FIGS. 7A to 7D, if the preview reproduction of the content name "CCCCC" has been finished and the cursor indication 70 is not moved, the preview reproduction of the content shown by the next content name "DDDDD" can be automatically started.

The cursor indication 70 can be also moved by executing the key operation during the preview reproduction. Also in this case, if the cursor indication 70 remains for the predetermined time $T_{th}$ or longer at the position of the content name of the moving destination side, the content corresponding to the position of the cursor indication 70 may be preview-reproduced.

Figure 7C:
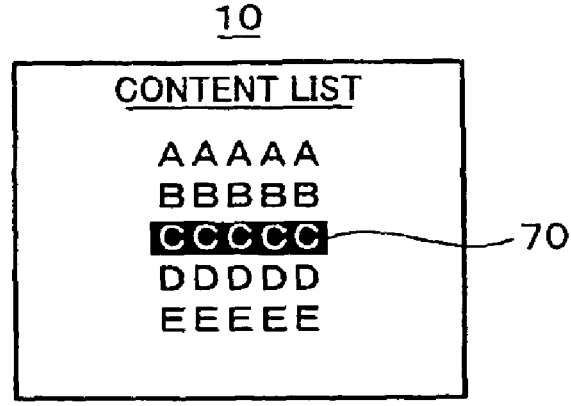

For example, with reference to FIG. 7C or the like, the cursor indication 70 is moved by executing the key operation when the cursor indication 70 exists at the position of the content name "CCCCC" and this content is being preview-reproduced. The cursor indication 70 is made to pass through the position of the content name "DDDDD" within the predetermined time $T_{th}$, is moved to a position of the content name "EEEEE", and is allowed to remain here. The microcomputer 41 measures the remaining time T of the cursor indication 70. When the time T is equal to or longer than the predetermined time $T_{th}$, the preview reproduction of the content shown by the content name "CCCCC" is stopped and the preview reproduction of the content shown by the content name "EEEEE" is started.

Figure 7D:

By executing the operation to determine the selected content during the preview reproduction, the reproduction of the content can be shifted from the preview reproduction to the normal reproduction. When the reproduction is shifted from the preview reproduction to the normal reproduction, for example, the display of the display unit 10 is switched to the display showing that the normal reproduction is at present being executed as shown in the example in FIG. 7D. In the example of FIG. 7D, the state where the normal reproduction is being executed is shown by a text "Now Playing" and the attribute information of the content name "CCCCC" which is being reproduced is displayed.

The processes which are executed in the case where the deciding operation of the content selected by, for example, operating the enter key 13A or the like is executed during the preview reproduction and the reproducing method of the content is switched from the preview reproduction to the normal reproduction will be considered. In this case, as a reproducing method by the normal reproduction, the following two kinds of methods are considered: a first method of starting the reproduction from the head of the content data which has been preview-reproduced; and a second method of continuously reproducing from the position where the preview reproduction has been stopped.

Figure 8A:
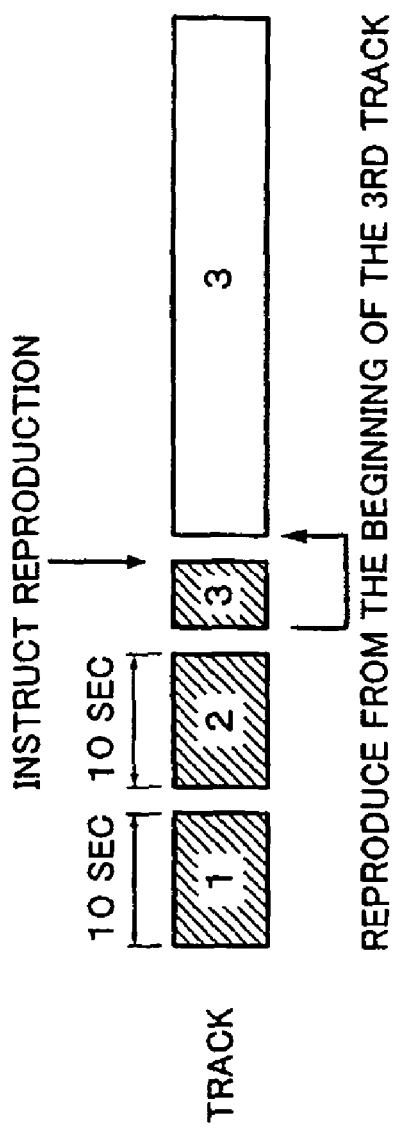
FIGS. 8A and 8B are schematic diagrams for explaining processes at the time when a reproducing mode is switched from the preview reproduction to normal reproduction.
Figure 8B:
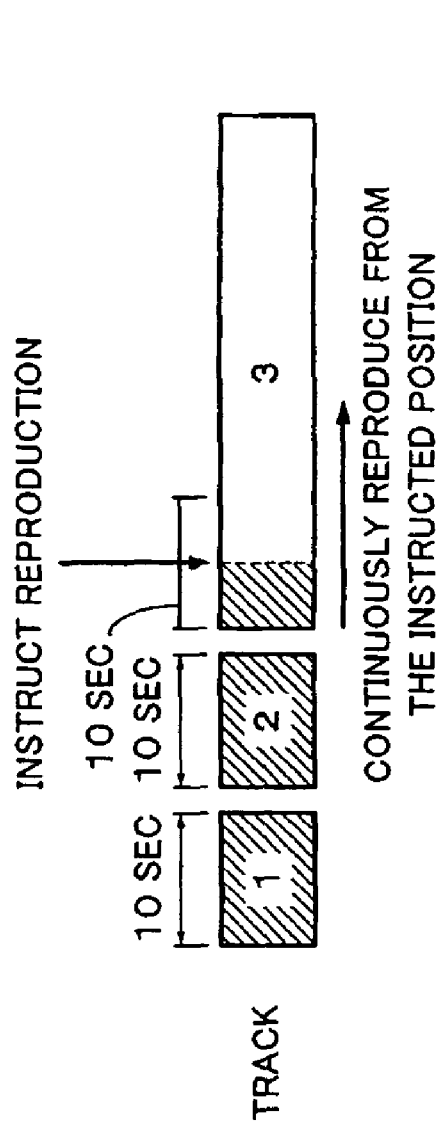

Explanation will be schematically made with reference to FIGS. 8A and 8B. There is considered the case where the time of the preview reproduction is set to 10 seconds from the head of the content data, the content data of the first, second, and third tracks has sequentially and automatically been preview-reproduced, and the deciding operation has been executed during the preview reproduction of the third track.

According to the above first method, as shown in an example in FIG. 8A, when the deciding operation is executed by, for example, operating the enter key 13A or the like during the preview reproduction of the third track (the reproduction is instructed), the preview reproduction of the third track is stopped at a point of time when the deciding operation has been executed. After the elapse of a predetermined time, the content data of the third track is reproduced from the head with respect to the whole length of this content data as a target.

According to the above second method, as shown in an example in FIG. 8B, when the deciding operation is executed during the preview reproduction of the third track, the preview reproduction is stopped at a point of time when the deciding operation has been executed. The content data corresponding to the content which is being preview-reproduced is continuously reproduced in response to the stop of the preview reproduction from the position corresponding to the position where the preview reproduction has been stopped.

Although the embodiment of the invention has been described above on the assumption that the list of the content recorded in the HDD 32 is directly displayed in the display unit 10, the invention is not limited to such an example. That is, hundreds to thousands of content data can be recorded in the HDD 32. The desired content can be easily searched for from such a large amount of data owing to the automatic preview reproduction based on the remaining time of the cursor indication 70 mentioned above and by using the attribute information of the content.

1-4. Schematic Operation of an Artist Link Mode

As an application example of the preview reproduction, the selecting method using the artist link information mentioned above will now be described. The mode of selecting the content by using the artist link information is called "artist link mode" hereinbelow.

Figure 9:
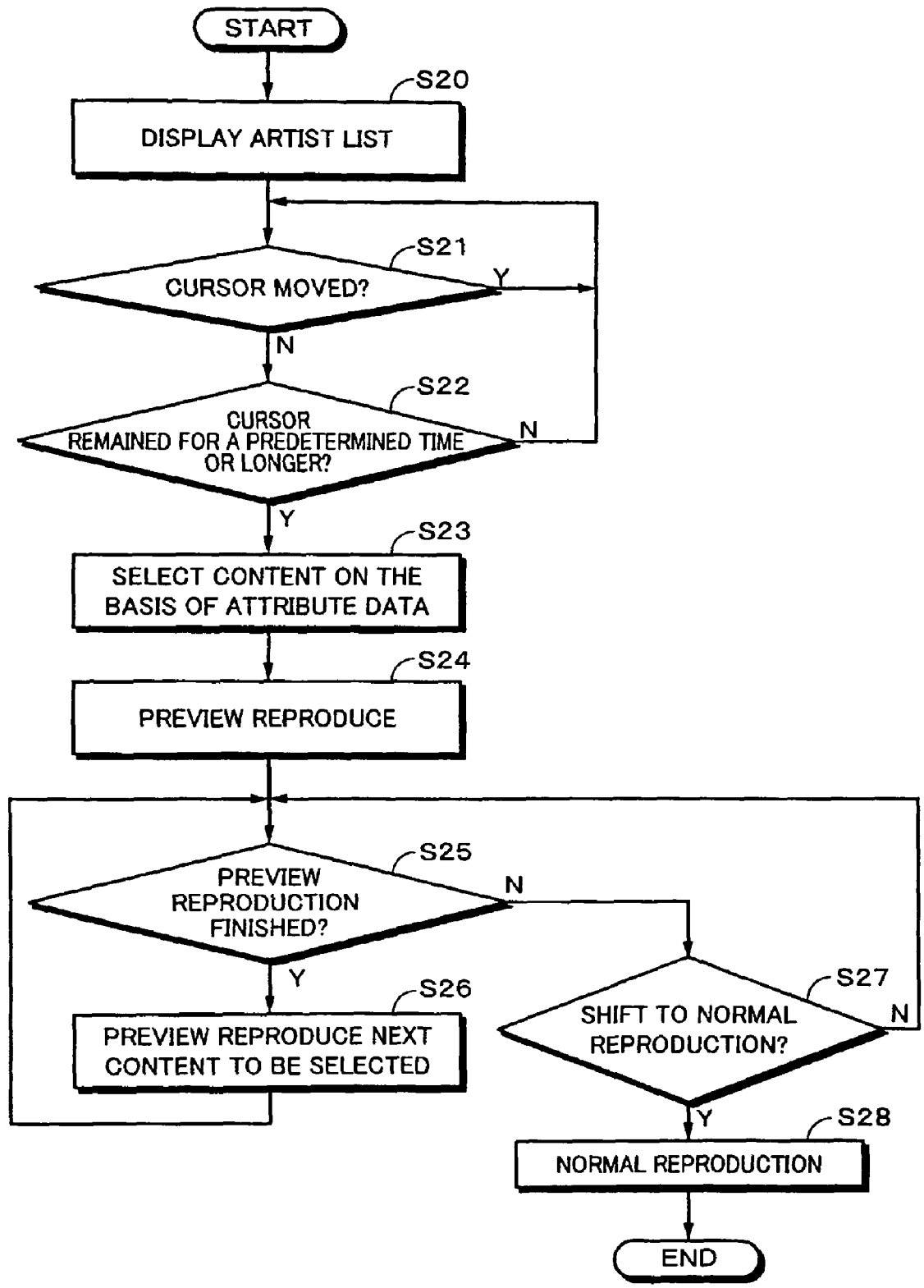
FIG. 9 is a flowchart showing processes of an example in an artist link mode.

FIG. 9 is a flowchart showing processes of an example in the artist link mode. FIGS. 10A to 10C and FIGS. 11A to 11D show an example of a transition of the display of the display unit 10 according to the processes shown in FIG. 9. First, it is assumed that the reproduction operating mode of the reproducing apparatus 1 is the normal reproducing mode and content X of the artist A is normally being reproduced. For example, the discovery key 14 of the operating unit 20 is now operated and the artist link mode is activated. When the artist link mode is activated, the artist link information is referred to by the microcomputer 41. As shown in the example in FIG. 10A, the display of the display unit 10 is switched to an artist link display screen and a list of the artists B, C, . . . related to the artist A is displayed in a list display unit 71A together with the artist A (step S20).

In this example, the artist names are sorted in order from the larger number of content recorded in the HDD 32 with reference to the attribute information table and the list of them is displayed. The cursor indication 70 is displayed at the position of the artist A. The content information which is being reproduced at present is displayed in a reproduction content display unit 71B. The sorting order of the artist names is not limited to this example. While the cursor indication 70 is displayed at the position of the artist A, the normal reproduction of the content (in this example, the content X of the artist A) reproduced in the normal reproducing mode just before the artist link mode is activated is continued.

Figure 10A:
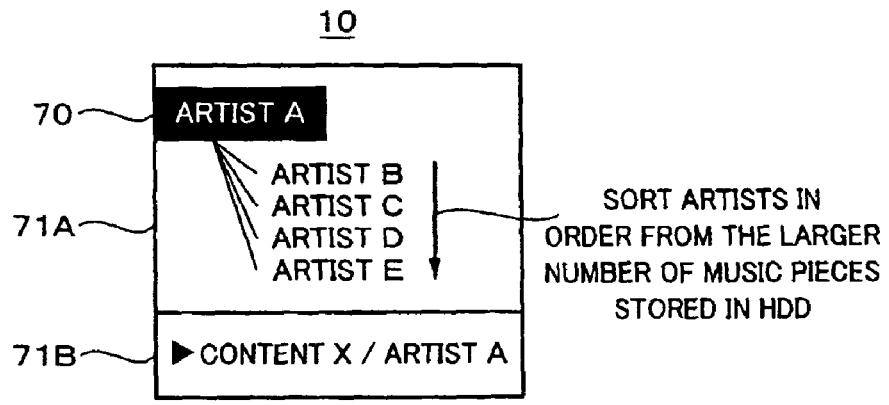
FIGS. 10A to 10C are schematic diagrams showing am example of a transition of the display according to the processes in the artist link mode.
Figure 10B:
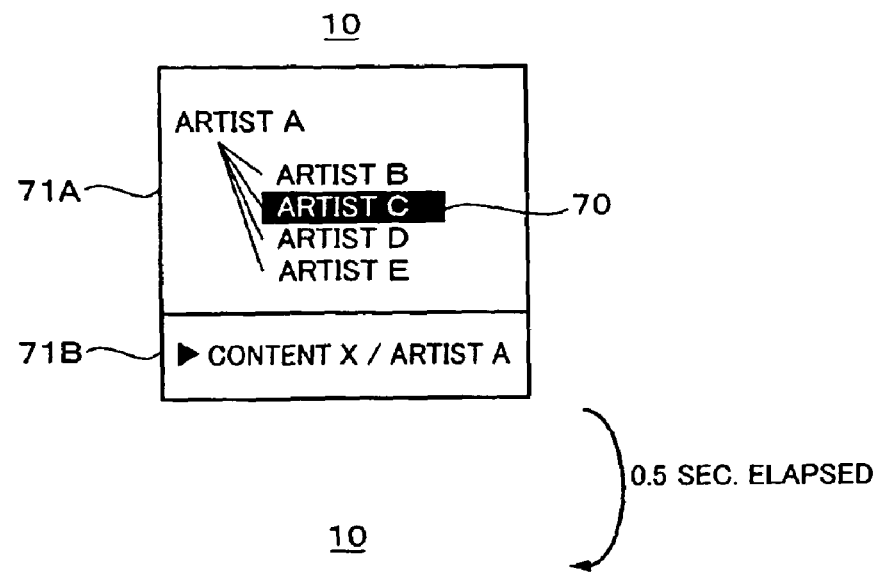

By operating, for example, the lower direction key in the key 13 in this state, as shown in the example in FIG. 10B, the cursor indication 70 is moved to the positions of the related artists B, C, . . . (step S21) and the operating mode is shifted to the preview reproducing mode. In the example in FIG. 10B, the cursor indication 70 passes through the position of the artist B within the predetermined time $T_{th}$ (for example, 0.5 second) in accordance with the user's operation of the lower direction key and remains at the position of the artist C.

On the basis of the measurement result of the microcomputer 41, whether or not the cursor indication 70 has remained at the position of the artist C for the predetermined time $T_{th}$ or longer is discriminated (step S22). If it is determined that the remaining time T is equal to or longer than the predetermined time $T_{th}$, the processing routine advances to step S23. In step S23, the content is automatically selected from the content data related to the item where the cursor indication 70 is located on the basis of a predetermined rule with reference to the attribute information table.

As an example, with reference to FIG. 10B, it is assumed that the cursor indication 70 is located at the position of the item "artist C" and content P, Q, R, and S have been recorded as content of the artist C in the HDD 32. The content P, Q, R, and S are sorted in order from the higher rating degree on the basis of the attribute information table. The field "reproduction history" in the attribute information table is used as an item of the rating target and the content is sorted in order from the higher reproduction frequency. The invention is not limited to such an example but the content may be sorted in order from the higher popularity by using the field "ranking information" in the attribute information table. A favorite degree based on the number of reproducing times or the number of skipping times of each content obtained from the reproduction history can be also used as a rating degree. It is preferable that the user can properly set the item of the rating target. In step S23, for example, the content P of the highest rating degree is automatically selected.

Figure 10C:
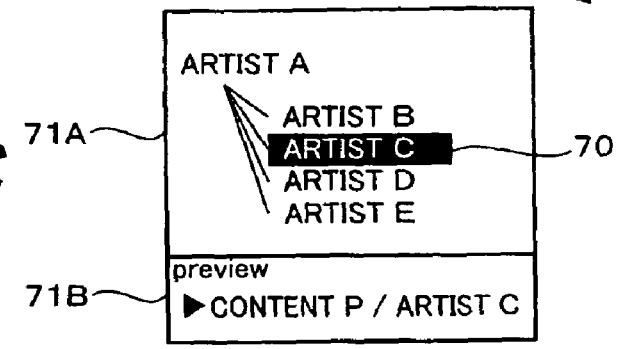

The selected content P is preview-reproduced in next step S24. The display of the display unit 10 keeps the artist link display screen and the display of the reproduction content display unit 71B is changed to the display showing the content which is being preview-reproduced (FIG. 10C).

Figure 11A:
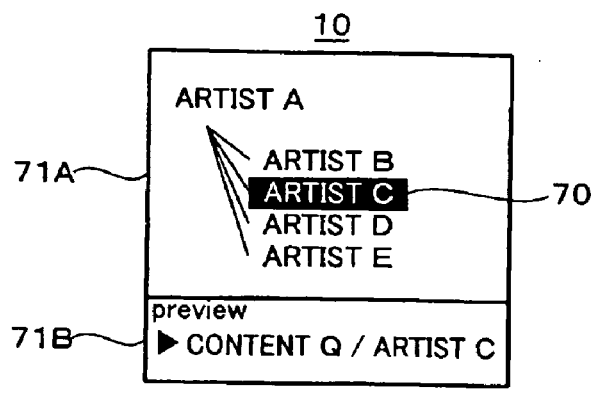
FIGS. 11A to 11D are schematic diagrams showing an example of the transition of the display according to the processes in the artist link mode.

In next step S25, whether or not the preview reproduction of the content P has been finished in the state where the cursor indication 70 remains at the position of the artist A is discriminated. If it is determined that the preview reproduction has been finished, the processing routine advances to step S26 and the content to be selected next is automatically preview-reproduced. For example, the content (assumed to be the content Q) having the highest rating degree next to that of the content P is automatically preview-reproduced. The display of the display unit 10 keeps the artist link display screen and the display of the reproduction content display unit 71B is changed to the display showing the content which is being preview-reproduced (FIG. 11A). The processing routine is returned to step S25.

Figure 11B:
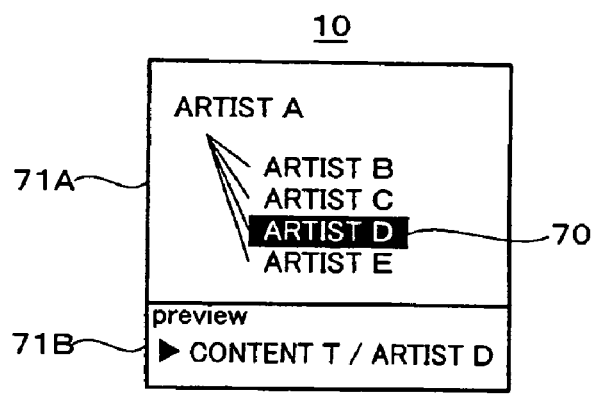

If all of the content recorded in the HDD 32 regarding the artist C at the position where the cursor indication 70 remains have been preview-reproduced by repeating the processes of steps S25 and S26, the content of the next artist (for example, the artist D) is automatically preview-reproduced. In this instance, the display of the display unit 10 keeps the artist link display screen and in the list display unit 71A, the cursor indication 70 is automatically moved to the position corresponding to the artist D (FIG. 11B). The display of the reproduction content display unit 71B is changed to the display showing the content T which is being preview-reproduced.

If it is determined in step S25 that the preview reproduction is being executed, the processing routine advances to step S27 and whether or not the reproducing mode is shifted from the preview reproducing mode to the normal reproducing mode is discriminated.

Figure 11C:
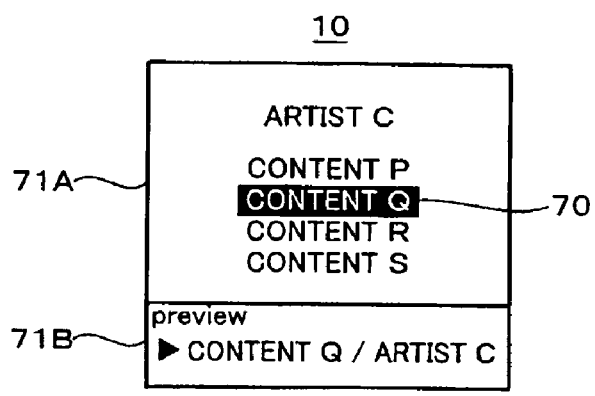
Figure 11D:
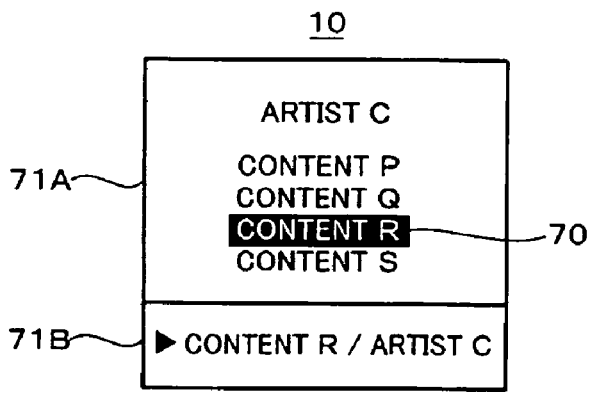

For example, when the deciding operation is executed by operating, for instance, the enter key 13A or the like in the state of FIG. 11A, the display of the display unit 10 is switched to a content list display screen shown in the example in FIG. 11C, thereby setting the state where the content of the artist C can be selected. In the content list display screen, a list of the content of the artist C is displayed in the list display unit 71A and the content which is being preview-reproduced at present is shown in the reproduction content display unit 71B.

When the deciding operation of the content is further executed by operating, for instance, the enter key 13A or the like in the state of FIG. 11B, it is determined that the reproducing mode is shifted to the normal reproducing mode. In next step S28, the content Q which is being preview-reproduced at present is normally reproduced. The display of the display unit 10 keeps the content list display screen and the display of the reproduction content display unit 71B is changed to the display showing the content in which the normal reproduction has been selected (FIG. 11C). When the content Q is normally reproduced, "1" is added to the field "reproduction history" in the record corresponding to the content Q in the attribute information table.

If the normal reproduction is not instructed, the processing routine is returned to step S25 and the preview reproduction is continued. If the cursor indication 70 is not moved even if the preview reproduction of the content Q has been finished, the preview reproduction of the content R having the next high rating degree is automatically started and the cursor indication 70 is moved to the position of the content R.

If it is also determined in step S25 that the preview reproduction is being executed, the cursor indication 70 is moved in the state where the artist link display screen of FIG. 11A has been displayed, thereby enabling another artist to be selected. That is, if it is determined in step S25 that the preview reproduction is being executed and, further, the cursor indication 70 has been moved, the processing routine is returned to step S25. The preview reproduction can be similarly executed with respect to the content of the artist corresponding to the position of the cursor indication 70.

According to the embodiment of the invention as mentioned above, merely by moving the cursor indication 70 onto the artist name and allowing the cursor indication 70 to remain there for the predetermined time, the content of the artist which has been recorded in the HDD 32 and where the cursor indication 70 is located can be automatically preview-reproduced.

2. More Specific Operation in the Artist Link Mode

The operation in the artist link mode will now be described with respect to the specific example. As mentioned above, the artist link information can be formed step by step in accordance with the relation degree to the artist. It is assumed hereinbelow that the artist link information is formed by two stages: the first artist link information having the strong relationship with a certain artist; and the second artist link information having the weak relationship with such an artist.

Figure 12:
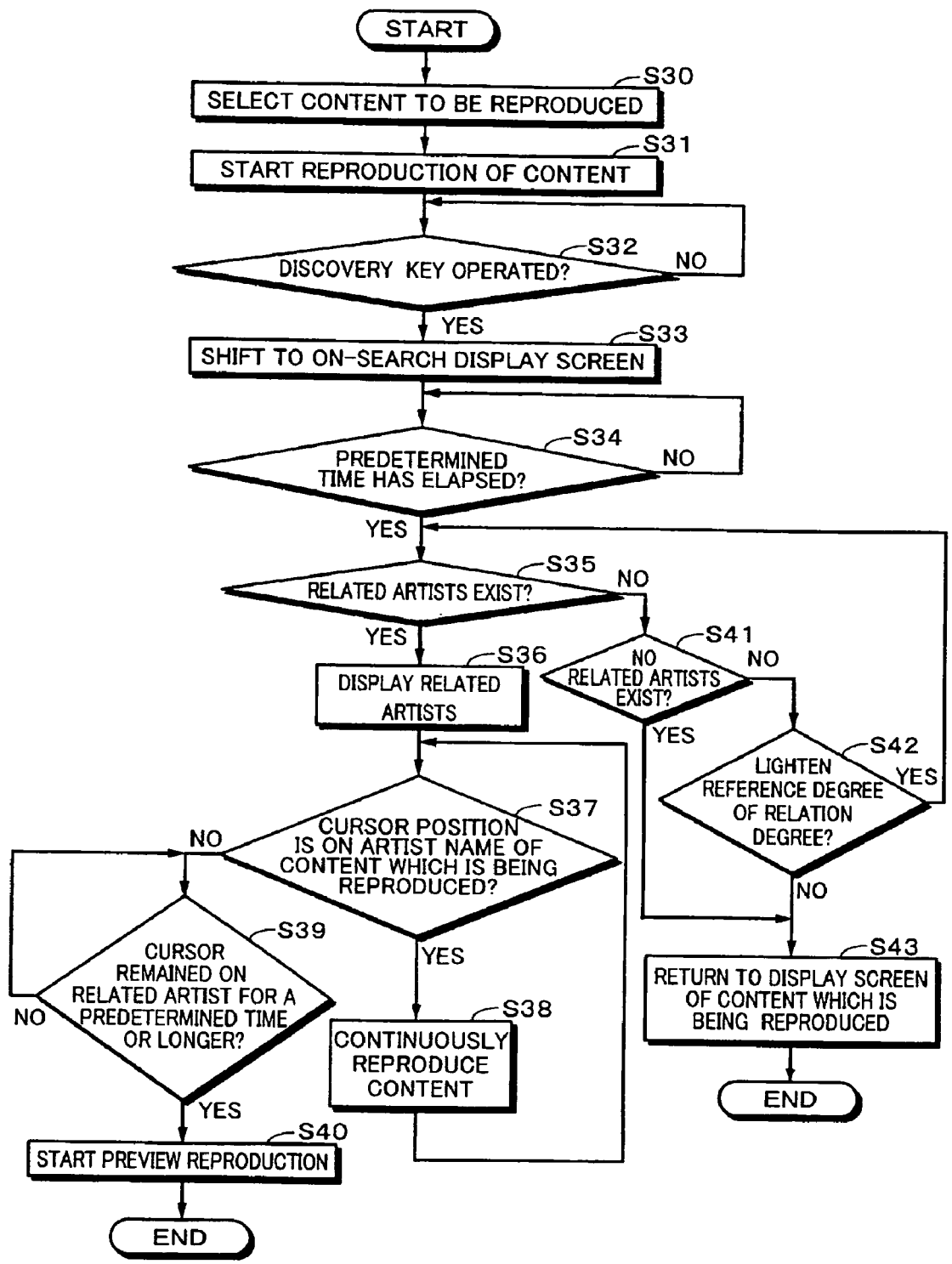
FIG. 12 is a flowchart showing processes of an example in the case where the artist link mode is activated during the reproduction of certain content data.

FIG. 12 is a flowchart showing processes of an example in the case where the artist link mode is activated by operating the discovery key 14 during the reproduction of certain content data. Prior to explaining the processes in the flow chart of FIG. 12, it is assumed that the list of the content of a certain artist (assumed to be "The Police") recorded in the HDD 32 has previously been displayed in the display unit 10. In the following description, the artist ("The Police" in this example) which has been selected prior to executing the processes in the flowchart of FIG. 12 is called "target artist" and the artist described in the artist link information for the target artist is called "related artist".

In step S30, for example, the cursor indication 70 is moved by using, for example, the upper and/or lower direction key(s) in the key 13 and the content to be reproduced is selected from the content displayed on the list. When the cursor indication 70 has been moved to the position showing the content (assumed to be "Every Breath You") to be reproduced, the normal reproduction of the content data corresponding to the position of the cursor indication 70 is started by operating, for example, the enter key 13A (step S31).

Figure 13:
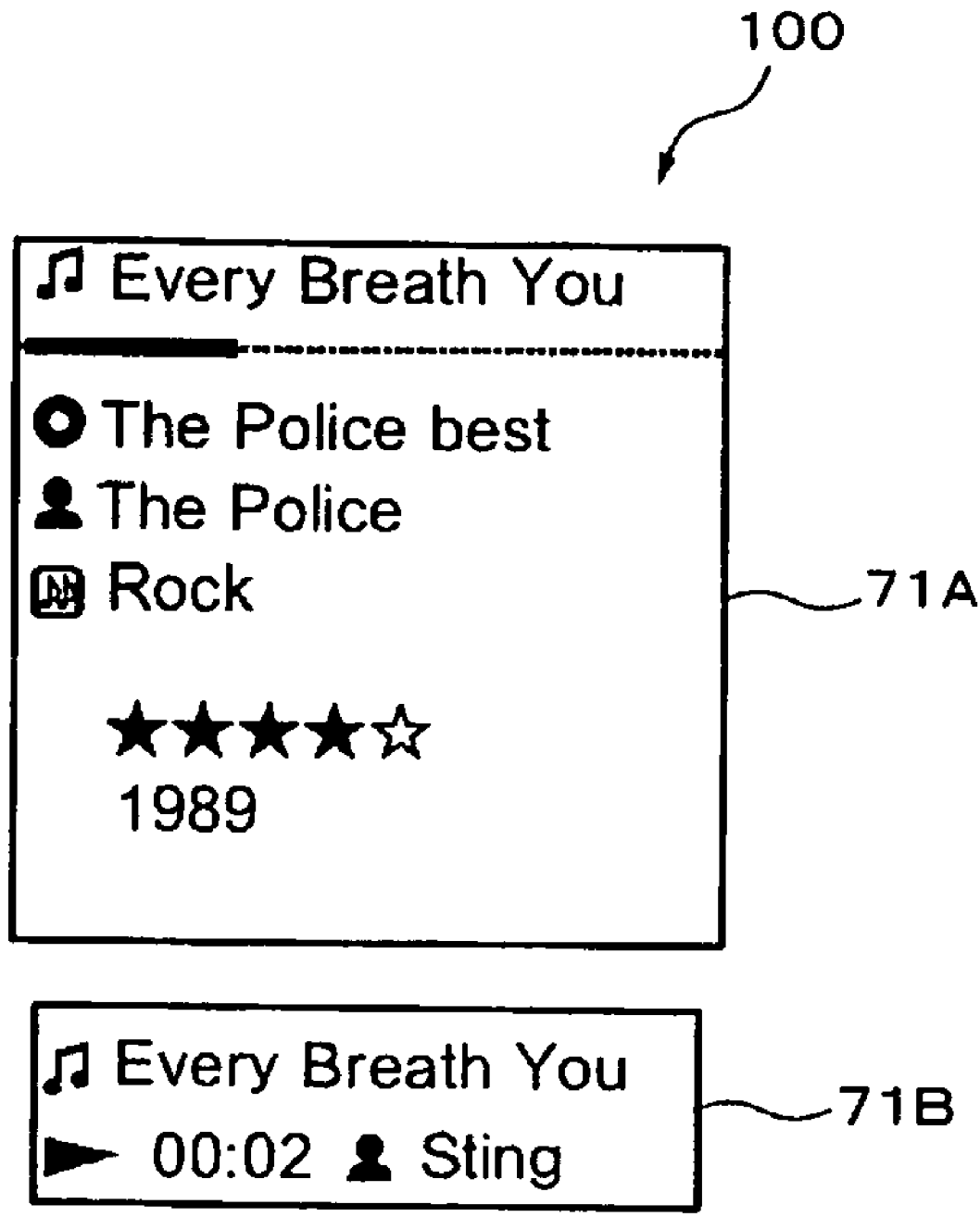
FIG. 13 is a schematic diagram showing an example of a normal reproduction display screen.

At this time, the display of the display unit 10 is changed to a normal reproduction display screen showing the normal reproduction of the content data. FIG. 13 shows an example of a normal reproduction display screen 100. As shown in the diagram, on the normal reproduction display screen, with respect to the content which is being reproduced at present, the following items are displayed in the list display unit 71A and the reproduction content display unit 71B together with icons showing the meanings of the information: a content name ("Every Breath You"); an album name ("The Police best") of the album in which such content has been recorded; an artist name ("The Police"); a genre ("Rock") to which the content data belongs; and a present reproducing time ("00:02") of the content data, respectively.

In the following example, the icon illustrated like a note shows the content name, the icon illustrated like a disk shows the album name, the icon illustrated like an upper half of the body of the human being shows the artist name, and the icon illustrated like a note surrounded by a frame shows the genre, respectively. It is assumed that the meanings of such icons are common in each of the display screens displayed in the display unit 10.

In the list display unit 71A, the rating degree of the content data which is being reproduced at present is further shown by star marks and the year when the content has been released is displayed. In the reproduction content display unit 71B, the information regarding the content data which is being reproduced at present is schematically displayed and the information indicative of the elapsed time from the start of the reproduction is displayed. Although the list display unit 71A and the reproduction content display unit 71B are separately shown in the diagrams, they are actually displayed in different areas on one display screen of the display unit 10.

If it is determined that the discovery key 14 has been operated during the reproduction of the content data (step S32), the operating mode of the reproducing apparatus 1 is shifted to the artist link mode. On the basis of the artist link information, the artist information having the strong relationship with the artist corresponding to the content data which is being reproduced at present is searched for and the display screen of the display unit 10 is changed to an on-search display screen 101 shown in an example in FIG. 14.

Figure 14:
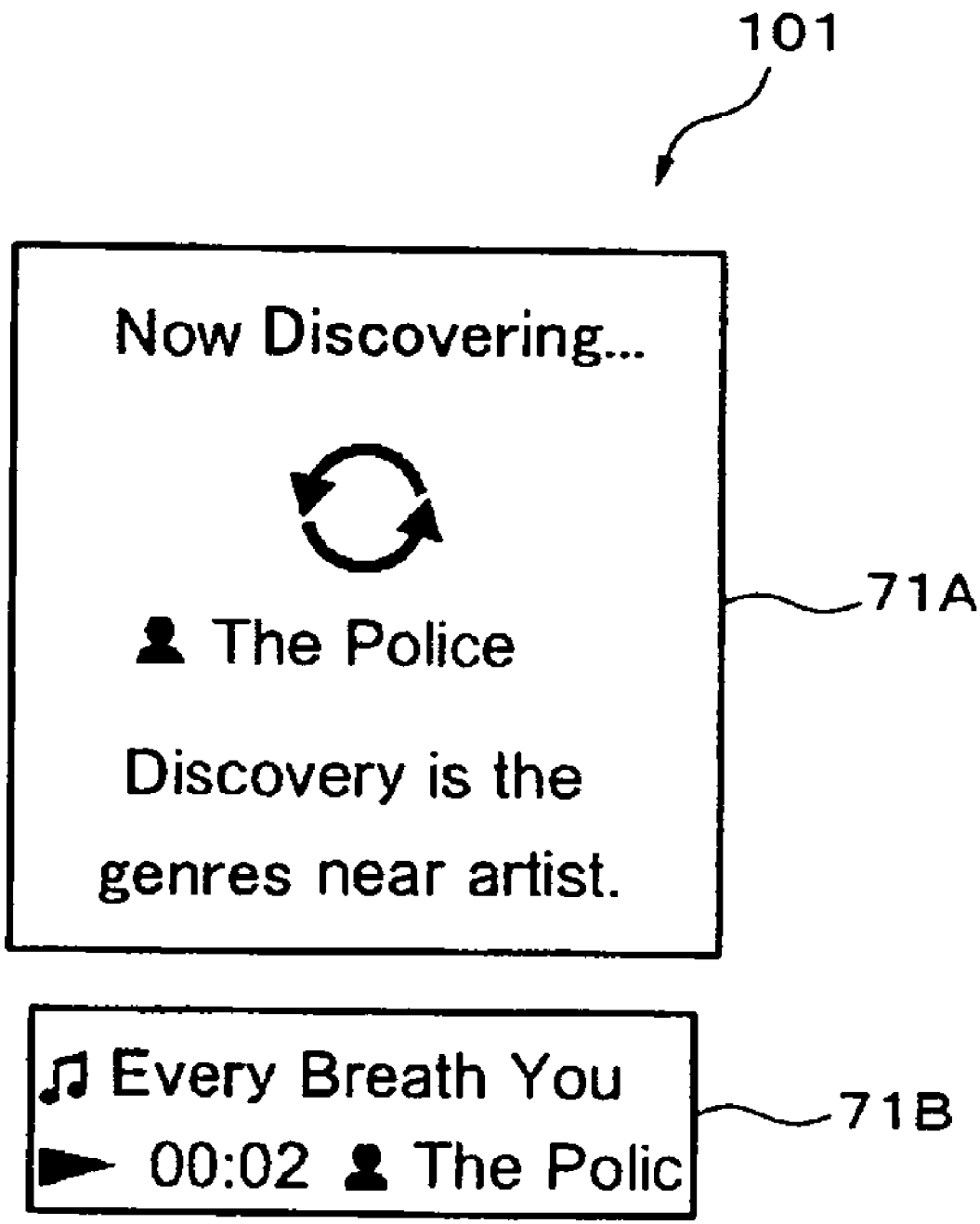
FIG. 14 is a schematic diagram showing an example of an on-search display screen.

In the on-search display screen 101, the artist name ("The Police") as a target to search for the related artists by the artist link information is shown and the state where the related artists are being searched for at present is shown by a message according to a text and an icon (two rotating semicircular arrows in the example of FIG. 14). The reproduction of the content data is continued and information showing the content which is being reproduced at present is displayed into the reproduction content display unit 71B.

If it is determined that a predetermined time has elapsed after the display of the display unit 10 was changed to the on-search display screen 101 (step S34), the processing routine advances to step S35. Whether or not the first artist link information as artist information having the strong relationship with the artist corresponding to the content data which is being reproduced at present exists is discriminated on the basis of a search result of step S33. If it is decided that the first artist link information exists, the processing routine advances to step S36.

If it is decided in step S35 that the artist information having the strong relationship does not exist, the processing routine advances to step S41. In step S41, whether or not the first artist link information according to the artist corresponding to the content data which is being reproduced at present and the second artist link information as link in formation of the related artist shaving the weak relationship with such an artist exist is discriminated. If it is decided that both of the first artist link information and the second artist link information corresponding to the target artist do not exist, the processing routine advances to step S43.

If it is determined in step S41 that the second artist link information corresponding to the target artist exists, the processing routine advances to step S42. In step S42, with respect to the artist link information corresponding to the target artist, a display screen 102 (refer to FIG. 15) to urge the user to select whether or not a reference of the relation degree is lightened is displayed in the display unit 10. In an example of FIG. 15, a text for inquiring of the user about whether or not the reference of the relation degree is lightened (the range is expanded) and the related artist link information is displayed again and a display for guiding the user to a key (for example, discovery key 14) to be operated for the above operation are displayed in the list display unit 71A in the display unit 10.

At the point of time of step S42, the reproduction of the content data is continued in the normal reproducing mode and the information showing the content which is being reproduced at present is displayed in the reproduction content display unit 71B.

In step S42, if the discovery key 14 or the enter key 13A has been operated and it is decided that the reference of the relation degree is lightened and the related artist link information is displayed again, the artist link information for the target artist is switched from the first artist link information to the second artist link information. The processing routine is returned to step S35.

If the mode in which the reference of the relation degree is not lightened has been selected in step S42, the processing routine advances to step S43. The display of the display unit 10 is returned to the display screen which shows the content which is being reproduced at present and has been described with reference to FIG. 13 and the normal reproduction of the content which is being reproduced at present is continued.

Figure 15:
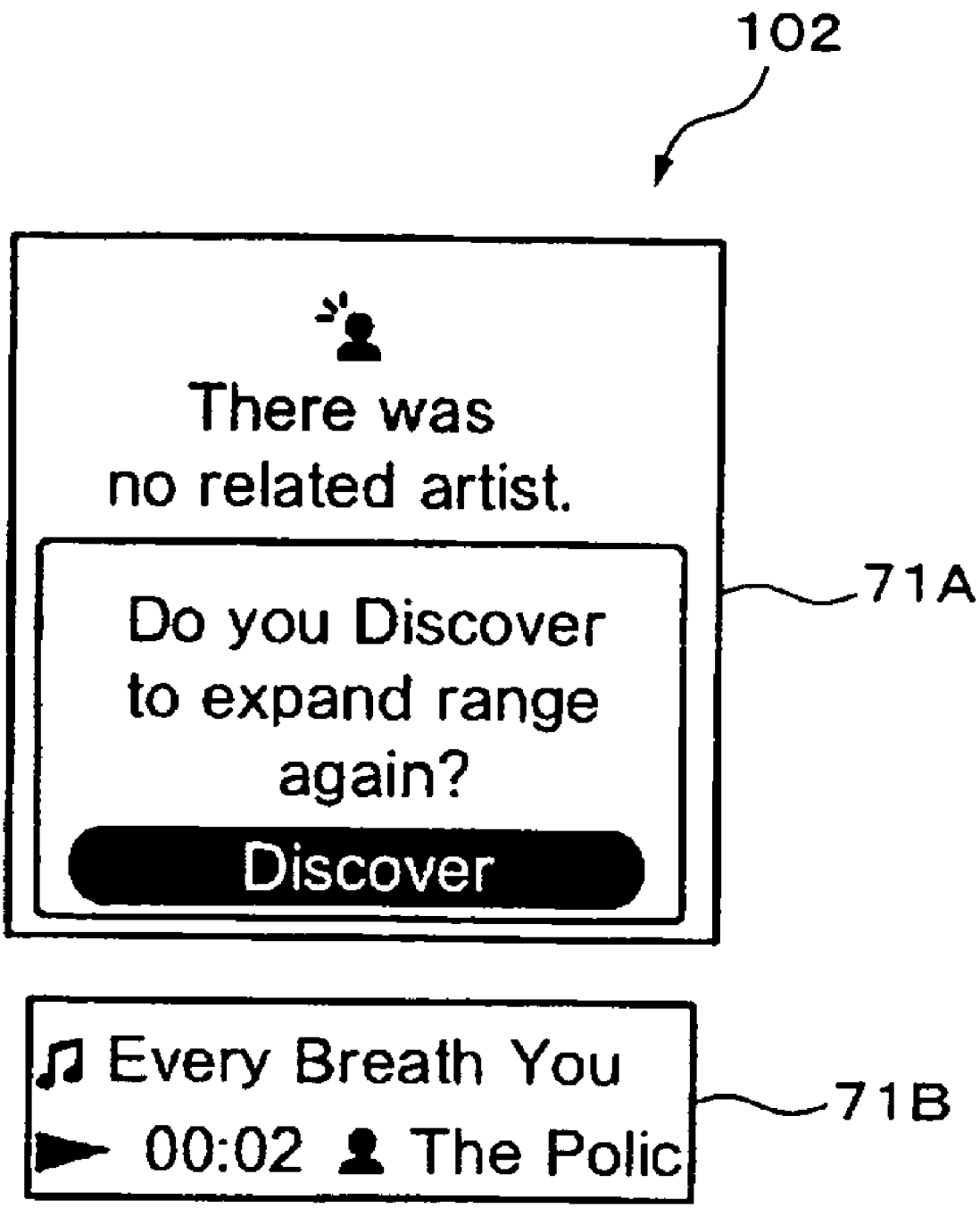
FIG. 15 is a schematic diagram showing an example of a display screen for urging the user to select whether or not a reference of a relation degree is lightened.
Figure 16:
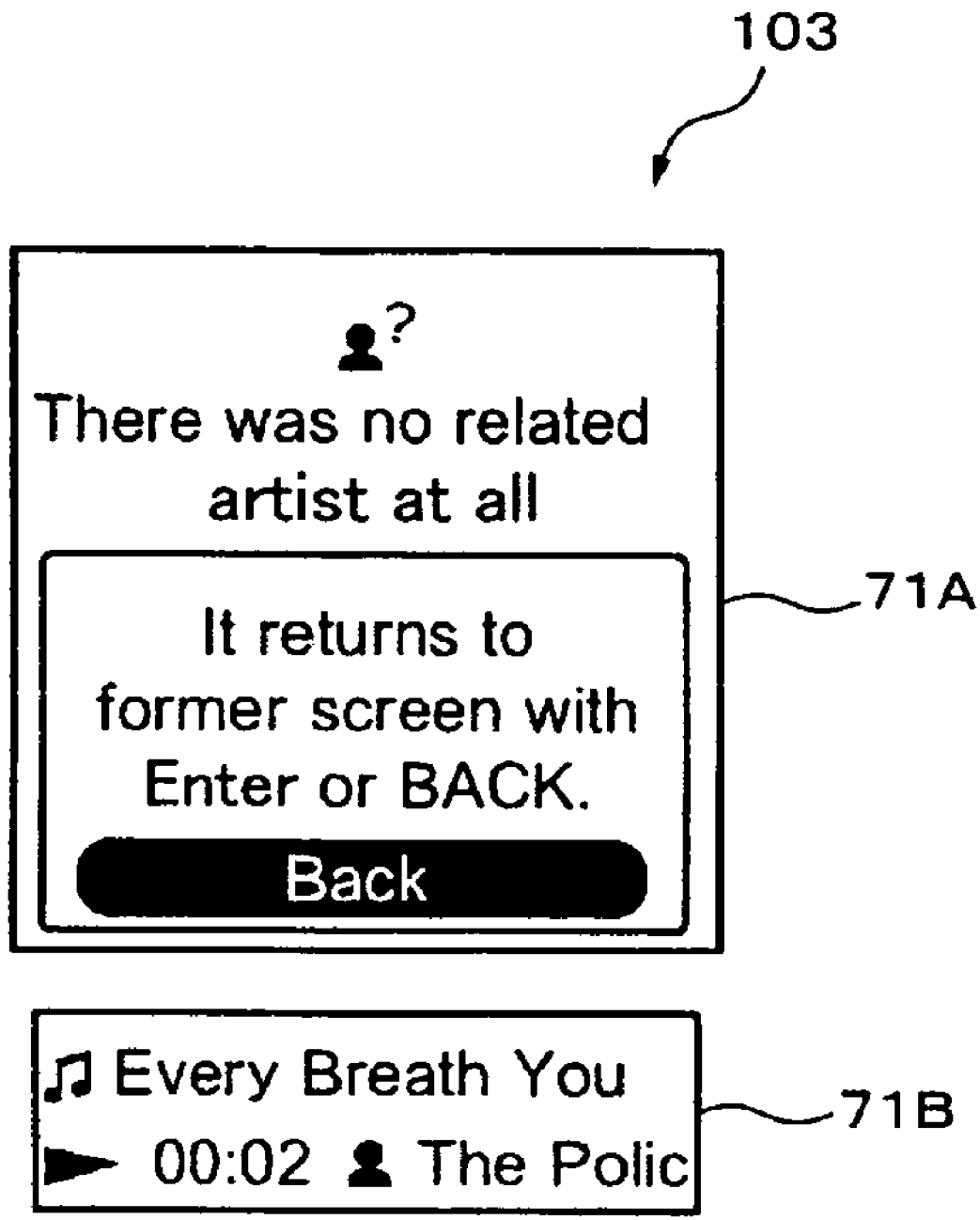
FIG. 16 is a schematic diagram showing an example of a display screen for urging the user to return the display screen to a display screen showing content which is being reproduced at present.

For example, the mode in which the reference of the relation degree is not lightened is selected by operating the key 15 by the user in the state of FIG. 15 shown in step S42 and, as shown in an example in FIG. 16, the display of the display unit 10 is changed to a display screen 103 to urge the user to return the display of the display unit 10 to the display screen showing the content which is being reproduced at present. In the example in FIG. 16, the text showing that both of the first artist link information and the second artist link information corresponding to the target artist do not exist and the display showing the key (for example, the key 15) to be operated are displayed in the list display unit 71A.

On the basis of the artist link information, if it is determined in step S35 mentioned above that the related artist information showing the related artists to the target artist exists, the processing routine advances to step S36.

Figure 17:
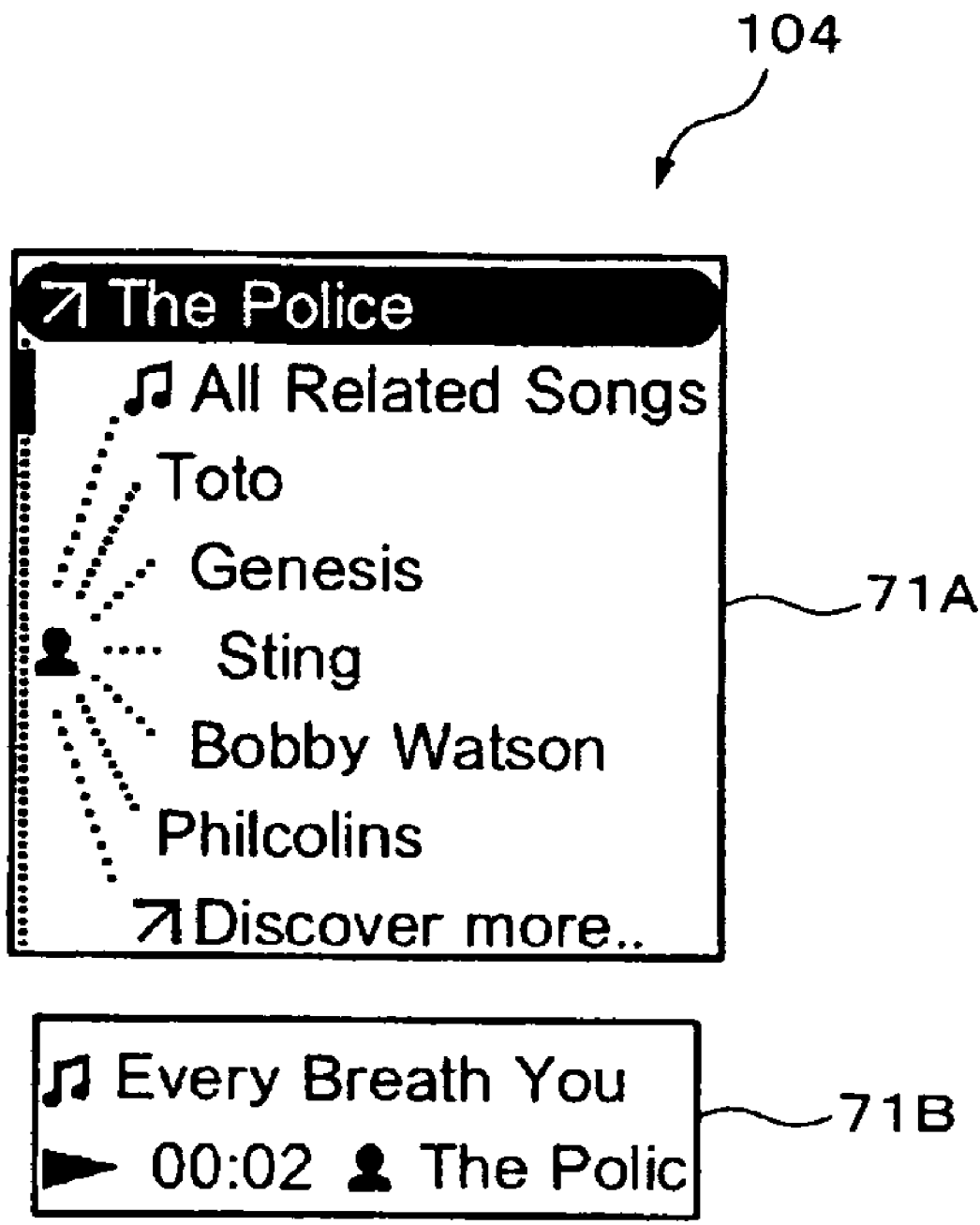
FIG. 17 is a schematic diagram showing an example of a related artist information display screen.

In step S36, the display of the display unit 10 is changed to a related artist information display screen 104 to display the related artist information as shown in an example in FIG. 17. The related artist information display screen 104 is displayed on the basis of the first artist link information or the second artist link information in accordance with the discrimination result of each of steps S35, S41, and S42 mentioned above.

In the example of FIG. 17, on the related artist information display screen 104, the artist name as a target in which the related artist information is shown is displayed in the top portion together with the cursor indication 70, and the list of the artist information of the artists which have been determined to be related to the target artist is displayed on the basis of the first or second artist link information. In the example of FIG. 17, the related artist information based on the first or second artist link information is coupled with the icon showing the target artist by dotted lines and displayed.

In the display of FIG. 17, when the artist link information to the target artist includes the artist information of the number which is equal to or larger than the number of artist information which can be displayed in one display screen, by properly operating the key in the operating unit 20, the artist information which is not displayed in the present display screen can be displayed in the display unit 10. For example, by moving the cursor indication 70 to a predetermined position in the list display unit 71A (position of a display "Discover more . . . " in the example of FIG. 17) by operating the lower direction key in the key 13, the related artist information which is displayed in the list display unit 71A is sent one by one.

In next step S37, on the related artist information display screen 104, whether or not the cursor indication 70 has been arranged to the position of the artist name corresponding to the content data which is being reproduced at present is discriminated. That is, on the basis of the display of the related artist information display screen 104, the user can move the cursor indication 70 to the position of the desired related artist by operating, for example, the upper direction key and the lower direction key in the key 13. If the cursor indication 70 exists at the position of the initial artist name ("The Police" in this example) in which the related artist information display screen has been displayed, the normal reproduction of the content data which is being reproduced at present is continued (step S38).

Figure 18A:
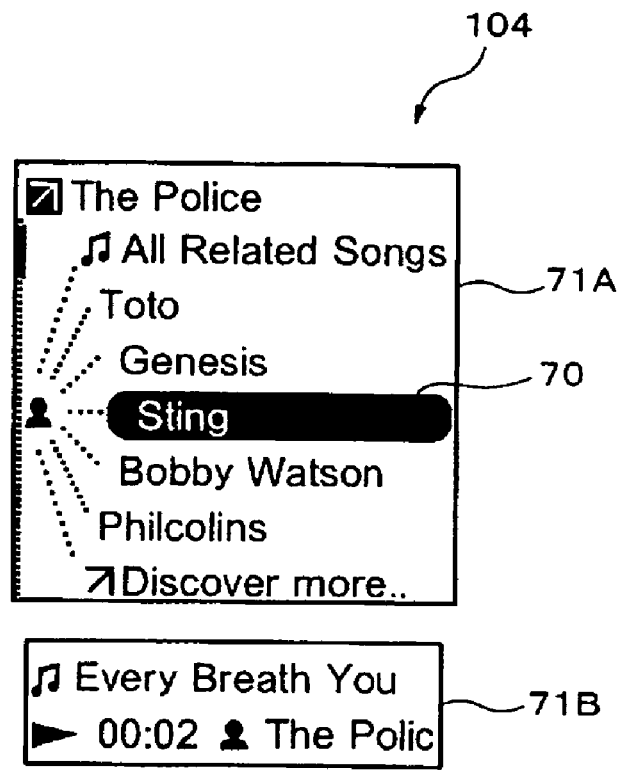
FIGS. 18A and 18B are schematic diagrams showing an example of the related artist information display screen.

If it is determined that the cursor indication 70 has been moved from the position of the artist name corresponding to the content data which is being reproduced at present, the processing routine advances to step S39. The cursor indication 70 is moved in accordance with the operation of, for example, the lower direction key by the user. As shown in an example in FIG. 18A, the cursor indication 70 is displayed at the position of an artist name ("Sting") different from the artist name corresponding to the content data which is being reproduced at present.

Figure 18B:
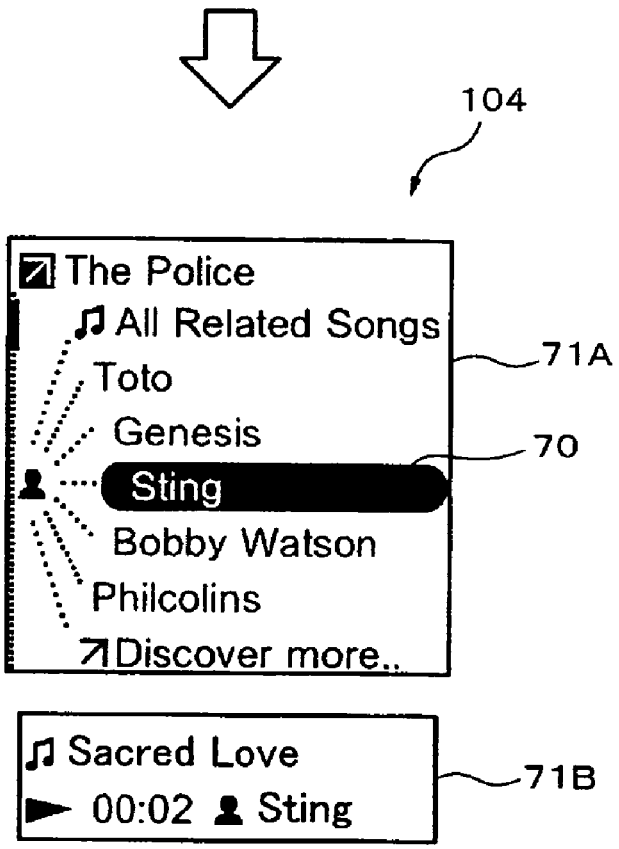

In step S39, whether or not the cursor indication 70 has remained at the position of the related artist name on the moving destination side for a predetermined time or longer is discriminated. If it is decided that the cursor indication 70 has remained for the predetermined time or longer, step S40 follows and the reproducing mode is shifted from the normal reproducing mode to the preview reproducing mode. The artist name corresponding to the position of the cursor indication 70 is set to the selected artist name. The content data ("Sacred Love" in this example) corresponding to the artist name is automatically preview-reproduced. As shown in an example in FIG. 18B, the information of the content data which was newly selected and reproduced is displayed in the reproduction content display unit 71B in the display unit 10.

The preview reproduction which is started from step S40 will be described. In the preview reproducing mode, the content data of the artist corresponding to the position where the cursor indication 70 remains is continuously sequentially reproduced. When all of the content data of the artist recorded in the HDD 32 have been reproduced, the selected artist information is automatically changed to the next artist described in the same artist link information, and the preview reproduction of the content data of the changed artist is started.

That is, as shown in an example in a flowchart of FIG. 19, when a predetermined key (for example, the discovery key 14) provided in the operating unit 20 is operated, the operating mode of the reproducing apparatus 1 is shifted to the artist link mode (step S50). When it is shifted to the artist link mode, for example, a list of the related artist names concerned with the artist of the content which has been reproduced just before is displayed in the display unit 10.

In next step S51, the cursor indication 70 is arranged at the position corresponding to the related artist name (assumed to be "Sting"). Whether or not the cursor indication 70 has remained at the position of this artist name for the predetermined time or longer is discriminated (step S52). If it is determined that the cursor indication 70 has remained for the predetermined time or longer, step S53 follows and the preview reproduction of the content data of the related artist is started. At this time, if another content data has already been reproduced in the normal reproducing mode, the reproduction of such another content data is stopped and the preview reproduction is started.

The operation of the predetermined key in the operating unit 20 is monitored in parallel with the execution of the preview reproduction (step S54). If the reproduction of one content data has been finished without executing the predetermined key operation, whether or not all of the content of the related artist recorded in the HDD 32 have been reproduced is discriminated in step S55.

If it is determined that all of the recorded content data of the related artist are not reproduced yet, the processing routine is returned to step S53 and the next content data of the related artist is reproduced. If it is determined that the reproduction of all of the recorded content data of the related artist has been finished, the processing routine advances to next step S56. In the related artist information display screen 104, the cursor indication 70 is automatically moved to the next related artist ("Bobby Watson" in the example of FIGS. 18A and 18B). The preview reproduction of the content data of the related artist of the moving destination side is automatically started. The processing routine is returned to step S53 and the preview reproduction of the content data of the related artist of the moving destination side is similarly executed.

The predetermined key in the operating unit 20 whose operation is monitored in step S54 mentioned above is set to, for example, the key having such a function as to return the display of the display unit 10 to the display screen in the normal reproducing mode from the display screen in the artist link mode. For example, the back key 15 can be used as such a key. If it is determined in step S54 mentioned above that the predetermined key in the operating unit 20 has been operated during the preview reproduction of the content data, the processing routine advances to step S57.

In step S57, the preview reproduction is stopped and the reproduction of the content data whose normal reproduction has been executed just before the preview reproduction is started after the shift to the artist link mode (for example, before it is determined in step S52 mentioned above that the predetermined time has elapsed) is restarted. The reproduction of the content data is started, for example, from the position where the reproduction has been stopped when the artist link mode is activated and the preview reproduction is started.

By executing the predetermined key operation to the operating unit 20 during the preview reproduction of the content data, the display screen displayed in the display unit 10 can be changed to the display screen adapted to display the more detailed information regarding the content data of the related artist information which has been selected. Processes as an example of changing the display in the display unit 10 from the display shown in FIG. 18A mentioned above to another display will be described with reference to FIGS. 20 and 21.

Figure 20:
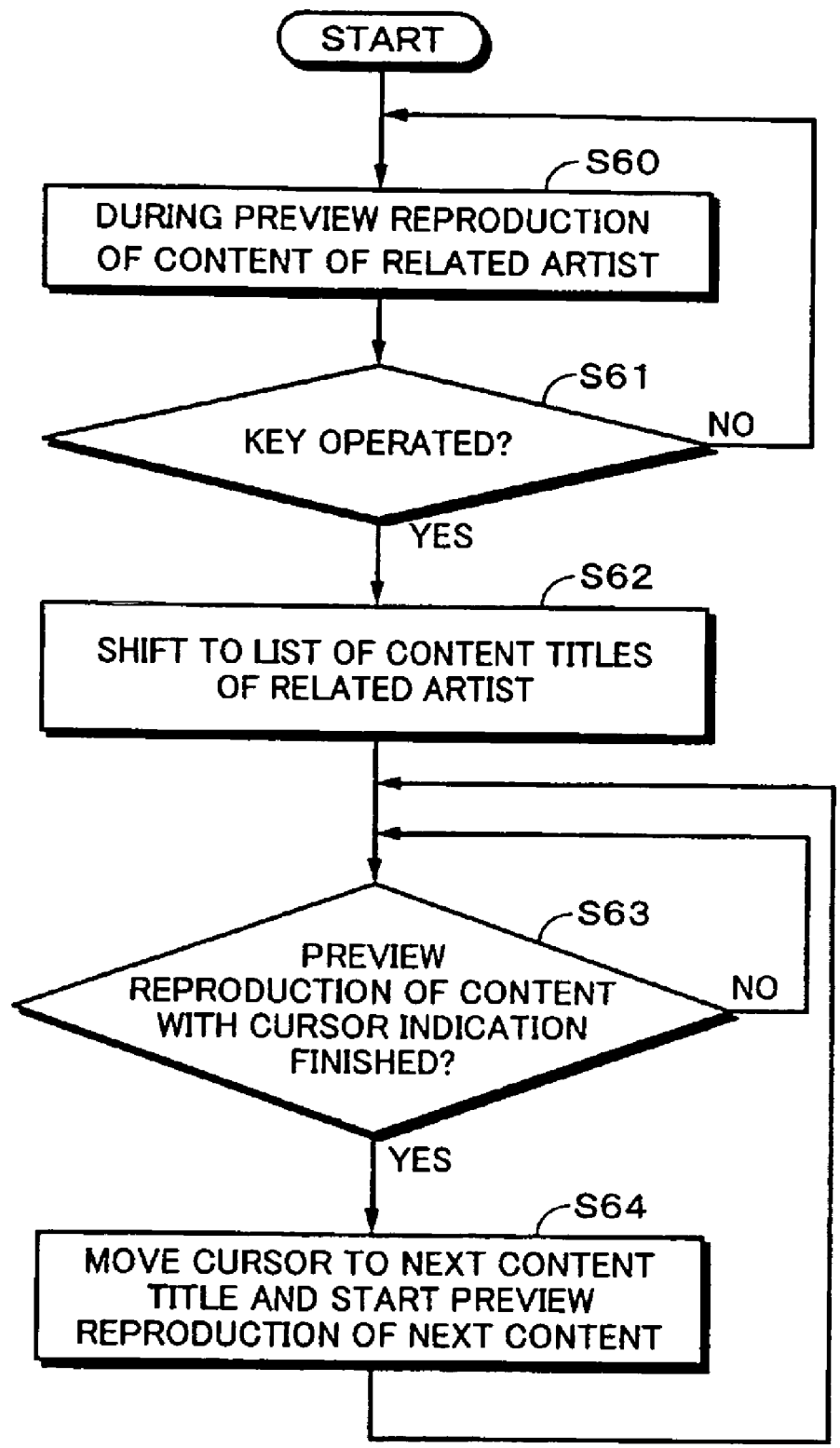
FIG. 20 is a flowchart showing the processes of an example of the preview reproduction.

In a flowchart of FIG. 20, for example, the content data ("Sacred Love") of the related artist ("Sting") is subsequently preview-reproduced (step S60) after the process of step S38 or S40 in the flowchart of FIG. 12. When the predetermined operation such as an operation of, for example, the discovery key 14 is executed to the operating unit 20 during the preview reproduction (step S61), the processing routine advances to step S62.

In step S62, the display in the display unit 10 is changed to the content title list display screen on which a list of the titles of the content data recorded in the HDD 32 with respect to the related artist whose preview reproduction is being executed at present.

Figure 21:
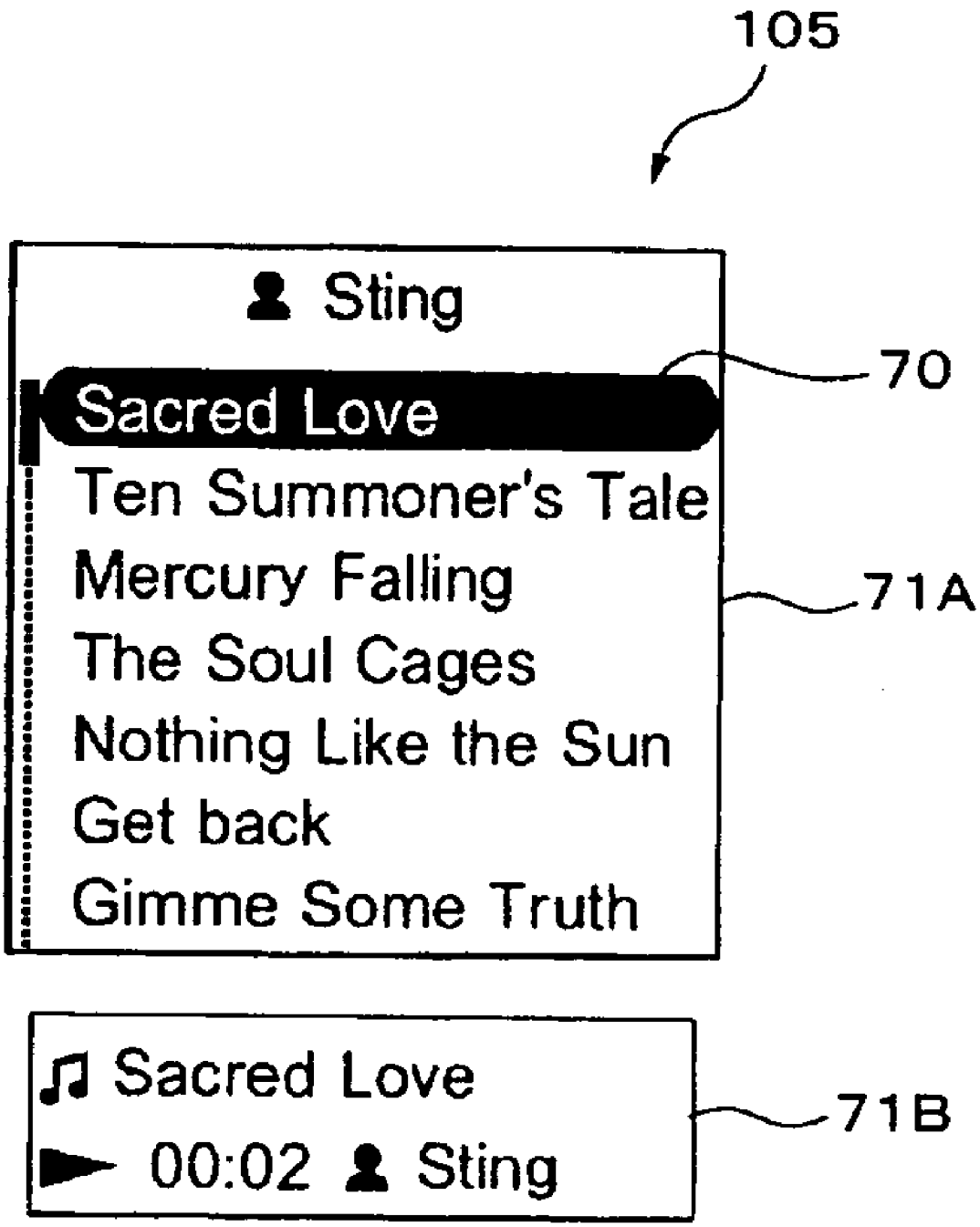
FIG. 21 is a schematic diagram showing an example of a content title list display screen.

FIG. 21 shows an example of a content title list display screen 105. The list of the titles of the content data of the related artist recorded in the HDD 32 is displayed in the list display unit 71A. The related artist name ("Sting") is displayed in the top portion of the content title list display screen together with the icon showing the artist. The content titles are displayed as a list in predetermined order from the bottom of the artist name. The titles which are difficult to be displayed in the whole display area of the display unit 10 can be displayed by scrolling the display screen by operating, for example, the upper direction key and/or the lower direction key in the key 13. The cursor indication 70 is displayed at the position ("Sacred Love" in this example) corresponding to the title which is being preview-reproduced at present. The information of the content which is being preview-reproduced at present is properly displayed in the reproduction content display unit 71B.

Whether or not the preview reproduction of the content data corresponding to the position of the cursor indication 70 has been finished is discriminated (step S63). If it is decided that the preview reproduction has been finished, next step S64 follows. In step S64, the cursor indication 70 is automatically moved to the position of the next content title ("Ten Summoner's Tale" in the example of FIG. 21) and the preview reproduction of the content data shown in the content title to which the cursor indication 70 has been moved is automatically started.

During the preview reproduction of the content data by the content title list display screen 105 mentioned above, the display in the display unit 10 can be further changed to the display screen showing the information of each content and the reproduction of the content data can be switched from the preview reproduction to the normal reproduction in which the whole length of the content data is set to the reproducing target. Processes in an example in this case will be described with reference to FIGS. 22 and 23.

Figure 22:
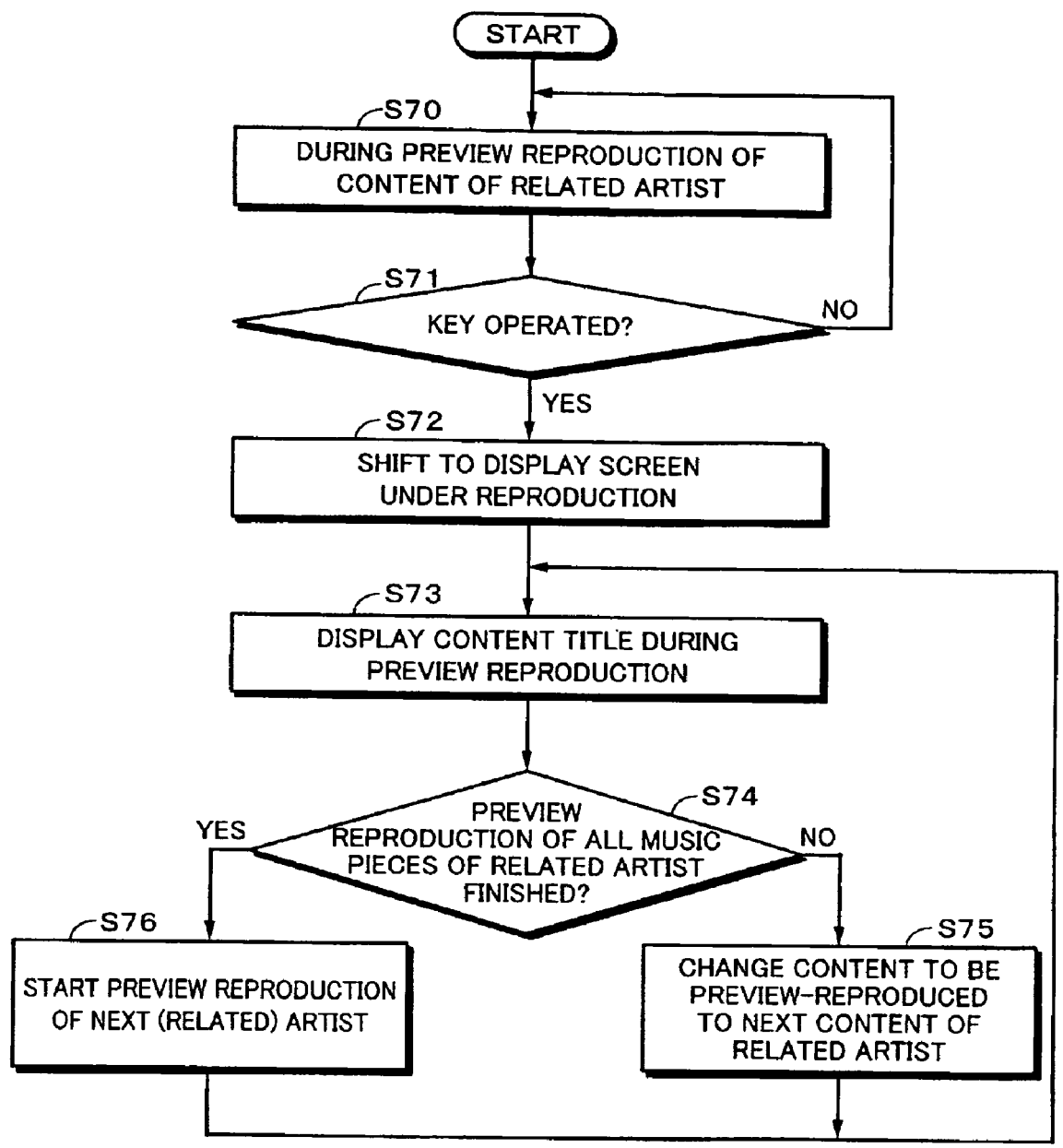
FIG. 22 is a flowchart showing the processes of an example of the preview reproduction.

In a flowchart of FIG. 22, for example, the display in the display unit 10 is the content title list display screen 105 of the related artist shown in FIG. 21 mentioned above and the content data corresponding to the position of the cursor indication 70 is being preview-reproduced (step S70). When the predetermined operation such as an operation of the discovery key 14 has been executed to the operating unit 20 during the preview reproduction (step S71), the processing routine advances to step S72.

In step S72, the display in the display unit 10 is changed to the display screen showing the information of the content data which is being preview-reproduced at present. In next step S73, the information of the content which is being preview-reproduced at present is displayed onto such a display screen. The information of the content which is being preview-reproduced at present can be displayed onto a display screen with a construction similar to that of, for example, the normal reproduction display screen 100.

Figure 23:
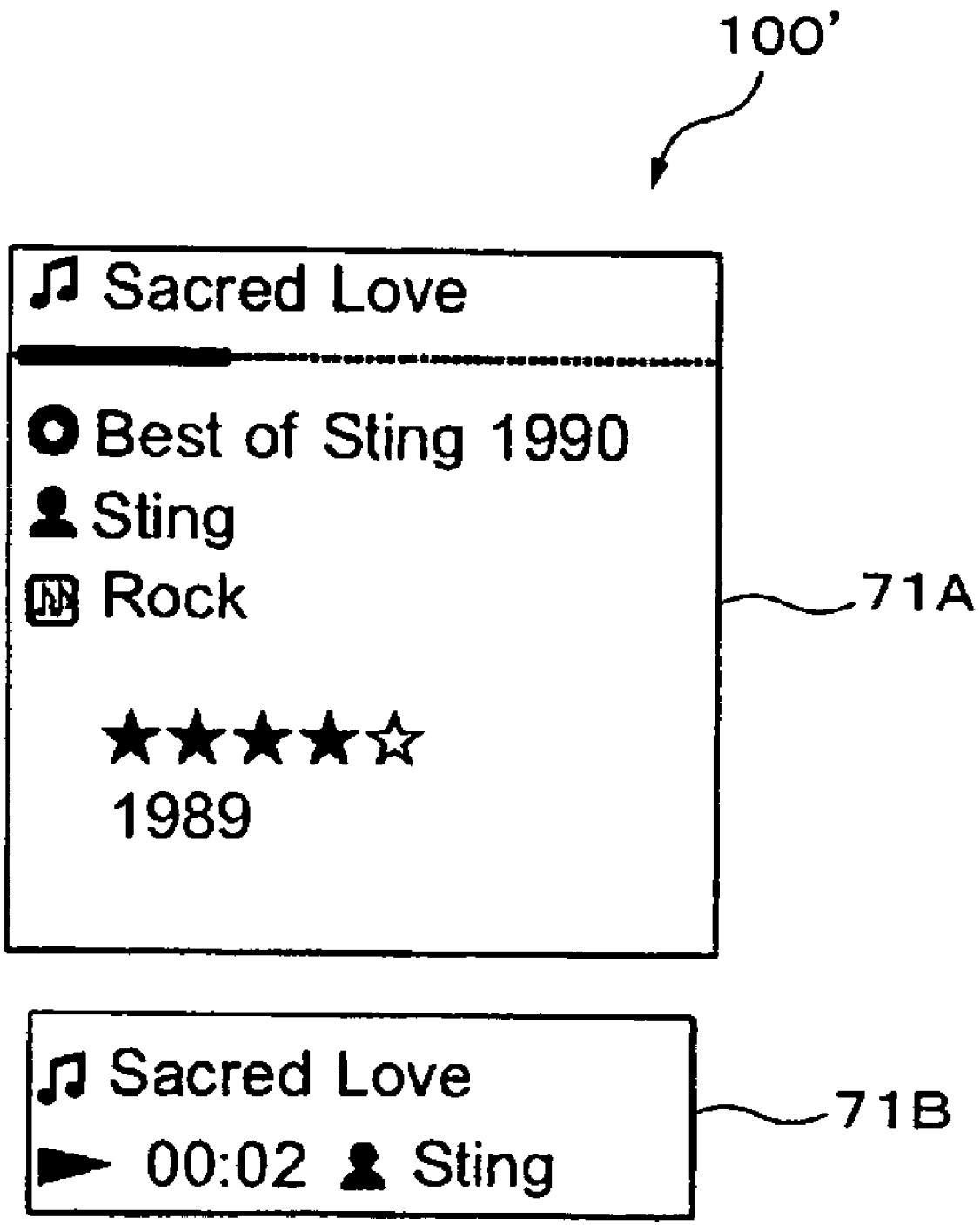
FIG. 23 is a schematic diagram showing an example in the case where preview content information is displayed on the normal reproduction display screen.

FIG. 23 shows an example in the case where the preview content information is displayed on a normal reproduction display screen 100'. With respect to the content which is being reproduced at present, the content name, the album name of the album in which the content has been recorded, the artist name, the genre to which the content data belongs, and the present reproducing time of the content data are displayed in the list display unit 71A together with the icons showing the meanings of the information, respectively. Similarly, the information regarding the content data which is being reproduced at present is schematically displayed in there production content display unit 71B and the information showing the elapsed time from the start of the reproduction is also displayed. The preview content information display screen is not limited to such an example but information showing that the content data is being preview-reproduced at present may be further displayed.

When the preview reproduction of the content data which is being reproduced is finished (not shown), step S74 follows and whether or not all of the content data recorded in the HDD 32 regarding the related artist selected at present have been preview-reproduced is discriminated. If it is determined that the content data which is not yet preview-reproduced still exists with respect to the related artist, step S75 follows. In step S75, the content data to be preview-reproduced is changed to the next content data of the related artist. The processing routine is returned to step S73 and the information of the changed content data is displayed in the display unit 10.

If it is determined in step S74 that the preview reproduction has been finished with respect to all of the content data of the related artist, step S76 follows. The content data of the next related artist of the above related artist is sequentially preview-reproduced. The display in the display unit 10 may be held to the normal reproduction display screen 100' showing the information of the content data which is being preview-reproduced or it may be switched to the artist link information display screen or the like as described with reference to, for example, FIG. 16, on which the cursor indication 70 has been arranged at the position of the related artist which is being selected at present.

In each of the foregoing cases, the reproducing mode can be switched from the preview reproducing mode to the normal reproducing mode by executing the predetermined operation (for example, the operation of the play key 12A or the enter key 13A) to the operating unit 20 during the preview reproduction. The normal reproduction of the content data which is being preview-reproduced at present can be executed.

As mentioned above, by automatically preview-reproducing the content data of the selected target artist and the content data of the related artists to the target artist, the user can find out the desired content data without executing the annoying operation. Thus, for example, even if the user is moving while carrying the reproducing apparatus 1, he can search for the desired content data without looking at the display in the display unit 10.

Since display in the display unit 10 can be changed to another display screen during the preview reproduction, the user can obtain the information regarding the content data which is being preview-reproduced at present from various viewpoints.

3. Control Method of the Preview Reproduction

3-1. Method According to the First Embodiment of the Invention

A preview-reproducing method according to the embodiment of the invention will now be described in more detail.

3-1-1. File Structure

Figure 24:
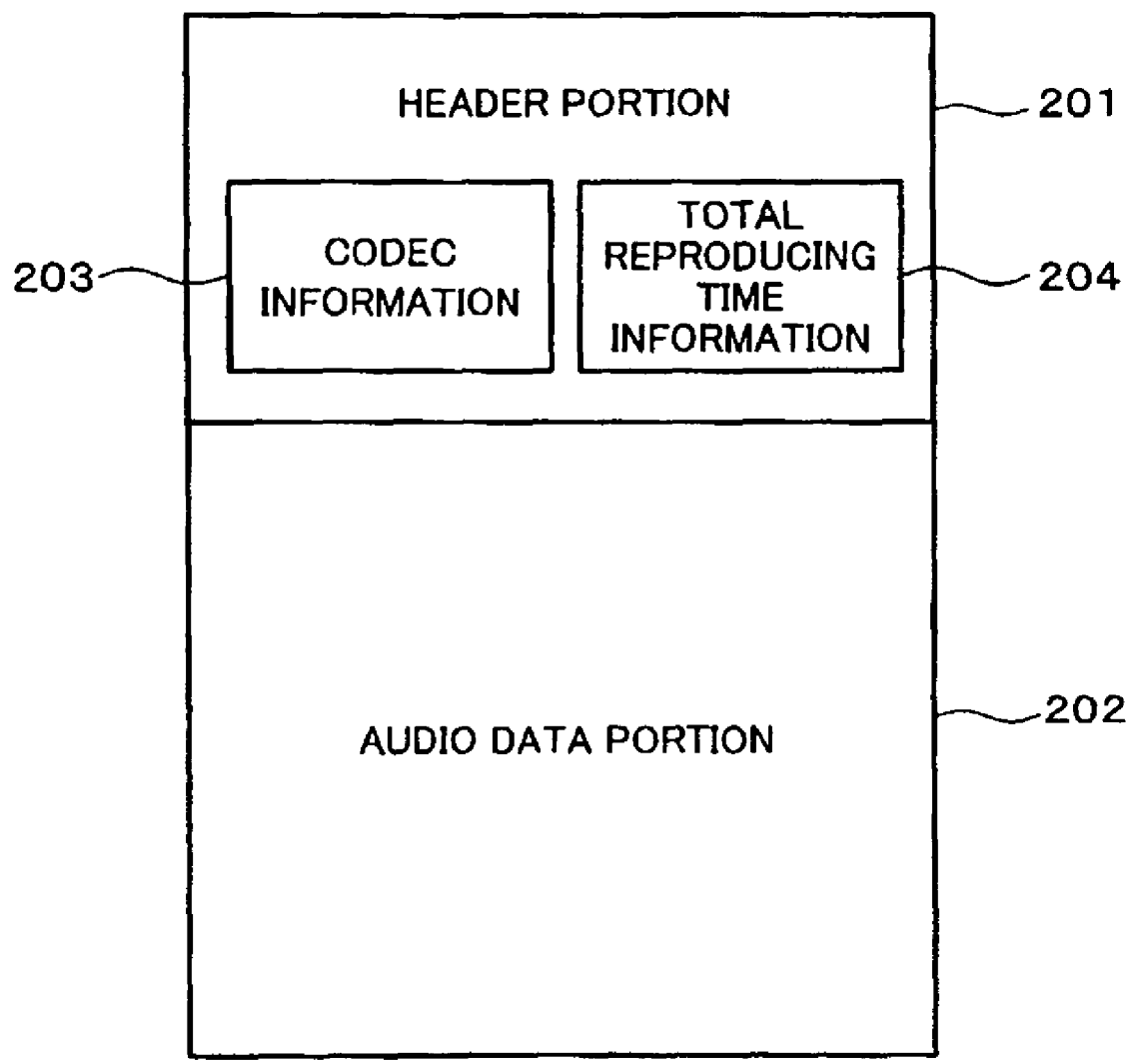
FIG. 24 is a schematic diagram showing a construction of an example of a content data file.

First, the preview-reproducing method according to the first embodiment of the invention will be described. FIG. 24 shows a construction of an example of a content data file 200 in which the content data is stored and which can be applied to the first embodiment of the invention. It is assumed hereinbelow that the content data is the audio data which has been compression-encoded by a predetermined system.

The content data file 200 schematically includes a header portion 201 and an audio data portion 202. A main body portion of the compression-encoded audio data is stored in the audio data portion 202. Attribute information regarding the audio data main body stored in the audio data portion 202 is stored in the header portion 201. A data size of the header portion 201 is described in a predetermined position in the header portion 201. A head position of the audio data portion 202 in the content data file 200 can be obtained by using the data size of the header portion 201 as an offset.

As a compression encoding system of the audio data, for example, various systems such as MP3 (Moving Pictures Experts Group 1 Audio Layer 3), ATRAC3 (Adaptive Transform Acoustic Coding 3; registered trademark), AAC (Advanced Audio Coding), WMA (Windows Media Audio; registered trademark), and the like can be applied. The invention is not limited to them but the audio data of a base band which is not compression-encoded may be also stored.

The compression encoding system of the audio data stored in the audio data portion 202 can be identified by, for example, a predetermined extension added to a file name of the content data file 200. Information showing the compression encoding system may be also described in a predetermined position in the header portion 201.

As attribute information of the audio data main body which is stored in the header portion 201, for example, there are included: codec information 203 as information regarding the compression encoding system of the audio data; and total reproducing time information 204 showing a time interval from the start of the reproduction to the end of the reproduction in the case where the whole length of the audio data main body stored in the audio data portion 202 is reproduced.

The codec information 203 is formed by information which is necessary when the audio data is reproduced. For example, if the audio data which is stored in the content data file 200 is the compression-encoded data of the fixed bit rate in which the bit rate of one frame has been fixed, information showing the bit rate and/or information showing the size of one frame can be included in the codec information 203 with respect to the compression-encoded audio data. In dependence on the compression encoding system, the compression encoding by a variable bit rate in which the bit rate can be varied every frame can be performed. In this case, information showing the variable bit rate is included in the codec information 203.

3-1-2. Flow of Processes

Figure 25:
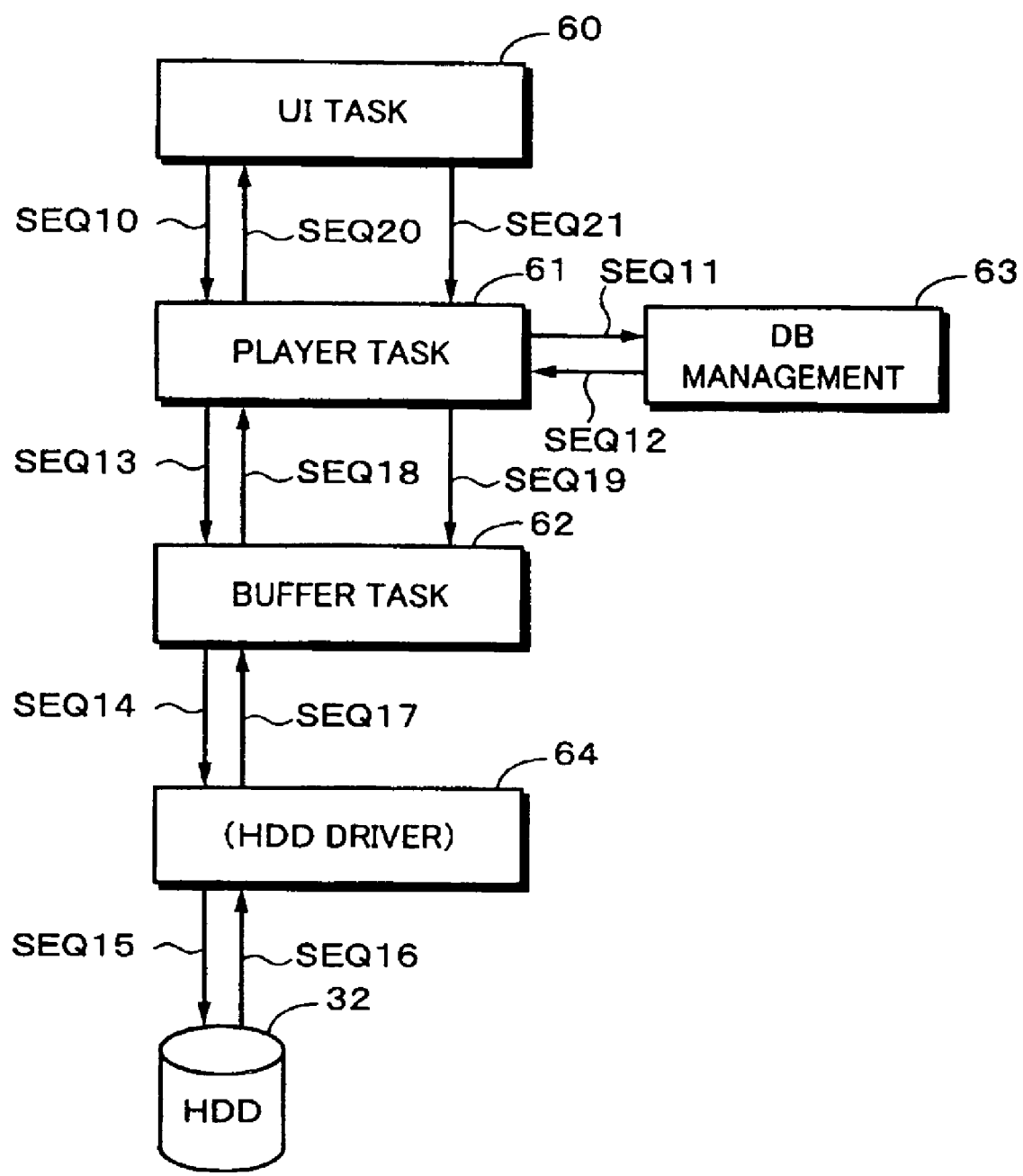
FIG. 25 is a schematic diagram showing a flow of an example of a preview reproducing process according to the first embodiment of the invention.

FIG. 25 shows a flow of an example of the preview reproducing process according to the first embodiment of the invention in correspondence to the architecture described with reference to FIG. 4. For example, a case where when content A of the artist A is being normally reproduced in the normal reproducing mode, the discovery key 14 of the operating unit 20 has been operated by the user is considered.

In this case, as mentioned above, the artist link mode is activated and the reproducing mode is changed to the preview reproducing mode. When the operation to move the cursor indication 70 is not executed, the audio data of the artist A recorded in the HDD 32 is automatically preview-reproduced in predetermined order. Similarly, in the related artist information display screen 104, also in the case where the cursor indication 70 has been moved to the position of another artist information related to the artist A and has been made to remain for the predetermined time or longer, the audio data of such another artist is automatically preview-reproduced in predetermined order.

In accordance with the user operation, the start of the preview reproduction is instructed to the player task 61 from the UI task 60 (SEQ10). In response to this instruction, the player task 61 inquires of the DB management task 63 about the audio data to be preview-reproduced (SEQ11). In response to this inquiry, the DB management task 63 returns the information regarding the audio data to be preview-reproduced to the player task 61 (SEQ12). On the basis of the information returned from the DB management task 63, the player task 61 instructs the buffer task 62 to output the audio data to be readout of the HDD 32 (SEQ13).

The buffer task 62 controls the HDD driver 64 (SEQ14) in accordance with the instruction in SEQ13 so as to read out the audio data from the HDD 32 (SEQ15). The read-out audio data is sent to the buffer task 62 through the HDD driver 64 (SEQ16 and SEQ17) and stored in a buffer memory area in the RAM 37. The buffer memory area in the RAM 37 is properly called a buffer memory hereinbelow.

As mentioned above, in the preview reproduction, only a part of the whole length of the audio data is reproduced. For example, as for the preview-reproducing target, the position corresponding to the elapse of 45 seconds as a reproducing time from the head of the audio data when the audio data has been reproduced is set to the reproduction start time and the position of (1 minute and 15 seconds) corresponding to the elapse of 30 seconds as a reproducing time from the reproduction start time is set to the end position. In other words, the preview reproduction is executed for 30 seconds from the position after 45 seconds as a reproducing time from the head of the audio data.

Figure 26:
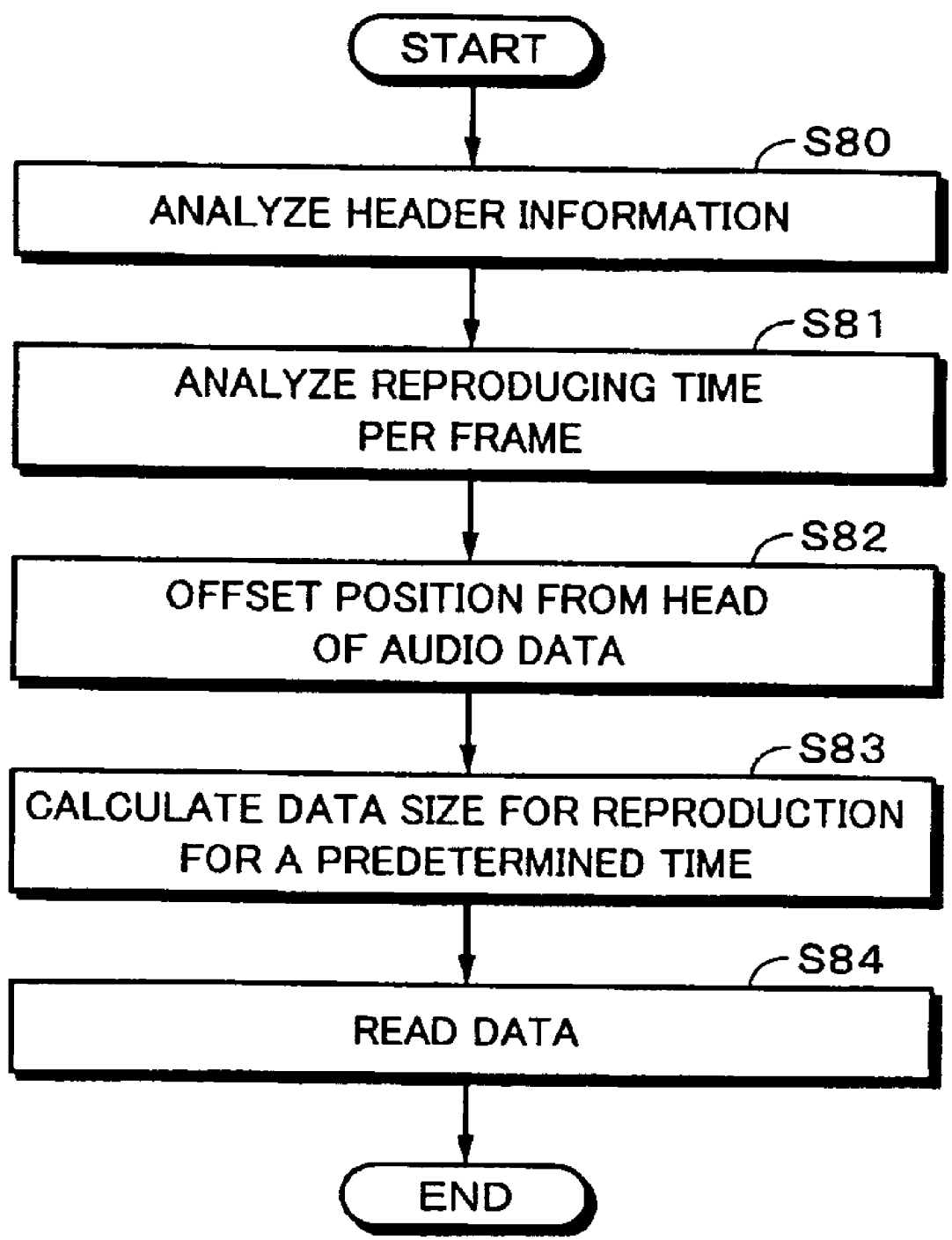
FIG. 26 is a flowchart showing processes of an example when audio data to be preview-reproduced is read out of the content data file according to the first embodiment of the invention.

In the first embodiment, only the portion to be preview-reproduced in the content data file in which the audio data has been stored is selectively read out of the HDD 32 and stored into the buffer memory. FIG. 26 is a flowchart showing processes of an example when the audio data to be preview-reproduced is read out of the content data file according to the first embodiment. The processes according to the flowchart are mainly controlled by the buffer task 62.

In step S80, the buffer task 62 controls the HDD driver 64, accesses the content data file 200 for executing the preview reproduction recorded in the HDD 32, and reads out the header portion 201 of the content data file 200. The read-out header portion 201 is temporarily written into, for example, an area out of the buffer area in the RAM 37. The buffer task 62 analyzes the header information in the header portion 201 written in the RAM 37 and extracts the codec information 203 and the total reproducing time information 204 included in the header portion 201. The extracted information is held in the area out of the buffer area in the RAM 37.

On the basis of an analysis result of the header information, the reproducing time per frame of the audio data main body stored in the audio data portion 202 of the content data file 200 is analyzed in next step S81. For example, if the audio data stored in the content data file 200 has been compression-encoded by the fixed bit rate, the reproducing time per frame can be obtained on the basis of the information showing the frame size described in the codec information 203 and the bit rate information upon compression-encoding.

By which one of the fixed bit rate or the variable bit rate the compression-encoding of the audio data stored in the content data file 200 has been performed can be discriminated on the basis of a discrimination result about whether or not the information showing use of the variable bit rate has been described in the codec information 203.

In next step S82, the offset of the preview reproduction start position from the head of the audio data portion 202 is calculated on the basis of the reproducing time per frame obtained in step S81. For example, assuming that the position after 45 seconds from the head of the audio data as a reproducing time is set to the start position of the preview reproduction, the frame close to a value which is obtained by calculating (45 seconds)/(reproducing time per frame) is set to the offset. Further, in next step S83, the data size (the number of frames) adapted to reproduce the data for a predetermined time (30 seconds in this example) is calculated on the basis of the information showing the reproducing time per frame obtained in step S81.

The preview reproduction start position information showing the position to start the preview reproduction can be preliminarily stored in, for example, the ROM 42 if the preview reproduction start position is fixed. The preview reproduction start position information can be also provided from the outside of the reproducing apparatus 1 without limiting to the above example. For instance, the preview reproduction start position information can be also described in the header portion of the content data file in which the content data is stored. In this case, at the time of the reproduction or the like, the header information of the content is analyzed, the preview reproduction start position information is extracted, and the offset upon preview reproduction is obtained on the basis of the extracted preview reproduction start position information. In the case of providing the preview reproduction start position information from the outside, the preview reproduction start position can be also made different every content.

When the offset from the head of the file in the audio data portion 202 and the data size adapted to reproduce the data for the predetermined time have been obtained, the processing routine advances to step S84 and the audio data is read out of the HDD 32 on the basis of those obtained information. That is, in step S84, the content data file 200 in the HDD 32 is accessed and the audio data of the amount corresponding to the data size calculated in step S83 is read out from the position of the offset obtained in step S82. The read-out audio data is stored into the buffer memory.

If the audio data stored into the content data file 200 has been compression-encoded by using the variable bit rate, it is preferable to schematically obtain the offset of the portion as a preview reproducing target and the data size adapted to reproduce the data for the predetermined time on the basis of the information included in the header portion 201 and the information from the file system that is provided by the OS 68.

For example, if an average bit rate value upon compression-encoding has been described as codec information 203 in the header portion 201, the offset value and the data size adapted to execute the preview reproduction can be obtained by using the average bit rate.

Even if the average bit rate is unknown, for instance, the offset of the start position of the preview reproduction for the audio data portion 202 can be obtained by a byte position or the like in the content data file 200 on the basis of the data size information of the audio data portion 202 and the ratio of the preview reproduction start time (45 seconds) to the total reproducing time information 204. Similarly, a preview reproduction end position can be obtained by the byte position or the like in the content data file 200 on the basis of the data size information of the audio data portion 202 and the ratio of the preview reproduction end time (45 seconds+30 seconds) to the total reproducing time information 204.

The size of the audio data portion 202 can be known on the basis of, for example, the information showing the data size of the header portion 201 included in the codec information 203 and the data size of the content data file 200 which is obtained from the file system.

The buffer task 62 reads out the audio data from the HDD 32 in step S84 on the basis of the offset position information and the preview reproduction end position information obtained as mentioned above.

Returning to the explanation for FIG. 25, when the audio data of the amount of one content which was read out of the HDD 32 has been stored in the buffer memory, the buffer task 62 notifies the player task 61 of such a fact (SEQ18). The player task 61 inquires of the DB management task 63 about the audio data to be read out subsequently. The player task 61 transfers the information of the audio data which was returned from the DB management task 63 and should be readout subsequently to the buffer task 62 (SEQ19).

On the basis of the transferred information of the audio data, the buffer task 62 reads out the information of the header portion 201 of the content data file 200 as mentioned above, obtains the offset position for the preview reproduction in the audio data portion 202, the data size adapted to execute the preview reproduction, and the like, reads out the audio data recorded in the HDD 32 in accordance with the processes of SEQ14 to SEQ17 mentioned above, and stores it into the buffer memory.

The operation to store the audio data which is used for the preview reproduction into the buffer memory is started, for example, in step S33 in the flowchart of FIG. 12 mentioned above. That is, while the on-search display screen 101 shown in FIG. 14 is displayed in the display unit 10, the reading of the audio data which is used for the preview reproduction from the HDD 32 or the writing of the read-out audio data into the buffer memory is executed.

Figure 27:
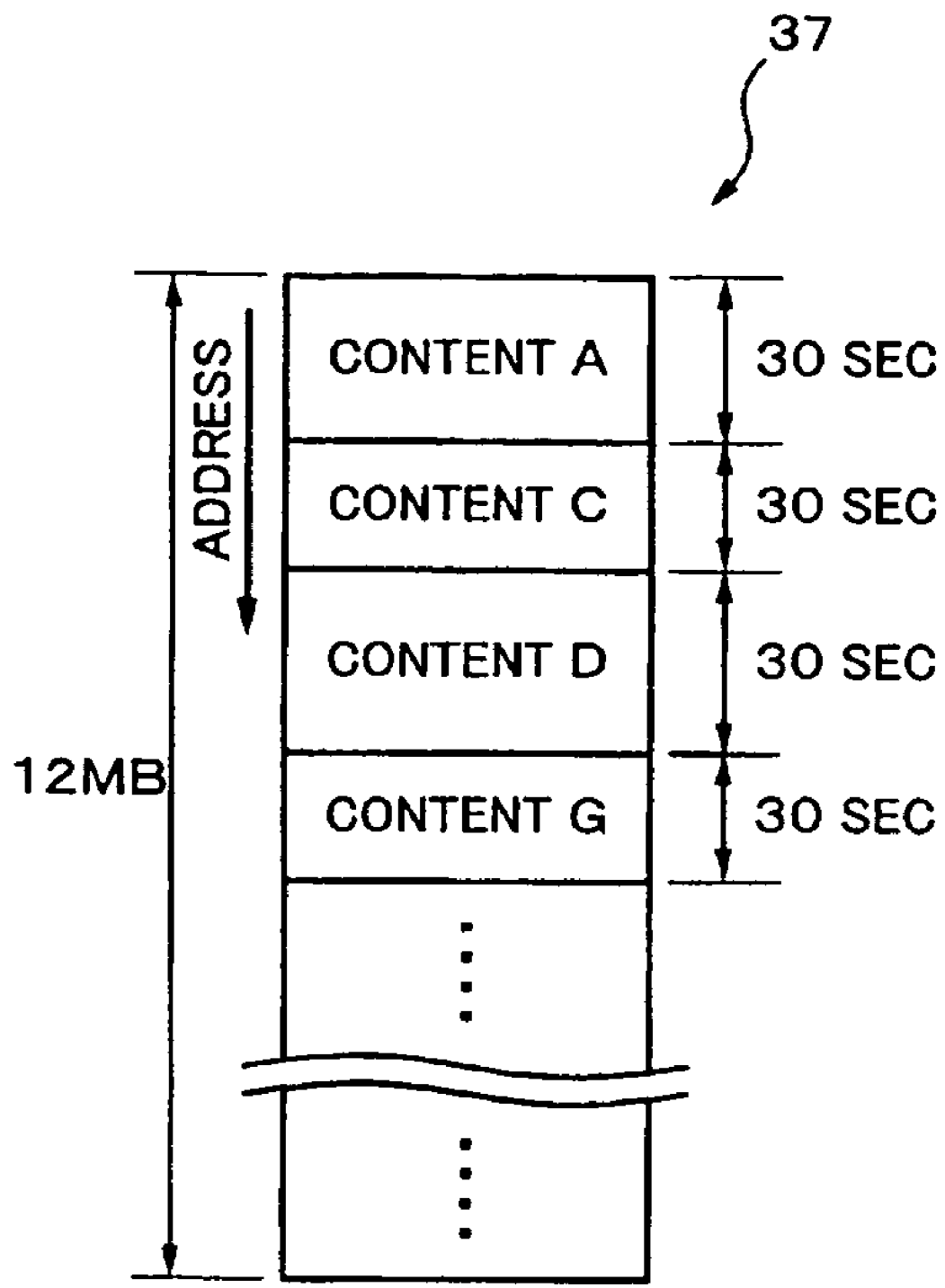
FIG. 27 is a schematic diagram showing the state where the audio data is stored in a buffer memory.

FIG. 27 schematically shows the state where the audio data read out of the HDD 32 is stored in the buffer memory. In this example, the area of 12 MB in the RAM 37 having the memory capacity of 16 MB is assured as a buffer memory area to store the audio data. As shown in the example in FIG. 27, the audio data read out of the HDD 32 for the predetermined time is accumulated in order from the head side in the buffer memory area. In this example, the bit rates and the like of the audio data of the content A, content C, content D, . . . stored in the buffer memory are different and, even in the case of the same preview reproducing time, the data sizes are different.

When the audio data of the predetermined amount or more has been stored in the buffer memory, the player task 61 executes the operation to preview-reproduce the audio data in the buffer memory. For example, the buffer task 62 monitors the state of the buffer memory. When the audio data of the predetermined amount or more has been stored in the buffer memory, the buffer task 62 notifies the decoder control task 65 of such a fact. The decoder control task 65 reads out the audio data stored in the buffer memory on a unit basis of the decoding unit amount and supplies it to the decoder 43 through the decoder control unit 67.

For example, at the start of the preview reproduction of the content A as first content to be preview-reproduced, the buffer task 62 sets a read pointer into the head of the content A, that is, a head address of the buffer memory. The buffer task 62 moves the read pointer in accordance with a reading request from the decoder control task 65. The decoder control task 65 reads out the audio data from the buffer memory on the basis of the read pointer and decodes it on a decoding unit basis.

When the reading of the content A has been finished and the read pointer has reached the end of the content A, that is, the head of the content C, the buffer task 62 similarly moves the read pointer from the head of the content C after the elapse of a predetermined pause time. Since this operation is repeated by the buffer task 62, the audio data for the preview reproduction stored in the buffer memory can be sequentially reproduced.

Figure 28A:
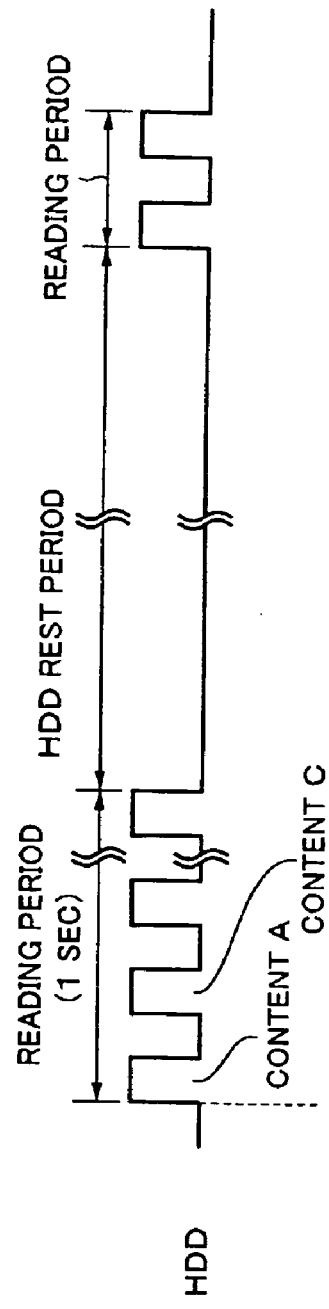
FIGS. 28A to 28C are timing charts schematically showing access timing of an example of a hard disk drive and the buffer memory regarding the audio data for the preview reproduction.
Figure 28B:
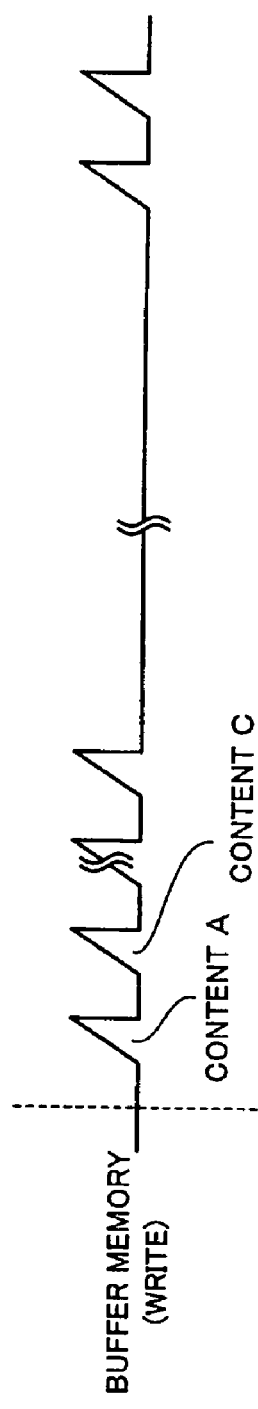
Figure 28C:
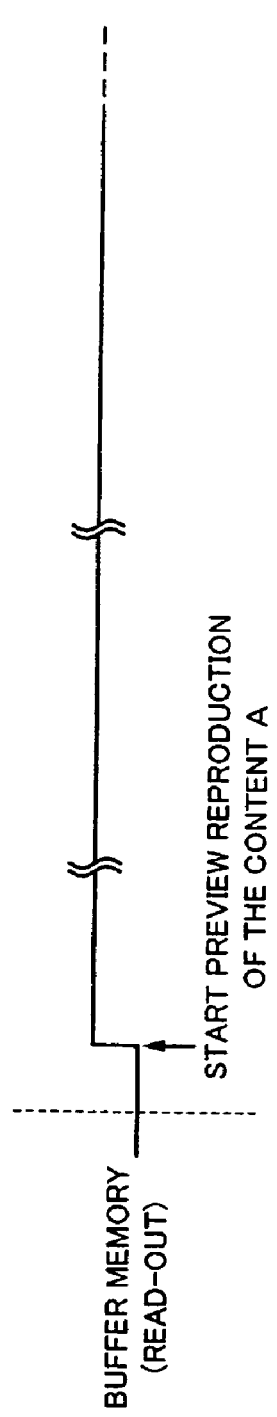

FIGS. 28A to 28C schematically show access timing of an example of the HDD 32 and the buffer memory regarding the audio data for the preview reproduction. FIG. 28A shows the timing for reading out the audio data from the HDD 32, FIG. 28B shows the timing for writing the audio data read out of the HDD 32 into the buffer memory, and FIG. 28C shows the timing for reading out the audio data for the preview reproduction from the buffer memory, respectively.

As mentioned above, when the audio data for the preview reproduction of the amount corresponding to one content has been stored in the buffer memory, the buffer task 62 requests the information of the audio data to be stored subsequently from the player task 61. That is, as shown in the example in FIGS. 28A and 28B, when the preview reproduction data of the content A has been read out of the HDD 32, the read-out data is written into the buffer memory. After completion of the writing of the data of one content into the buffer memory, the buffer task 62 requests the player task 61 to output the information of the audio data to be stored subsequently. On the basis of the information returned in response to such a request, the data of the next content C is read out of the HDD 32 and the read-out data is written into the buffer memory.

The above series of operation is repeated, for example, until the preview reproduction is finished or until an empty capacity of the buffer memory is extinguished. The number of audio data for the preview reproduction to be stored into the buffer memory may be also limited.

The reading of the data from the HDD 32 and the writing of the data into the buffer memory are executed at an extremely high speed as compared with the reproducing time or the like of the read-out audio data. If the number of data to be stored into the buffer memory is limited to, for instance, about 12, the reading of the data from the HDD 32 and the writing of the data into the buffer memory can be completed within, for instance, about 1 second.

For example, as shown in the example in FIG. 28C, the reading of the data from the buffer memory which is executed for the preview reproduction can be started at a point of time when the data of the first content A of the predetermined amount or more has been stored in the buffer memory.

Since a plurality of data are stored into the buffer memory at a point of time when, for instance, about 1 second has elapsed after the start of the preview reproduction of the content A as mentioned above, it is unnecessary to read out the data from the HDD 32 until the preview reproduction of the data of at least one content is finished. Therefore, as shown in FIG. 28A, a time interval of, for instance, about tens of seconds until the next reading is executed after the completion of the series of reading operation from the HDD 32 can be set to a rest period of time of the operation of the HDD 32. By collectively reading out a plurality of audio data for the preview reproduction from the HDD 32 and storing them into the buffer memory as mentioned above, the rest period of the operation of the HDD 32 can be formed and electric power consumption in the HDD 32 can be suppressed.

The addresses of the data stored in the buffer memory are typically managed by the buffer task 62. Thus, for example, such control that on the way of the preview reproduction of certain content, the reproduction is jumped to the preview reproduction of the next content can be made.

Figure 29:
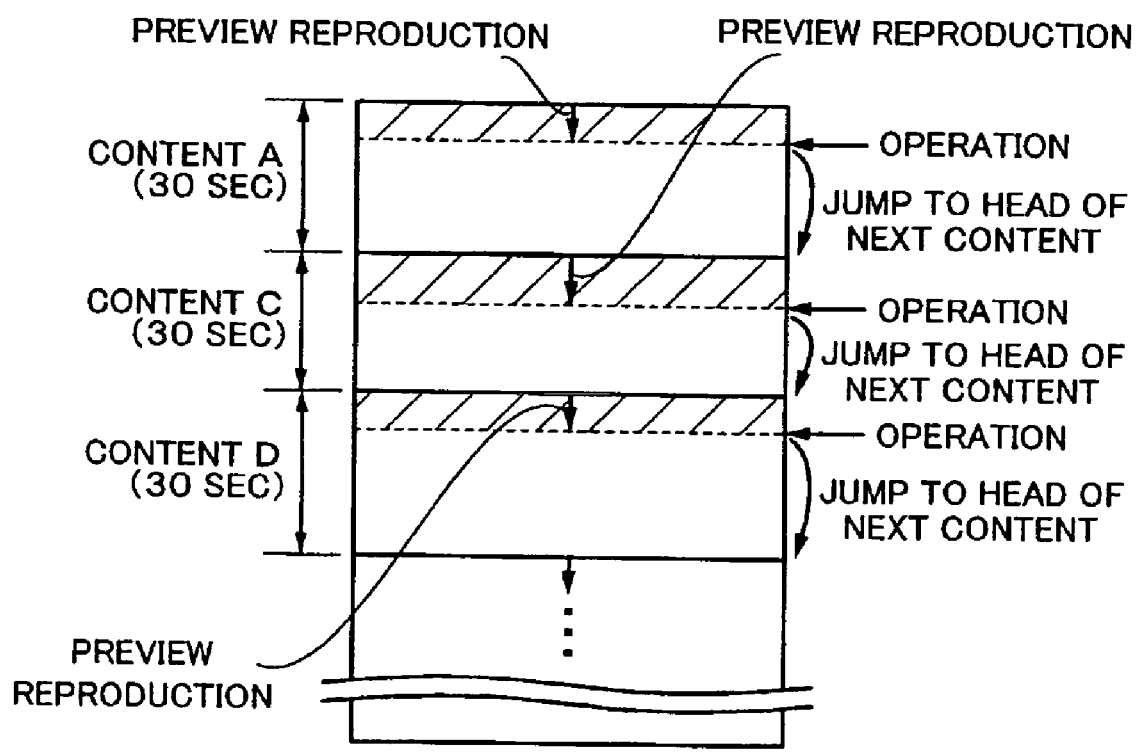
FIG. 29 is a diagram for explaining control for jumping to the preview reproduction of the next content during the preview reproduction of certain content.

For example, as schematically shown in FIG. 29, when the user operates the operating unit 20 to instruct the preview reproduction of the next content C during the preview reproduction of the content A, the buffer task 62 is notified of such an instruction from the UI task 60 through the player task 61. In accordance with such an instruction, the buffer task 62 moves the read pointer of the buffer memory to the head of the content C. The decoder control task 65 reads out the audio data for the preview reproduction from the head of the content C in accordance with the read pointer and reproduces it. The similar operation can be also executed even during the preview reproduction of the content C. In the preview reproducing mode, the content data can be successively monitored without reproducing the whole length of the preset preview reproducing time (30 seconds in this example).

Further, the buffer task 62 transfers the information of the data read out by the decoder control task 65 to the player task 61. The player task 61 transfers the information of the audio data which is being preview-reproduced at present to the UI task 60 on the basis of the transferred information. The player task 61 can allow the display unit 10 to display the information regarding the audio data which is being preview-reproduced at present or the like on the basis of the transferred information.

The audio data whose preview reproduction has been finished can be erased from the buffer memory. In this instance, the case where the user traces back the order of the content data and preview-reproduces the data which has already been preview-reproduced is also considered. Therefore, it is preferable that the audio data of at least one to two kinds of content which have been reproduced just before is left in the buffer memory without immediately erasing the audio data whose reproduction has been finished.

3-1-3. Operation when Switching a Preview Reproducing Mode and a Normal Reproducing Mode Subsequently, an example in which the two kinds of operations described with reference to FIGS. 8A and 8B at the time when the reproducing mode has been switched from the preview reproducing mode to the normal reproducing mode during the preview reproduction are applied to the first embodiment will be schematically explained with reference to FIGS. 30A to 30C.

Figure 30A:
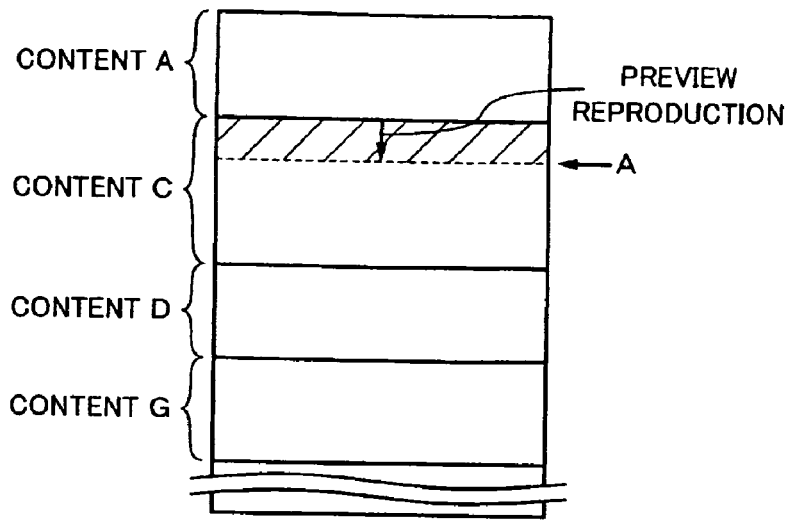
FIGS. 30A to 30C are schematic diagrams for explaining processes according to the first embodiment when the reproducing mode is switched from the preview reproduction to the normal reproduction.
Figure 30B:
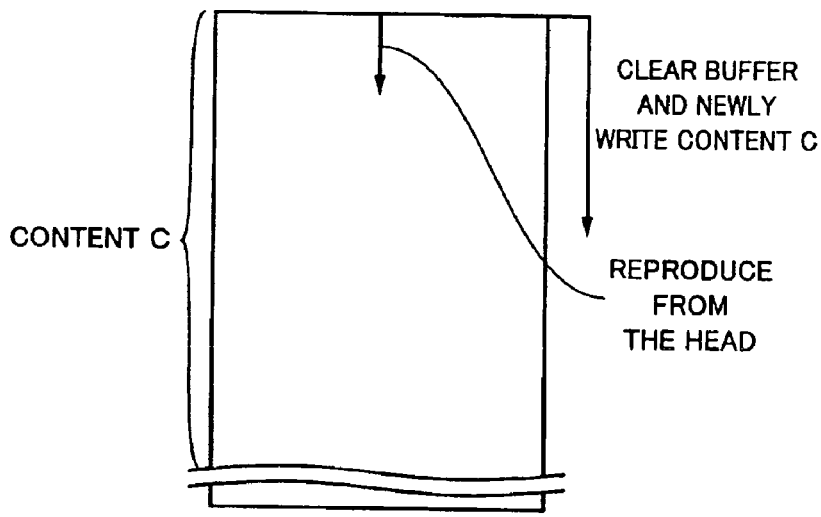
Figure 30C:
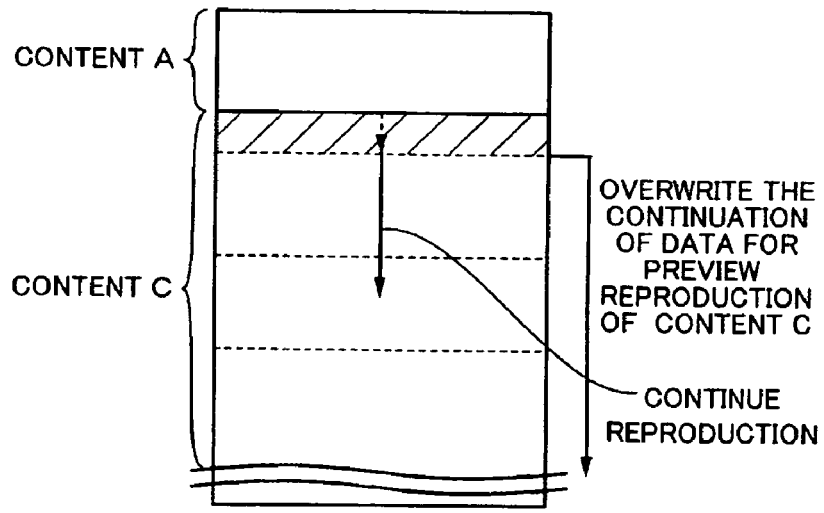

As shown in the example in FIG. 30A, it is assumed that the audio data for the preview reproduction has been stored in the buffer memory in order of the content A, content C, content D, content G, . . . . It is also assumed that, for example, the enter key 13A is operated and the reproducing mode is switched from the preview reproducing mode to the normal reproducing mode at the timing when the read pointer is located at the position A during the preview reproduction of the content C.

A first method (refer to FIG. 8A) of starting the reproduction from the head of the preview-reproduced content data will now be described. In this case, as shown in the example in FIG. 30B, the contents of the buffer memory are temporarily erased and the audio data is read out of the HDD 32 with respect to the whole length of the content C as a target and written into the buffer memory. The buffer task 62 sets the read pointer to the head of the audio data of the content C (that is, the head of the buffer memory). The decoder control task 65 decodes the audio data of the content C from the head in accordance with the read pointer and reproduces it.

A second method (refer to FIG. 8B) of intermittently executing the reproduction from the position where the preview reproduction has been stopped will now be described. In this case, as shown in the example in FIG. 30C, with respect to the audio data of the content C, the audio data recorded in the HDD 32 is read out from the position subsequent to the portion of the audio data for the preview reproduction which has already been stored in the buffer memory. The read-out audio data is subsequently written in the buffer memory from the end position of the audio data of the content C which has already been stored. Therefore, the audio data for the preview reproduction of the content D, content G, . . . which have been stored subsequently to the content C in the buffer memory is overwritten to the audio data of the content C.

In the case of the second method, after the reproducing mode was switched from the preview reproducing mode to the normal reproducing mode, the buffer task 62 continuously moves the read pointer in the preview reproducing mode. Thus, the reading of the audio data of the content C from the buffer memory by the decoder control task 65 is also continuously executed when the reproducing mode is switched from the preview reproducing mode to the normal reproducing mode. The reproduction of the audio data can be also continuously executed when the reproducing mode is switched.

The operation to switch the reproducing mode from the normal reproducing mode to the preview reproducing mode during the normal reproduction will now be described. Also in this case, the following two methods are considered: a method whereby the contents of the buffer memory are temporarily erased and the audio data for the preview reproduction is newly read out; and a method whereby a part or all of the audio data which is being reproduced in the normal reproducing mode is left in the buffer memory and the audio data for the preview reproduction is overwritten after that.

Between those methods, the method of temporarily erasing the contents of the buffer memory can be realized by a method similar to the foregoing method whereby the audio data for the preview reproduction is read out of the HDD 32 and stored into the buffer memory. For example, the reproduction in the normal reproducing mode is set into the pause mode and the audio data in the buffer memory is erased. After that, the audio data for the preview reproduction is newly read out of the HDD 32 and stored into the buffer memory in a manner similar to the foregoing method.

The case where the audio data for the preview reproduction is overwritten into the buffer memory will now be described with reference to FIGS. 31A to 31C. In this case, the situation where the processes differ in dependence on to which position the content has been reproduced in the normal reproducing mode when the reproducing mode is switched is considered. For example, in the case (1) of the process before a preview reproducing interval $PV_A$ of the content A in FIG. 31A or the case (2) of the process for such an interval, as shown in an example in FIG. 31B, a preview reproducing interval $PV_B$ of the next content B, a preview reproducing interval $PV_C$ of the further next content C, . . . are overwritten subsequently to the preview reproducing interval $PV_A$ of the content A.

Figure 31A:
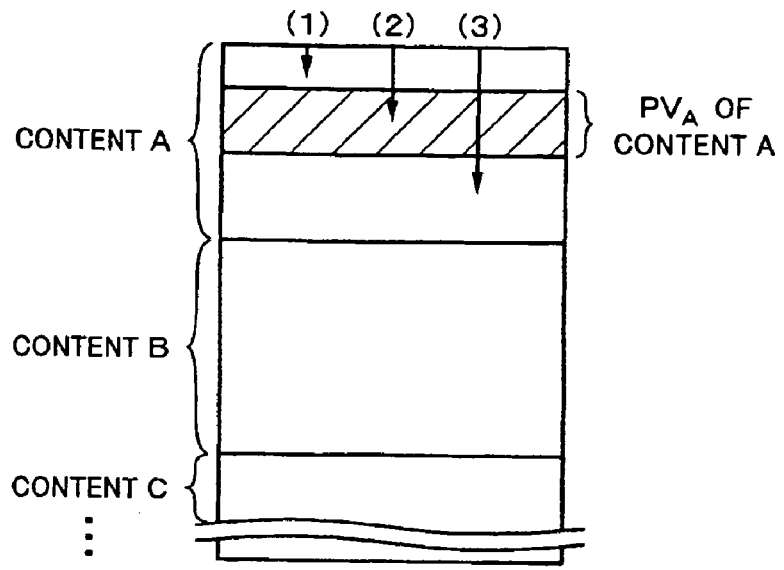
FIGS. 31A to 31C are schematic diagrams for explaining processes according to the first embodiment when the reproducing mode is switched from the normal reproducing mode to the preview reproducing mode.
Figure 31B:
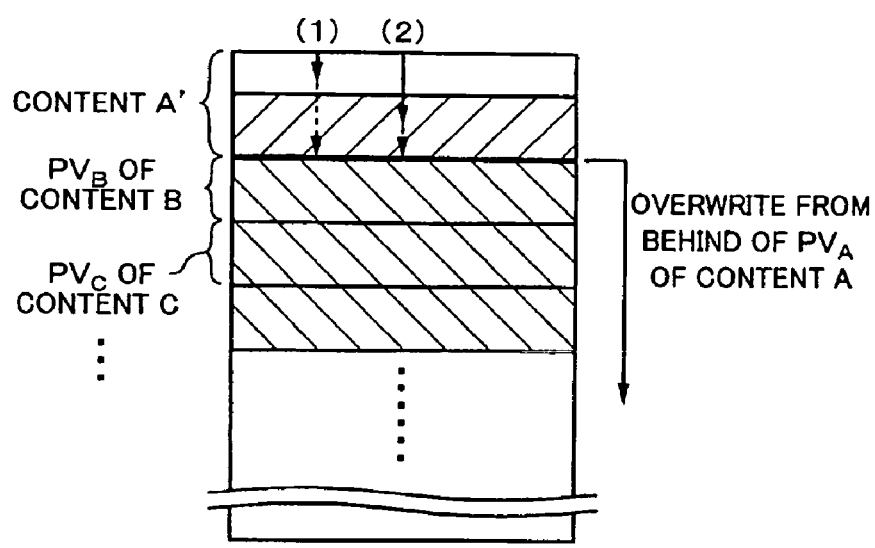
Figure 31C:
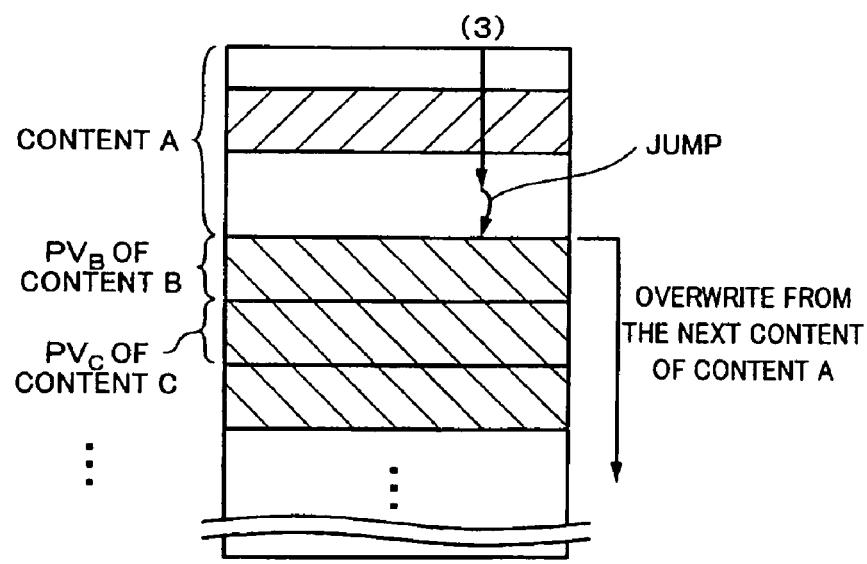

In the case (3) where the reproducing mode is switched to the preview reproduction while the reproduction is executed in an interval after the preview reproducing interval $PV_A$ of the content A in FIG. 31A, as shown in an example in FIG. 31C, the audio data of the content A is left in the buffer memory and the preview reproducing interval $PV_B$ of the next content B, the preview reproducing interval $PV_C$ of the further next content C, . . . are overwritten from behind the content A. The read pointer is jumped to the head of the preview reproducing interval $PV_B$.

The foregoing kinds of control at the time of switching from the normal reproducing mode to the preview reproducing mode relate to the method of an example which enables the embodiment to be realized and the invention is not limited to such an example.

As already described with reference to FIG. 19, there is also considered the case where the reproducing mode is switched to the preview reproducing mode during the reproduction in the normal reproducing mode and is further switched to the normal reproducing mode during the reproduction in the preview reproducing mode, and the normal reproduction of the content is restarted from the position where the content has been reproduced in the normal reproducing mode just before the reproducing mode is switched to the preview reproducing mode. The control of the memory buffer which is made in consideration of such a case will be described with reference to FIGS. 32A to 32C.

Figure 32A:
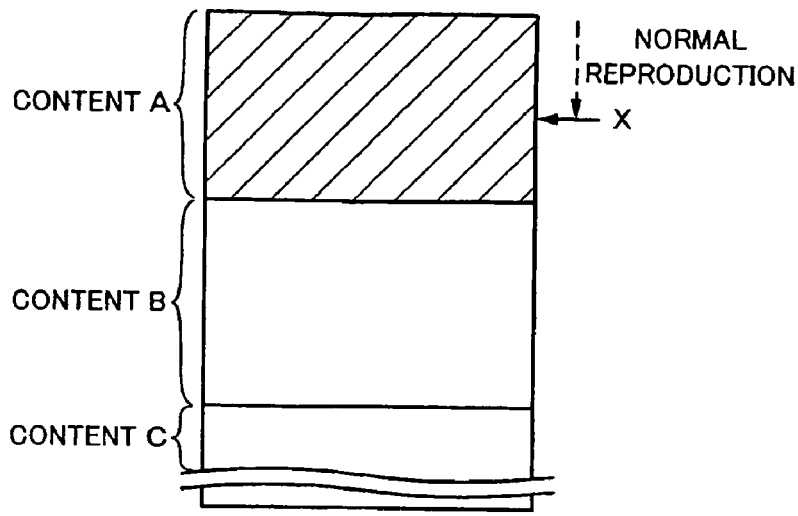
FIGS. 32A to 32C are schematic diagrams for explaining processes according to the first embodiment when the normal reproduction is restarted after the preview reproduction.

Initially, in the normal reproducing mode, as shown in an example in FIG. 32A, the whole length of the content data (assumed to be the content A, B, C, . . . ) which is reproduced is accumulated into the buffer memory from the head thereof. It is now assumed that when the content A has been reproduced to a position X in the normal reproducing mode, the reproducing mode has been switched from the normal reproducing mode to the preview reproducing mode.

When the reproducing mode is switched to the preview reproducing mode, the reproduction of the content A in the normal reproducing mode is stopped, the stop position X is stored, and the preview reproducing intervals of the content data which is preview-reproduced are read out of the HDD 32 and accumulated into the buffer memory.

Figure 32B:
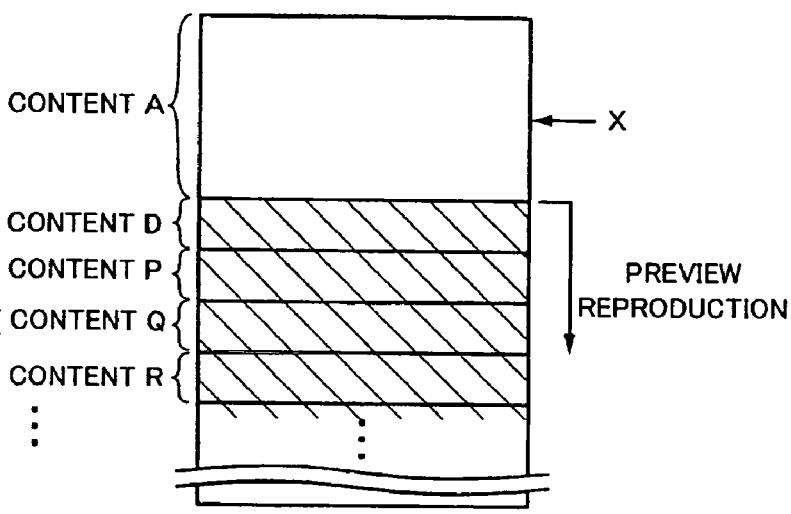

At this time, as shown in an example in FIG. 32B, the data of the content (content A in the example of FIGS. 32A to 32C) has been reproduced in the normal reproducing mode just before the reproducing mode is switched from the normal reproducing mode to the preview reproducing mode is left in the buffer memory. The content data to be preview-reproduced (assumed to be preview reproducing interval $PV_D$, preview reproducing interval $PV_P$, preview reproducing interval $PV_Q$, . . . ) is accumulated into the buffer memory in preview reproducing order from behind of the data of the content A left in the buffer memory.

Figure 32C:
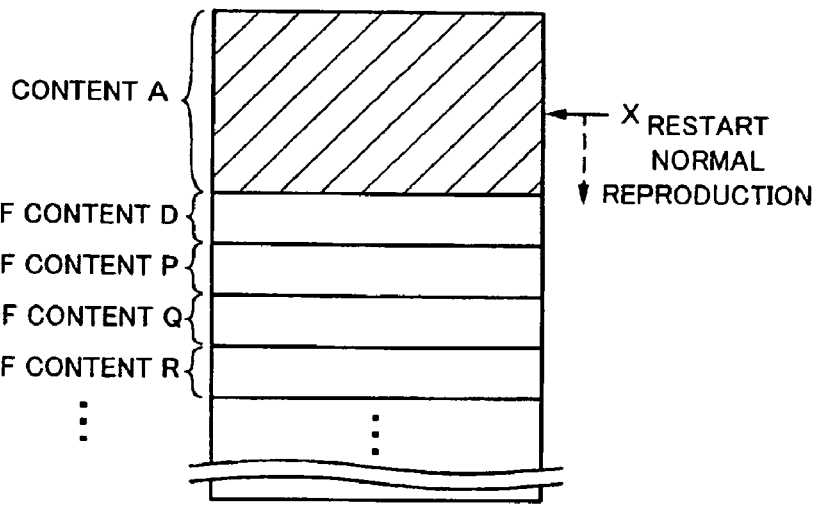

When the first data to be preview-reproduced (preview reproducing interval $PV_D$ of the content D in the example of FIGS. 32A to 32C) has been written into the buffer memory, the read pointer is moved from the position X where the reproduction of the content A has been stopped to the first data to be preview-reproduced, that is, to the head of the preview reproducing interval $PV_D$ of the content D.

In the case where the preview reproduction has been stopped and the reproduction of the content (content A) which has been reproduced in the normal reproducing mode just before the reproducing mode is switched to the preview reproducing mode is restarted, as shown in an example in FIG. 32C, the read pointer is moved to the position X and the content A left in the buffer memory is reproduced from the position X.

Although not shown, the content data to be reproduced from the next content of the content A whose reproduction has been restarted can be read out of the HDD 32 at the point of time when the preview reproduction has been stopped. In this case, the read-out data is overwritten to the data of the preview reproducing interval $PV_D$, preview reproducing interval $PV_P$, preview reproducing interval $PV_Q$, . . . in the buffer memory and accumulated just after the content A whose reproduction has been restarted.

3-2. Method According to the Second Embodiment of the Invention

A preview reproducing method according to the second embodiment of the invention will now be described. Also in the second embodiment, the content data file 200 described in the foregoing first embodiment can be applied. In the second embodiment, in the preview reproducing mode, the whole length of the audio data as a reproducing target is read out of the HDD 32 and accumulated in the buffer memory in a manner similar to the case of the normal reproducing mode.

3-2-1. Flow of Processes

FIG. 33 shows a sequence of an example of the preview reproduction according to the second embodiment. For example, the artist link mode is activated in accordance with the operation to the discovery key 14 of the operating unit 20 (step S90). When the artist link mode is activated, a pause command is issued to the player task 61 from the UI task 60 (SEQ31). The pause command is sent to the buffer task 62 from the player task 61 (SEQ32). The buffer task 62 which received the pause command temporarily stops the reading of the data from the buffer memory.

The buffer task 62 notifies the UI task 60 through the player task 61 that the pause command has been executed (SEQ33, SEQ34). The UI task 60 which received such a notification issues a command to the player task 61 so as to read out the audio data to be used for the preview reproduction from the HDD 32 (SEQ35). The player task 61 which received such a command inquires of the DB management task 63 about the content information to be preview-reproduced (SEQ36) and issues a data read command to the buffer task 62 on the basis of the content information obtained in response to such an inquiry (SEQ37).

The buffer task 62 reads out the content data file 200 from the HDD 32 in response to a read command (SEQ38, SEQ39). The audio data which is stored into the audio data portion 202 is extracted from the content data file 200 and sequentially accumulated in the buffer memory. In a manner similar to the foregoing first embodiment, the process to accumulate the audio data into the buffer memory is started together with the process of step S33 in the flowchart of FIG. 12 and executed together with the display of the on-search display screen 101 shown in FIG. 14.

The buffer task 62 temporarily writes the header portion 201 of the read-out content data file 200 into, for example, an area out of the buffer memory area in the RAM 37 and analyzes the header information (step S91). The header information obtained as a result of the analysis is held in the RAM 37 and transferred to the player task 61.

The analysis of the header information is made in a manner similar to the foregoing first embodiment. For example, the buffer task 62 obtains the information included in the header portion 201 (refer to step S80 in the flowchart of FIG. 26) and obtains the reproducing time per frame on the basis of the obtained header information (refer to step S81 in the flowchart of FIG. 26). Further, the buffer task 62 obtains the offset of the preview reproduction start position from the head of the audio data on the basis of the information showing the reproducing time per frame (refer to step S82 in the flowchart of FIG. 26) and calculates the number of frames adapted to reproduce the data for the predetermined time (30 seconds in this example) (refer to step S83 in the flowchart of FIG. 26).

If it is determined that the audio data of the predetermined amount or more has been accumulated in the buffer memory, the buffer task 62 notifies the UI task 60 of such a fact through the player task 61 (SEQ41, SEQ42). The UI task 60 which received such a notification issues a queue command to the player task 61 (SEQ43). In response to the queue command, the player task 61 issues a command to the buffer task 62 so as to move the read pointer to the offset position obtained as a result of the analysis of the header information (SEQ44).

Figure 34:
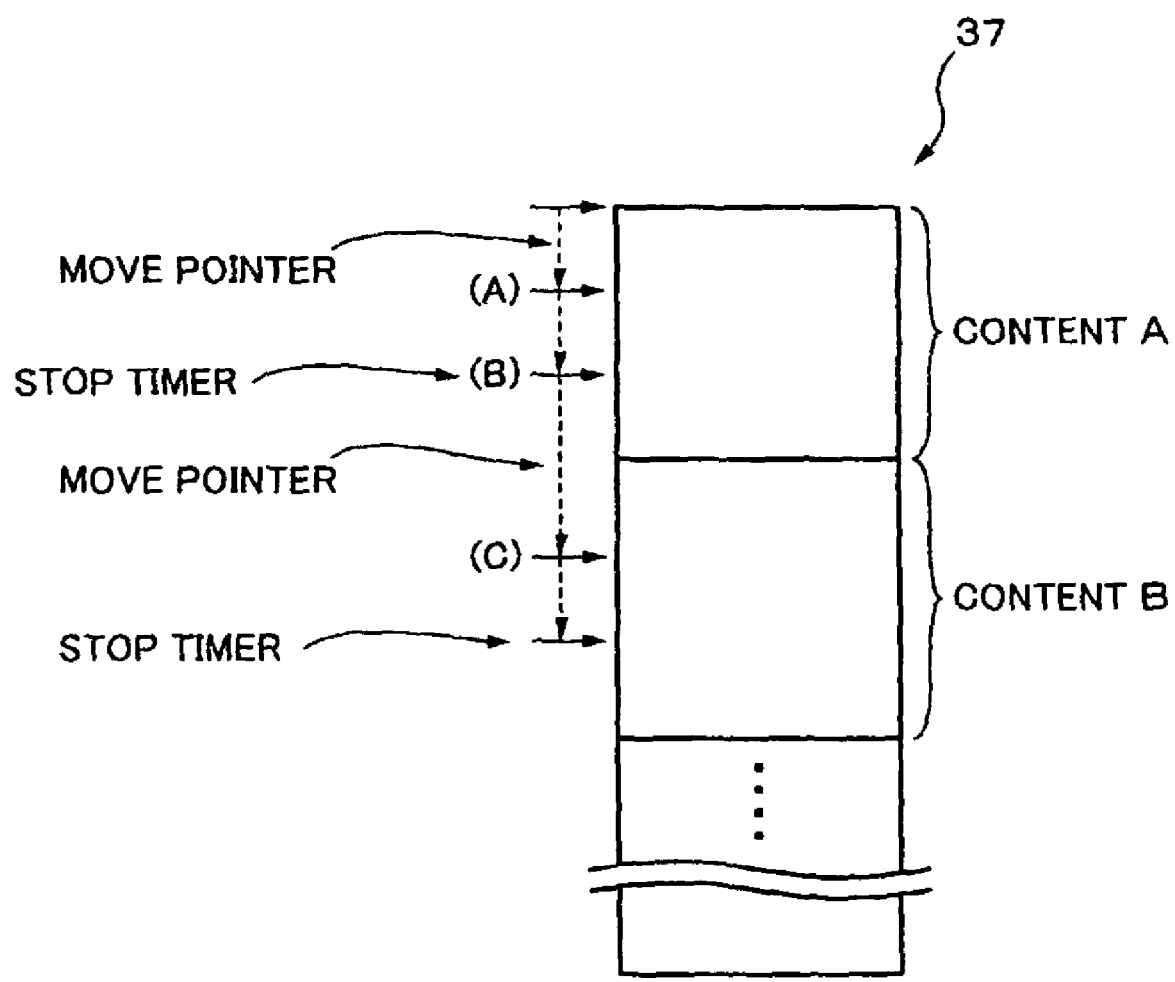
FIG. 34 is a schematic diagram showing the state of movement of a reading pointer according to the second embodiment.

In response to this command, the buffer task 62 moves the read pointer to the offset position. The state of the movement of the read pointer by the buffer task 62 is schematically shown in FIG. 34. It is assumed that the content A, content B, . . . have been accumulated in the buffer memory by the amount corresponding to the whole length of the audio data, respectively. For example, in the audio data of the content A, the offset position, that is the position after 45 seconds as a reproducing time from the head of the audio data is shown as a position (A) and the position after 30 seconds as a reproducing time from the position (A) is shown as a position (B). An interval between the positions (A) and (B) is an interval during which the audio data is preview-reproduced. According to the command by SEQ44, the read pointer is moved to the position (A) from the head of the audio data of the content A.

When the movement of the read pointer is completed, the buffer task 62 notifies the UI task 60 of such a fact through the player task (SEQ45, SEQ46). In response to such a notification, the UI task 60 issues a pause cancelling command to the player task 61 (SEQ47). In response to the pause cancelling command, the player task 61 issues a command to the buffer task 62 so as to read out the data from the buffer memory (SEQ48). In response to such a command, the buffer task 62 reads out the data from the buffer memory. The read-out data is sent to the decoder 43 by the decoder control task 65 and decoded.

When the UI task 60 issues the pause cancelling command in SEQ47 mentioned above, it starts the measurement of the time by the real-time clock 46. When the predetermined time of (for example, 30 seconds) corresponding to the time to execute the preview reproduction has elapsed, the UI task 60 issues the pause command. The pause command is sent to the buffer task 62 through the player task 61 (SEQ49, SEQ50). In response to the pause command, the buffer task 62 stops the reading of the data from the buffer memory. In the example of FIG. 34, the reading of the data from the buffer memory is stopped at the position (B) where the reproducing time of 30 seconds has elapsed from the position (A). When the reading of the data is stopped, the UI task 60 is notified of such a fact through the player task 61 (SEQ51, SEQ52).

Although not shown, when the UI task 60 receives the notification by SEQ52, for example, it returns the process to SEQ43 mentioned above and issues the queue command to the buffer task 62 through the player task 61 so as to preview-reproduce the next content. On the basis of the queue command, the buffer task 62 moves the read pointer to the offset position (position (C) in the content B in the example of FIG. 34) of the next audio data in the buffer memory. In this manner, the content can be sequentially preview-reproduced.

The buffer task 62 is also continuously executing the reading of the audio data from the HDD 32 which is started in SEQ38 mentioned above and the accumulation of the read-out audio data into the buffer memory while other processes after SEQ38 are being executed (SEQ40). When the whole length of the audio data stored in one content data file 200 has been accumulated in the buffer memory, the next content data file 200 is read out of the HDD 32. Those processes are shown in a portion under a broken line in FIG. 33.

The processes for reading out the audio data from the HDD 32 and accumulating it into the buffer memory are continuously executed in parallel with the foregoing preview reproduction control (SEQ40). When the reading of one audio data is completed (SEQ60), the information of the data to be read out subsequently is requested to the player task 61 from the buffer task 62 (SEQ61). In response to such a request, the player task 61 inquires of the DB management task 63 about the information of the content to be read out subsequently (SEQ62) and issues a read command of the data to the buffer task 62 on the basis of the obtained content information obtained in response to the inquiry (SEQ63).

In response to the read command, the buffer task 62 reads out the content data file 200 from the HDD 32 (SEQ64, SEQ65) and analyzes the header information (step S93). The analyzed header information is held in an area out of the buffer memory area in the RAM 37. The audio data stored in the audio data portion 202 is accumulated into the buffer memory. When the reading of the one content data file 200 from the HDD 32 has been completed (SEQ66) and the whole length of the audio data stored in the content data file 200 has been accumulated into the buffer memory, the information of the data to be read out subsequently is requested to the player task 61 from the buffer task 62 (SEQ67). Such processes are repeated, for example, until an empty area enough to store the next audio data into the buffer memory is extinguished.

Figure 35A:
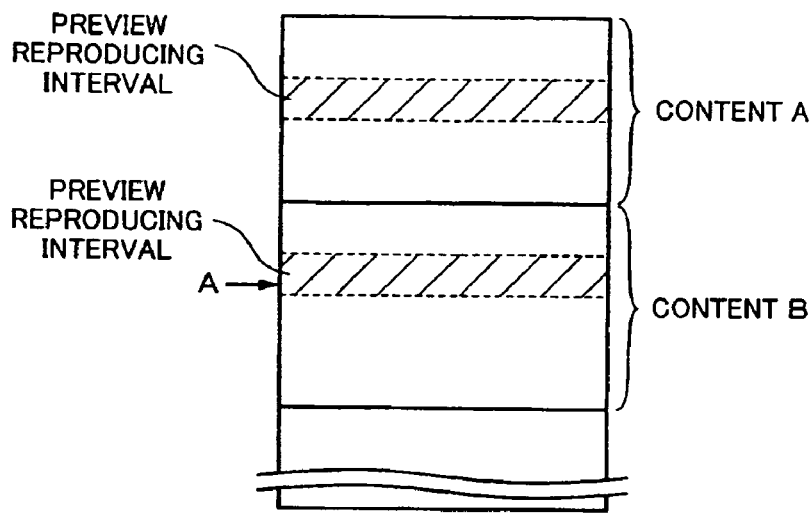
FIGS. 35A to 35C are schematic diagrams for explaining processes according to the second embodiment when the reproducing mode is switched from the preview reproduction to the normal reproduction.

3-2-2. Operation when Switching the Preview Reproducing Mode and the Normal Reproducing Mode With reference to FIGS. 35A to 35C, explanation will be subsequently made with respect to an example in which the two kinds of operations described with reference to FIGS. 8A and 8B at the time when the reproducing mode is switched from the preview reproducing mode to the normal reproducing mode during the preview reproduction are applied to the second embodiment. In the second embodiment, the whole length of the audio data is accumulated into the buffer memory. For instance, as shown in FIG. 35A, it is assumed that the content A and the content B have been accumulated in the buffer memory and the normal reproduction has been designated at the position A in the preview reproducing interval (shown with oblique lines) of the content B.

Figure 35B:
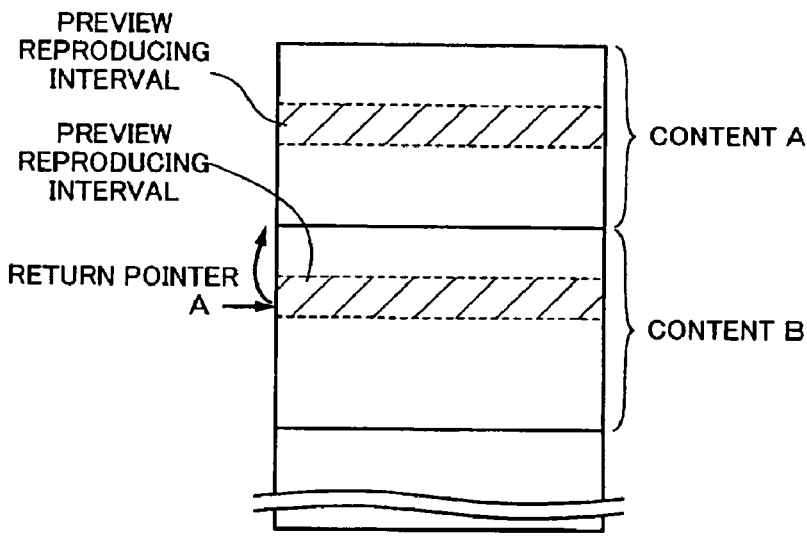
Figure 35C:
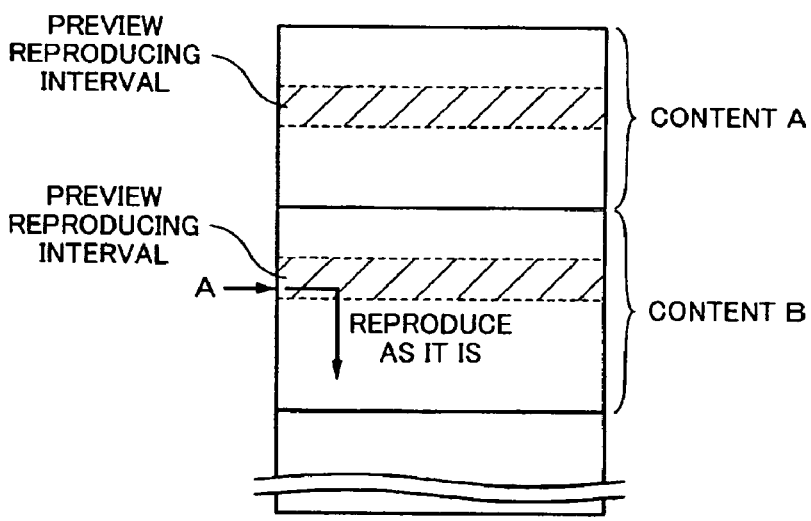

As shown in an example in FIG. 35B, the first method of starting the reproduction from the head of the audio data which has been preview-reproduced can be realized by moving the read pointer to the head of the audio data which is being preview-reproduced at present. As shown in an example in FIG. 35C, the second method of continuously executing the reproduction from the position where the preview reproduction has been stopped can be realized by continuing the movement of the read pointer during the preview reproduction.

As mentioned above, in the second embodiment, also in the preview reproduction, the whole length of the audio data is accumulated into the buffer memory in a manner similar to the normal reproduction. Therefore, it is disadvantageous to the second embodiment in terms of using efficiency of the buffer memory as compared with the first embodiment. On the other hand, since the whole length of the audio data has been accumulated in the buffer memory, particularly, the second embodiment has such an advantage that the control upon shifting from the preview reproduction to the normal reproduction is easy.

Figure 36:
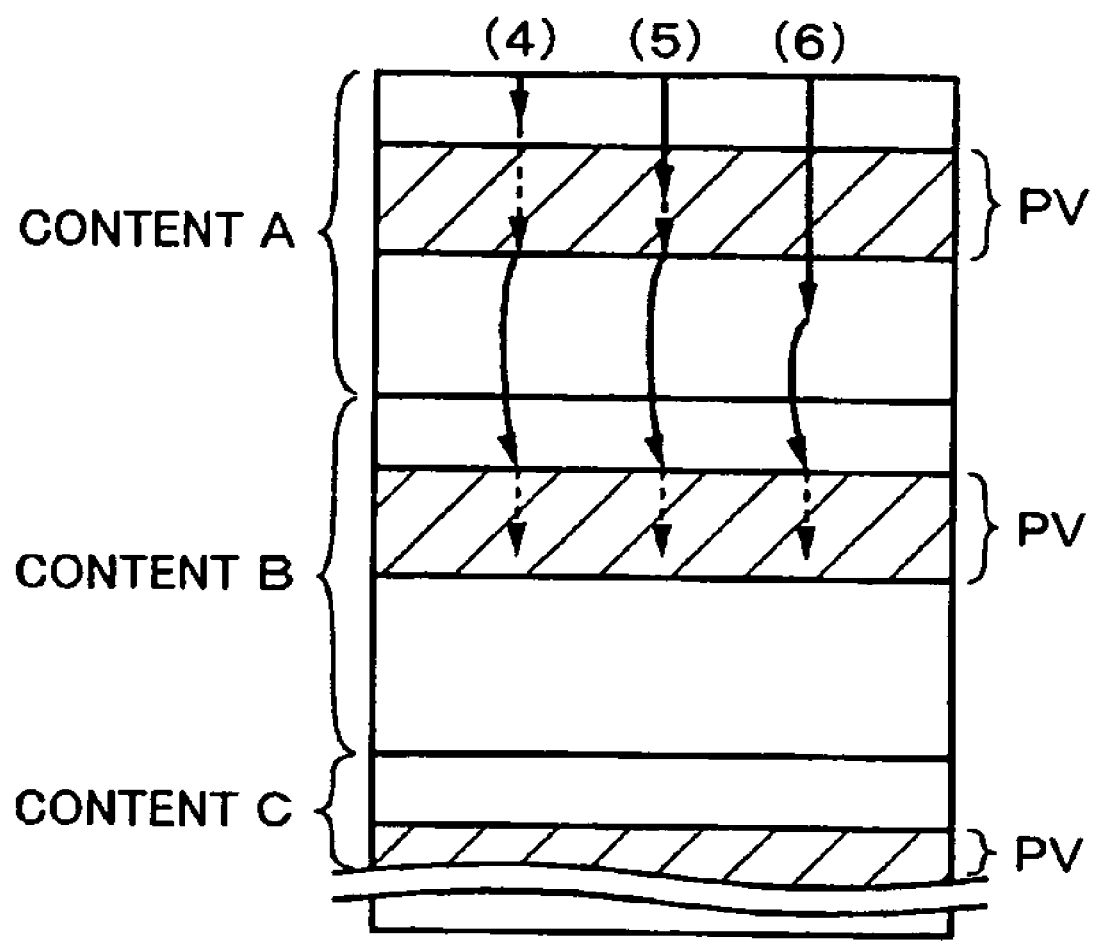
FIG. 36 is a schematic diagram for explaining processes according to the second embodiment when the reproducing mode is switched from the normal reproduction to the preview reproduction.

The operation to switch the reproducing mode from the normal reproducing mode to the preview reproducing mode during the normal reproduction will now be described. In the second embodiment, as already described above, the whole length of the audio data has been accumulated in the buffer memory irrespective of the normal reproducing mode or the preview reproducing mode. Therefore, as shown in an example in FIG. 36, the switching from the normal reproducing mode to the preview reproducing mode can be realized merely by moving the read pointer even in any one of the case (4) where the switching of the reproducing mode is performed before the preview reproducing interval PV, the case (5) where it is performed on the way of the preview reproducing interval, and the case (6) where it is performed after the preview reproducing interval.

As already described with reference to FIG. 19, there is also considered the case where the reproducing mode is switched to the preview reproducing mode during the reproduction in the normal reproducing mode and is further switched to the normal reproducing mode during the reproduction in the preview reproducing mode, and the normal reproduction of the content is restarted from the position where the data has been reproduced in the normal reproducing mode just before the reproducing mode is switched to the preview reproducing mode. The control of the buffer memory according to the second embodiment which takes into consideration of such a case will be described with reference to FIGS. 37A to 37C.

Figure 37A:
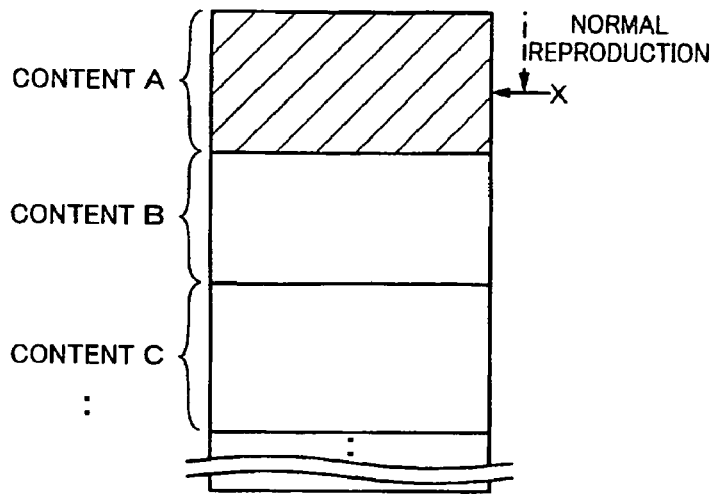
FIGS. 37A to 37C are schematic diagrams for explaining processes according to the second embodiment when the normal reproduction is restarted after the preview reproduction.

Initially, in the normal reproducing mode, as shown in an example in FIG. 37A, the whole length of the reproduced content data (assumed to be the content A, B, C, . . . ) is accumulated into the buffer memory from the head thereof. It is now assumed that when the content A has been reproduced up to the position X in the normal reproducing mode, the reproducing mode is switched to the preview reproducing mode from the normal reproducing mode.

When the reproducing mode is switched to the preview reproducing mode, the reproduction of the content A in the normal reproducing mode is stopped and the stop position X is stored. The content data (assumed to be the content P, Q, . . . ) which is preview-reproduced is read out of the HDD 32 and accumulated into the buffer memory.

Figure 37B:
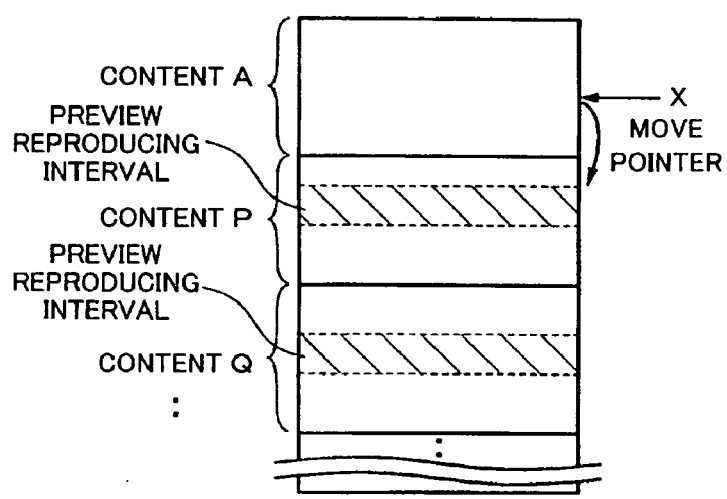

At this time, as shown in an example in FIG. 37B, the data of the content (content A in the example in FIGS. 37A to 37C) which has been reproduced in the normal reproducing mode just before the reproducing mode is switched from the normal reproducing mode to the preview reproducing mode is left in the buffer memory. The content data (assumed to be the content P, Q, . . . ) which is preview-reproduced is accumulated in preview reproducing order from behind of the data of the content A left in the buffer memory. In the second embodiment, the whole length of the content data which is preview-reproduced is read out of the HDD 32 and accumulated in the buffer memory.

The first data (content P in the example in FIGS. 37A to 37C) which is preview-reproduced has been stored into the buffer memory, the read pointer is moved from the position X where the reproduction of the content A has been stopped to the head of the preview reproducing interval in the first data, that is, the content P which is preview-reproduced.

Figure 37C:
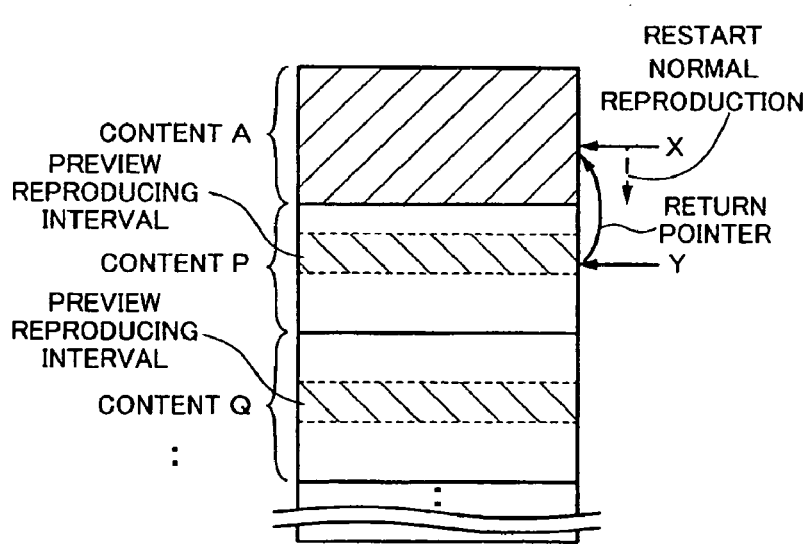

As shown in an example in FIG. 37C, in the case where the preview reproduction has been stopped at, for example, the position Y and the reproduction of the content (content A) which has been reproduced in the normal reproducing mode just before the reproducing mode is switched to the preview reproducing mode is restarted, the read pointer is moved from the position Y to the position X and the content A left in the buffer memory is reproduced from the position X.

Although not shown, at the point of time when the preview reproduction has been stopped, the content data to be reproduced after the content A whose reproduction has been restarted can be read out of the HDD 32. In this case, the read-out content data is overwritten to the content P, Q, . . . to execute the preview reproduction which have been accumulated in the buffer memory and is accumulated just after the content A whose reproduction has been restarted.

4. Modification Common to the First and Second Embodiments of the Invention 4-1. Obtainment of a Preview Reproducing Interval from an Outside A modification common to the first and second embodiments of the invention will now be described. Although the above first and second embodiments have been described on the assumption that the interval to execute the preview reproduction is fixed, the invention is not limited to such an example. In the modification common to the first and second embodiments of the invention, the information showing the preview reproducing interval is made to correspond to the content and the interval to execute the preview reproduction can be set every content.

Figure 38:
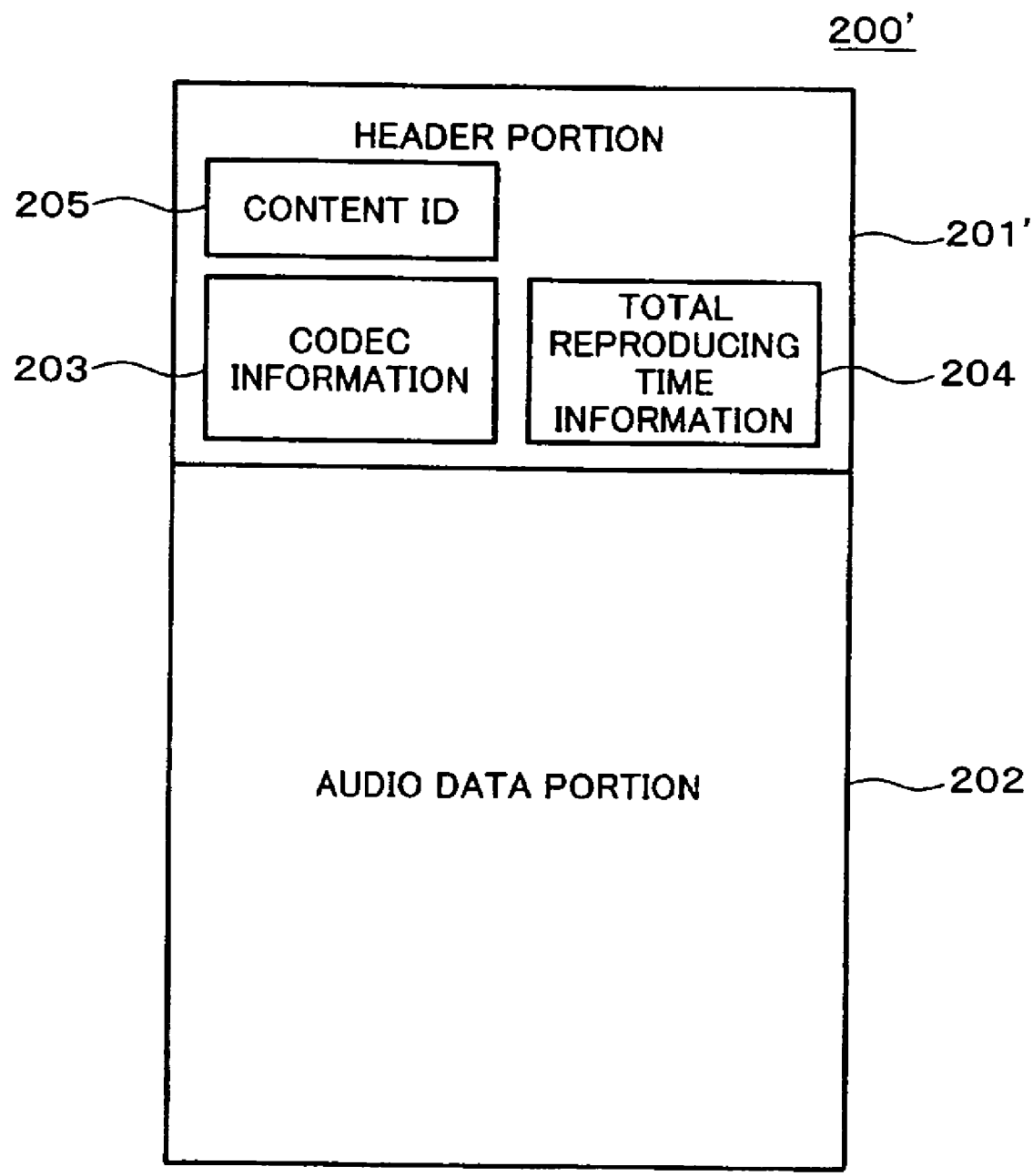
FIG. 38 is a schematic diagram showing a construction of a content data file of an example in the case where a content ID is included in a header portion.

For example, as schematically shown in FIG. 38, a content ID 205 to identify the content is previously stored in a header portion 201' of a content data file 200'. For example, on the music server 4 side, the content ID is previously described in the content data file 200' to be downloaded.

The content ID is not particularly limited so long as it can unconditionally identify the content. If a file name of the content data file 200' is unique, this file name may be used as a content ID. In this case, it is unnecessary to describe the content ID into the header portion 201'. The case of using file size information as a content ID is also considered.

When the content ID and the preview reproducing interval are held in correspondence to each other and the content data file 200' is download to the PC 2, the music server 4 transmits the preview reproducing interval information corresponding to the content ID of the content data to the PC 2 together with the content data file 200'. The PC 2 transfers both of the downloaded content data file 200' and the preview reproducing interval information corresponding to the content data file 200' to the reproducing apparatus 1.

When the content data file 200' is transferred from the PC 2, the reproducing apparatus 1 analyzes the header portion 201' of the file, obtains the content ID, and manages the obtained content ID and the preview reproducing interval information transferred together with the content data file 200' as a table in correspondence to each other.

FIG. 39 shows an example of a preview reproducing interval information table in which the content ID and the preview reproducing interval information are made to correspond to each other. In the example of FIG. 39, a head position of the preview reproducing interval is shown by the reproducing time from the head position of the audio data and the reproducing time is made to correspond to the content ID. For example, in the content data file 200' corresponding to the content ID "xxx01", the position after 30 seconds from the head position of the audio data portion 202 is set to the start position of the preview reproducing interval. Similarly, in the content data file 200' corresponding to the content ID "xxx02", the position after one minute from the head position of the audio data portion 202 is set to the start position of the preview reproducing interval. The invention is not limited to such an example but a length of the preview reproducing interval or an end position of the preview reproducing interval may be also included as preview reproducing interval information.

For example, if a portion typically showing a feature of the corresponding content is selected as a preview reproducing interval shown by the preview reproducing interval information, the user can easily search for the desired content at the time of the preview reproduction. Therefore, it is preferable.

Figure 40:
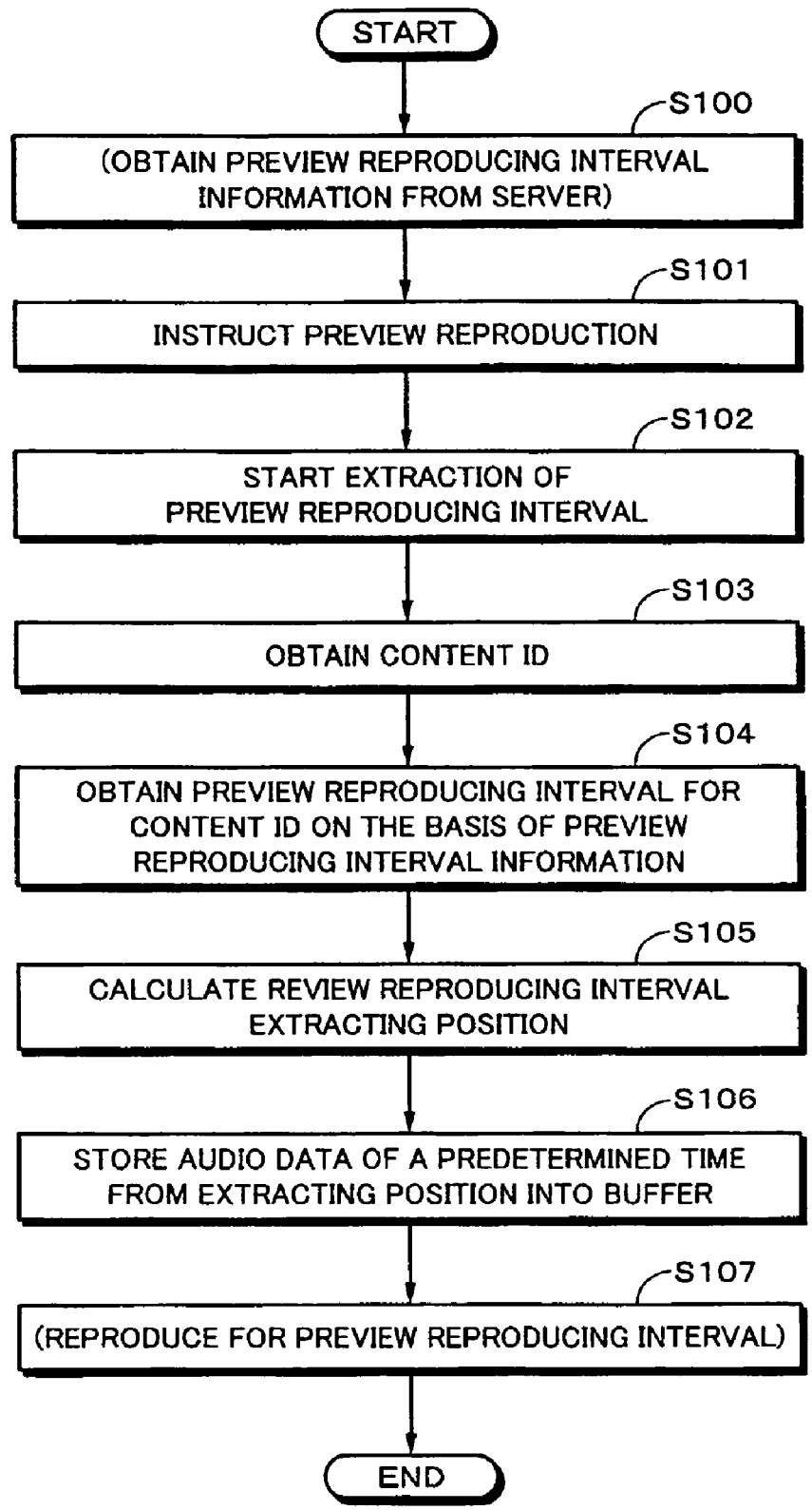
FIG. 40 is a flowchart of an example showing a preview reproducing process in the case of using preview reproducing interval information.

FIG. 40 is a flowchart of an example showing a preview reproducing process in the case of using the preview reproducing interval information. It is presumed here that the preview reproduction in the reproducing apparatus 1 is executed by storing only the portion corresponding to the preview reproducing interval of the audio data into the buffer memory in accordance with the method according to the first embodiment.

On the reproducing apparatus 1 side, the preview reproducing interval information corresponding to the audio data to be preview-reproduced is previously obtained by downloading it from the music server 4, or the like (step S100). It is not typically limited to the construction in which the preview reproducing interval information is obtained simultaneously with the corresponding audio data but it can be also separately obtained from the music server 4 on the basis of the content ID. The obtained preview reproducing interval information is described in the preview reproducing interval information table shown in the example in FIG. 39 in correspondence to the content ID and stored into, for example, the HDD 32 of the reproducing apparatus 1.

For example, it is assumed that the discovery key 14 of the operating unit 20 has been operated by the user and the preview reproduction of certain content (assumed to be the content P) has been instructed (step S101). This instruction is sent from the UI task 60 to the player task 61. The player task 61 inquires of the DB management task 63 about the information of the content P to be preview-reproduced. The information according to this inquiry is returned from the DB management task 63. On the basis of the information returned from the DB management task 63, the player task 61 instructs the buffer task 62 to output the content data file 200' to be read out of the HDD 32.

When the content data file 200' is read out, the buffer task 62 starts the extracting process of the preview reproducing interval of the read-out content data file 200' (step S102). First, the buffer task 62 analyzes the header portion 201' of the content data file 200' and obtains the content ID 205 (step S103). Subsequently, the buffer task 62 obtains the preview reproducing interval information corresponding to the content ID with reference to the preview reproducing interval information table on the basis of the obtained content ID (step S104).

Although not shown, the buffer task 62 obtains the reproducing time per frame of the audio data main body stored in the content data file 200' on the basis of the analysis result of the header portion 201', for example, on the basis of the information showing the frame size described in the codec information 203 or the bit rate information upon compression encoding.

In next step S105, the buffer task 62 calculates the offset of the preview reproducing start position from the head of the audio data portion 202 on the basis of the reproducing time per frame and the preview reproducing interval information obtained in step S104 on the basis of the content ID. For example, the frame close to the value obtained by calculating [(time information shown in the preview reproducing interval information)/(the reproducing time per frame)] is set to the offset. Further, the buffer task 62 calculates the data size (the number of frames) adapted to reproduce the data for the predetermined time (30 seconds in this example) on the basis of the information of the reproducing time per frame.

As mentioned above, the time to perform the preview reproduction may be included as preview reproducing interval information. In this case, the data size of the audio data to perform the preview reproduction is calculated by using the information described in the preview reproducing interval information table in correspondence to the content ID of the audio data.

When the offset from the head of the file of the audio data portion 202 and the data size of the preview reproducing interval are obtained as mentioned above, the processing routine advances to step S106. The audio data is read out of the HDD 32 on the basis of the obtained information. That is, in step S106, the content data file 200' in the HDD 32 is accessed and the audio data of only the amount of the data size of the preview reproducing interval is read out from the position of the offset obtained in step S105. The read-out audio data is stored into the buffer memory.

When the audio data of a predetermined amount or more has been stored in the buffer memory, the buffer task 62 notifies the decoder control task 65 of such a fact. In accordance with such a notification, the decoder control task 65 reads out the audio data from the buffer memory and transfers it to the decoder control unit 67 and the audio data in the preview reproducing interval is reproduced (step S107).

By associating the unique content ID to identify the content with the preview reproducing interval of the content as mentioned above, the music server 4 side can set the preview reproducing interval optimum to each content. Thus, the user side can more properly select the desired content by the preview reproduction.

Figure 41:
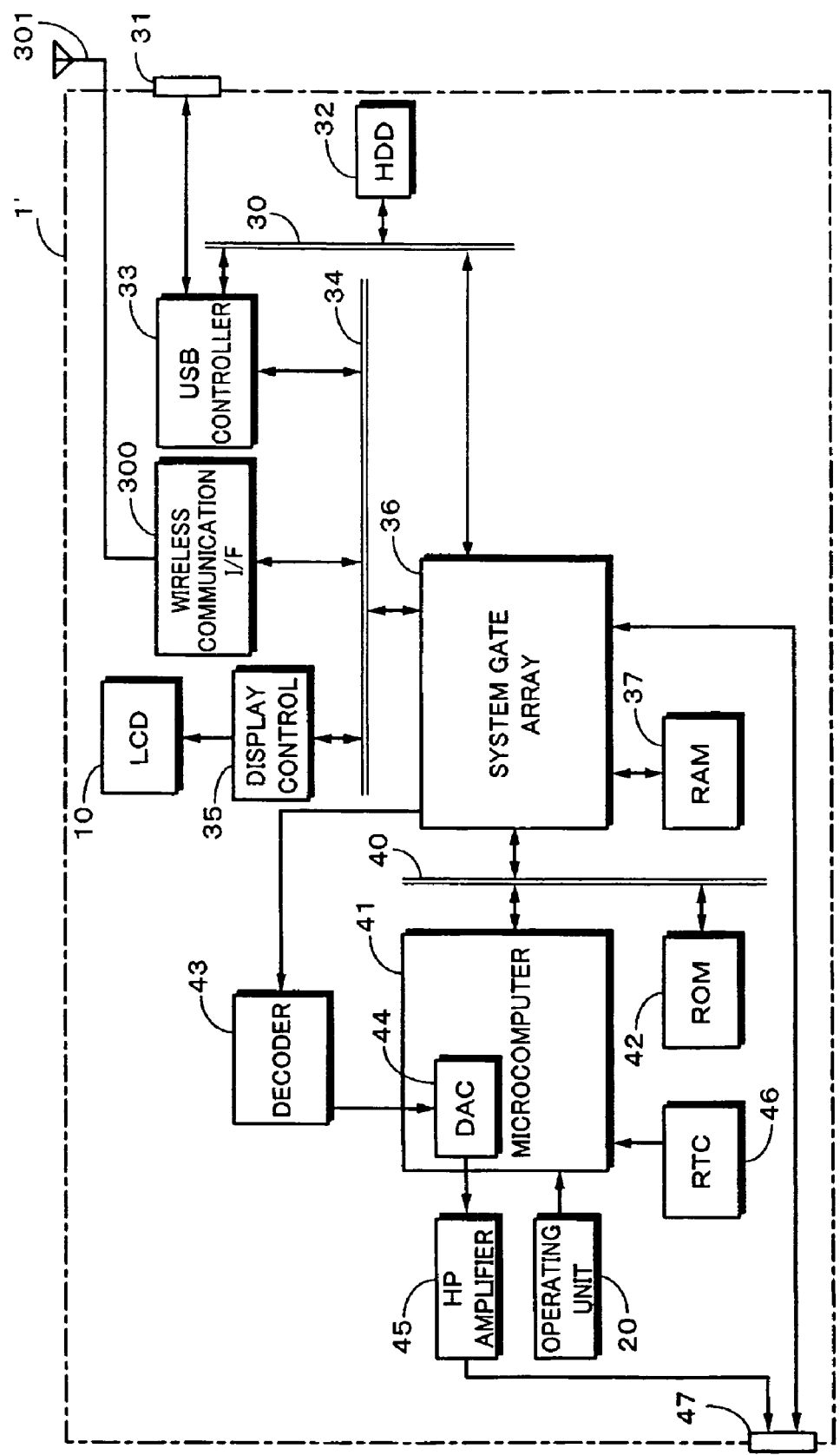
FIG. 41 is a block diagram showing a construction of an example of the reproducing apparatus having a wireless communication I/F.

4-2. Another System Form of the Modification Common to the First and Second Embodiments Although the invention has been described above on the assumption that the preview reproducing interval information is supplied from the music server 4 to the reproducing apparatus 1 through the PC2, the invention is not limited to such an example. For instance, as shown in an example in FIG. 41, a reproducing apparatus 1' is constructed by providing a wireless communication I/F 300 to control, for example, wireless data communication and an antenna 301 for the construction of the reproducing apparatus 1 shown in FIG. 3 and communicates with the outside through the antenna 301, thereby enabling the preview reproducing interval information to be obtained.

Although a communicating system which can be applied to the wireless communication I/F 300 is not particularly limited, for instance, the communicating system according to the IEEE (Institute Electrical and Electronics Engineers) 802.11 standard may be used.

Figure 42:
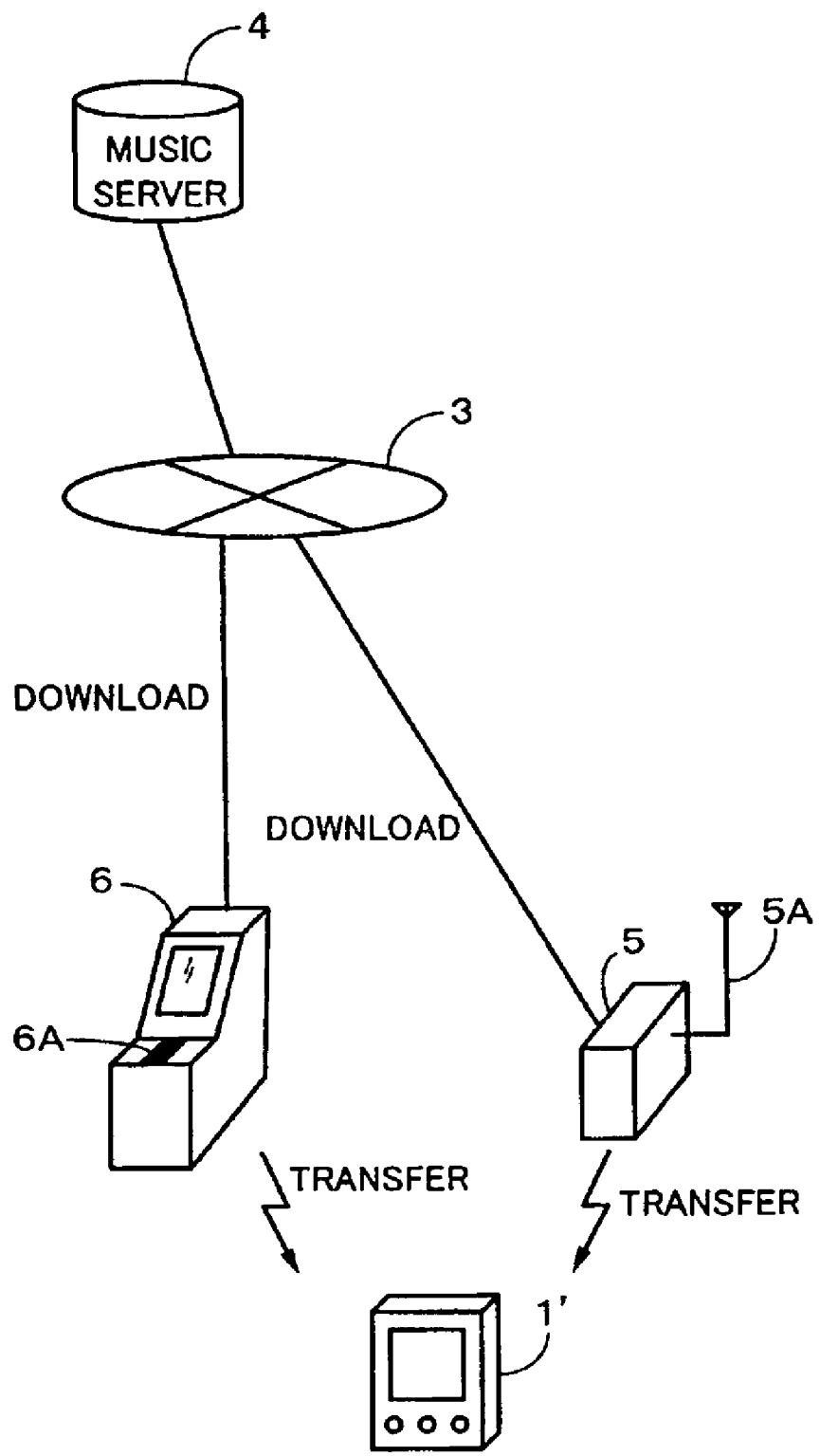
FIG. 42 is a schematic diagram showing an example of a using form of the reproducing apparatus in the case of obtaining the preview reproducing interval information through wireless communication.

FIG. 42 shows an example of a using form of the reproducing apparatus 1' in the case of obtaining the preview reproducing interval information through the wireless communication. It is assumed that the content data obtained from the music server 4 through the PC2 has previously been recorded in the reproducing apparatus 1'. A terminal 5 is a wireless terminal for providing a hot spot service, is connected to the Internet 3, and has a communicating function by a wireless LAN (Local Area Network). The hot spot service is a service for locally providing an environment where the terminal can be connected to the Internet by using the wireless LAN. For example, the terminal 5 is arranged a public facility such as station or airport, a shop which provides the hot spot service, or the like and can communicate with a computer apparatus or the like which corresponds to the communication by the wireless LAN and lies within a communicatable range through an antenna 5A.

An information terminal apparatus 6 is arranged in, for example, a relatively large shop, what is called a convenience store, or the like and is connected to a predetermined network. The user can obtain the selected information by operating the information terminal apparatus 6 in accordance with a menu which is displayed on a display screen of the information terminal apparatus. The information terminal apparatus 6 can transmit and receive data by the wireless communication through a communicating unit 6A. The user can obtain the information by the wireless communication in accordance with the operation to the information terminal apparatus.

In the reproducing apparatus 1', it is assumed that a URL (Uniform Resource Locator) of the music server 4 has previously been stored in, for example, the ROM 42. When the content data file 200' is downloaded from the music server 4, the reproducing apparatus 1' obtains the content ID 205 from the header portion 201' of the content data file 200' and described, for example, only the content ID 205 into the preview reproducing interval information table. A list of the content IDs 205 may be separately formed or the content ID 205 may be also described in the attribute information table.

For example, in the case of using the terminal 5, the user carries the reproducing apparatus 1' and enters a wireless communicating range of the terminal 5. By executing a predetermined operation to the operating unit 20 of the reproducing apparatus 1', the communication is made between the reproducing apparatus 1' and the terminal 5.

When the communication with the terminal 5 is established, the reproducing apparatus 1' communicates with the music server 4 through the Internet 3. For instance, on the basis of the information in the preview reproducing interval information table, the reproducing apparatus 1' transmits the list of the content IDs 205 of the contents to which the preview reproducing interval information is not made to correspond among the contents recorded in the HDD 32 to the music server 4 through the terminal 5. The music server 4 searches for the preview reproducing interval information corresponding to the content IDs 205 included in the list and transmits each of the preview reproducing interval information obtained as a result of the search in correspondence to the content ID 205. The transmitted preview reproducing interval information is received by the terminal 5 and transferred to the reproducing apparatus 1' from the terminal 5 by the wireless communication.

In the case of using the information terminal apparatus 6, since the information terminal apparatus 6 has the display unit and the operating unit, it is easy to enable the user to select the preview reproducing interval information to be downloaded or it is easy to charge the user for the downloading of the preview reproducing interval information.

For instance, when the user allows the reproducing apparatus 1' to approach the information terminal apparatus 6 and executes a predetermined operation to the information terminal apparatus 6, communication is made between the reproducing apparatus 1' and the information terminal apparatus 6. When the communication is established between the reproducing apparatus 1' and the information terminal apparatus 6, the information terminal apparatus 6 requests the reproducing apparatus 1' to output the information of the preview reproducing interval information table and the attribute information table. The information terminal apparatus 6 displays the list of the content names corresponding to the content IDs 205 into the display unit on the basis of the information transmitted from the reproducing apparatus 1' in response to such a request. The user selects the content which he wants to download the preview reproducing interval information to the operating unit of the information terminal apparatus 6 on the basis of the display of the display unit. The content ID 205 of the selected content is transmitted to the music server 4 from the information terminal apparatus 6 through the Internet 3. The music server 4 searches for the preview reproducing interval information corresponding to the received content ID 205 and transmits it to the information terminal apparatus 6 through the Internet 3. The information terminal apparatus 6 transfers the received preview reproducing interval information to the reproducing apparatus 1'.

By using the reproducing apparatus 1' having the wireless communicating function, the content can be downloaded from the music server 4 even in the environment without the PC 2 connected to the Internet 3 at anywhere the terminal 5 or the information terminal apparatus 6 of the foregoing hot spot has been arranged.

5. Further Another Modification of the Embodiments of the Invention

Further another modification of the first and second embodiments of the invention and their modification will now be described. Although the foregoing first and second embodiments and their modification have been described on the assumption that the reproducing apparatus 1 or the reproducing apparatus 1' has the hard disk drive 32 as a recording medium and the content data downloaded from the music server 4 is recorded into the HDD 32, the invention is not limited to such an example.

Figure 43:
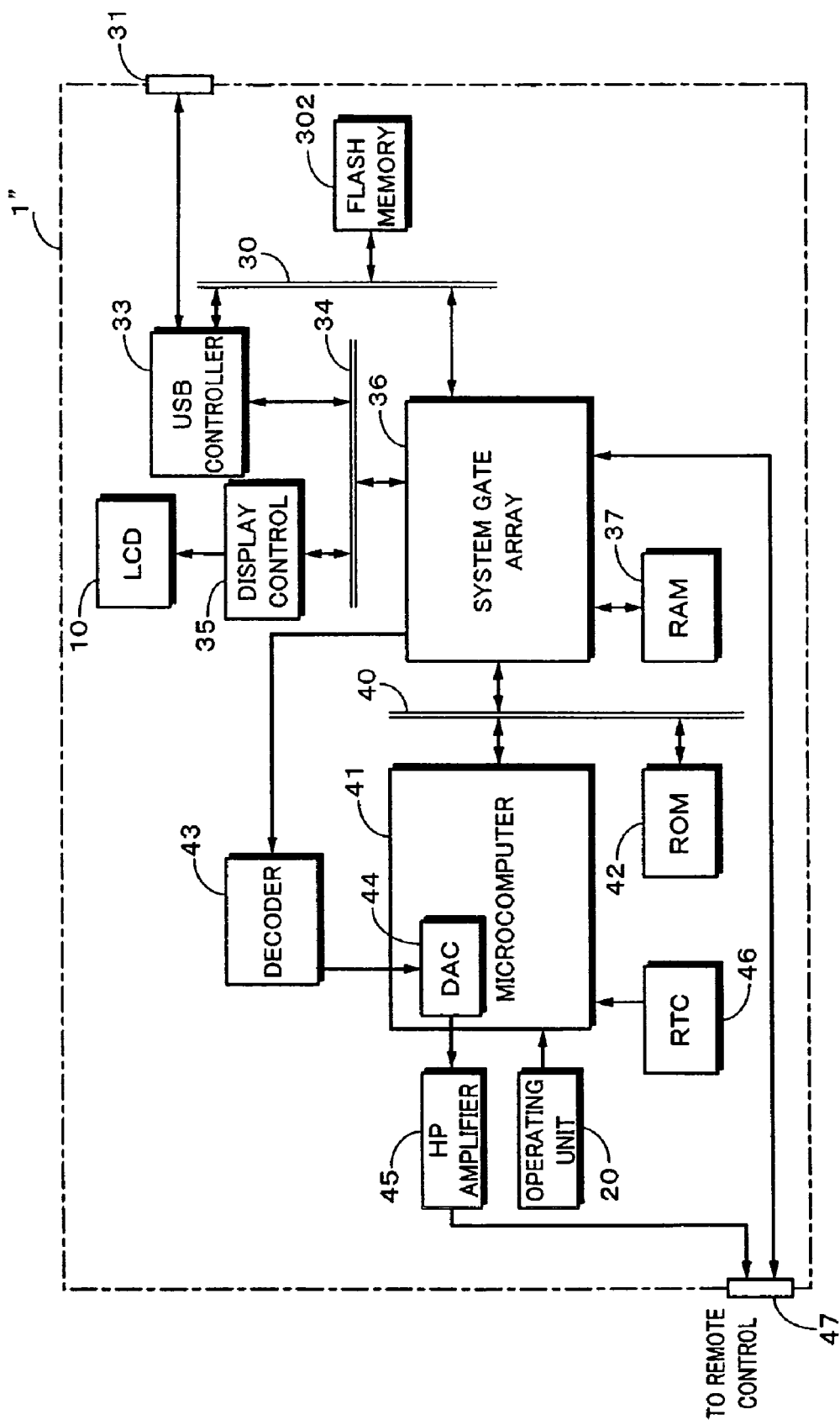
FIG. 43 is a block diagram showing a construction of an example of the reproducing apparatus in the case of using a rewritable ROM as a recording medium.

For instance, as shown in an example in FIG. 43, a rewritable ROM such as a flash memory 302 may be used as a recording medium for recording the content data. Since an accessing speed of the flash memory 302 is higher than that of the HDD 32 and it does not have a mechanical portion, the flash memory 302 is strong against the vibration or the like and its electric power consumption is smaller than that of the HDD 32. Therefore, by directly accessing the audio data in the flash memory 302 without using the buffer memory, the preview reproduction can be realized. In this case, for example, the case whereby the preview reproduction control is made by the method according to the foregoing second embodiment is considered.

Although the flash memory 302 has been shown in FIG. 43 as if it was built in a reproducing apparatus 1", the invention is not limited to such an example but the flash memory 302 can be also constructed so as to be detachable to the reproducing apparatus 1". If the flash memory 302 is detachable to the reproducing apparatus 1", for example, a using method whereby the content data is externally stored into the flash memory 302 and, thereafter, the flash memory 302 in which the content data has been stored is loaded into the reproducing apparatus 1" and used is possible. In this case, the USB controller 33 and the USB connector 31 may be omitted from the construction of the reproducing apparatus 1".

Although the embodiment has been described on the assumption that the content is the audio data, the invention is not limited to such an example. That is, the invention can be also applied to other content so long as it is the information which has time information and changes time-sequentially. For example, video data can be applied as content.

Further, the embodiments disclosed in the invention are not limited only to the reproducing apparatus but can be also accomplished in the server 4 and PC 2.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing apparatus comprising:
a buffer memory unit in which content data of a plurality of content data read out of a storing unit is accumulated;
the storing unit storing the plurality of content data;
a control unit configured to:
when the reproducing apparatus operates in a first reproducing mode, reading out a predetermined portion of a first content data stored in said storing unit from said storing unit based on a first attribute information corresponding to said first content data and storing the read-out predetermined portion of the first content data in said buffer memory unit, and reading out a predetermined portion of a second content data from said storing unit based on a second attribute information corresponding to said second content data and storing the read-out predetermined portion of the second content data in said buffer memory unit subsequently to the read-out predetermined portion of the first content data, and
when the reproducing apparatus operates in a second reproducing mode, reading out all of the first content data stored in the storing unit from the storing unit based on the first attribute information and storing the read-out all of the first content data in the buffer memory unit; and
a reproducing unit configured to:
in the first reproducing mode, reproducing the predetermined portion of the first content data stored in the buffer memory unit, and after reproducing the predetermined portion of the first content data, reproducing the predetermined portion of the second content data stored in the buffer memory unit; wherein
in the second reproducing mode, when at least one indicator that controls selection of content data from the plurality of content data has been placed upon a portion of a display corresponding to the first content data and has remained on the portion for a period of time that is equal to or exceeds a predetermined threshold, the second reproducing mode is switched to the first reproducing mode.

2. The reproducing apparatus according to claim 1, wherein:
when the first reproducing mode is switched to said second reproducing mode during a reproduction of the predetermined portion of the first content data in said first reproducing mode, said control unit erases data stored in said buffer memory unit, reads out a whole length of the first content data from said storing unit, and allows the read-out whole length of the first content data to be stored into said buffer memory unit.

3. The reproducing apparatus according to claim 1, wherein:
when the first reproducing mode is switched to said second reproducing mode during a reproduction of the predetermined portion of the first content data in said first reproducing mode, said control unit reads out data subsequent to said predetermined portion of the first content data from said storing unit and allows said read-out data subsequent to said predetermined portion of the first content data to be stored into said buffer memory unit subsequently to said predetermined portion of the first content data, the predetermined portion is being reproduced and has been stored in said buffer memory unit.

4. The reproducing apparatus according to claim 1, wherein:
when the second reproducing mode is switched to said first reproducing mode during a reproduction of the first content data in said second reproducing mode, said control unit erases the first content data stored in said buffer memory unit, reads out said predetermined portion of the first content data stored in said storing unit from said storing unit, and allows the read-out predetermined portion of the first content data to be stored into said buffer memory unit.

5. The reproducing apparatus according to claim 4, wherein:
the predetermined portion of the first content data comprises a preview reproducing interval of the first content data and the predetermined portion of the second content data comprises a preview reproducing interval of the second content data.

6. The reproducing apparatus according to claim 1, wherein:
when the second reproducing mode is switched to said first reproducing mode during a reproduction of the first content data in said second reproducing mode, said control unit reads out a predetermined portion of at least one next content data from said storing unit and allows the read-out predetermined portion of the at least one next content data to be stored into said buffer memory unit subsequently to the first content data which is being reproduced in the second reproducing mode and has been stored in said buffer memory unit.

7. The reproducing apparatus according to claim 6, wherein:
when the second reproducing mode is switched to said first reproducing mode during the reproduction of the first content data in said second reproducing mode, said control unit reads out the predetermined portion of the at least one next content data from said storing unit, allows the read-out predetermined portion of the at least one next content data to be stored into said buffer memory unit subsequently to the at least one content data which is being reproduced and has been stored in said buffer memory unit, and allows a stop position where the reproduction of the first content data in said second reproducing mode has been stopped to be stored, and when the first reproducing mode is switched to said second reproducing mode during the reproduction of the predetermined portion of the at least one next content data in said first reproducing mode, said control unit restarts the reproduction of the first content data which has been reproduced in said first reproducing mode from said stop position.

8. The reproducing apparatus according to claim 6, wherein:
when the second reproducing mode is switched to said first reproducing mode during the reproduction of the first content data in said second reproducing mode, if a reproducing position upon switching is after an end of the predetermined portion of the first content data which is being reproduced in the second reproducing mode, said control unit reads out predetermined portions of a plurality of next content data from said storing unit and allows the read-out predetermined portions of the plurality of next content data to be written into said buffer memory unit subsequently to an end of the first content data which is being reproduced and has been stored in said buffer memory unit.

9. The reproducing apparatus according to claim 6, wherein:
when the second reproducing mode is switched to said first reproducing mode during the reproduction of the first content data in said second reproducing mode, if a reproducing position upon switching is before an end of the predetermined portion of the first content data which is being reproduced in the second reproducing mode, said control unit reads out predetermined portions of a plurality of next content data from said storing unit and allows the read-out predetermined portions of the plurality of next content data to be written into said buffer memory unit subsequently to the end of the predetermined portion of the first content data which is being reproduced in the second reproducing mode and has been stored in said buffer memory unit.

* * * * *